US010029761B2

(12) United States Patent
Poppell et al.

(10) Patent No.: US 10,029,761 B2
(45) Date of Patent: Jul. 24, 2018

(54) BOAT EXPANDING AND CONTRACTING APPARATUS

(71) Applicant: Lanny Ralph Poppell, Vero Beach, FL (US)

(72) Inventors: Lanny Ralph Poppell, Vero Beach, FL (US); Timothy Ralph Poppell, Vero Beach, FL (US)

(73) Assignee: Lanny Ralph Poppell, Vero Beach, FL (US)

( * ) Notice: Subject to any disclaimer, the term of this patent is extended or adjusted under 35 U.S.C. 154(b) by 0 days.

(21) Appl. No.: 15/407,774

(22) Filed: Jan. 17, 2017

(65) Prior Publication Data

US 2017/0120985 A1 May 4, 2017

Related U.S. Application Data

(63) Continuation of application No. 14/712,320, filed on May 14, 2015, now Pat. No. 9,580,149, which is a
(Continued)

(51) Int. Cl.
*B63B 1/14* (2006.01)
*B63B 7/04* (2006.01)
(Continued)

(52) U.S. Cl.
CPC .............. *B63B 1/14* (2013.01); *B60P 3/1033* (2013.01); *B63B 7/04* (2013.01); *B63B 35/34* (2013.01);
(Continued)

(58) Field of Classification Search
CPC .. B63B 1/00; B63B 1/10; B63B 1/121; B63B 1/14; B63B 1/20; B63B 1/34; B63B 7/00; B63B 7/04; B63B 21/04; B63B 35/34
(Continued)

(56) References Cited

U.S. PATENT DOCUMENTS 2,992,444 A 7/1961 Schuler
3,139,058 A 6/1964 Robinson
(Continued)

FOREIGN PATENT DOCUMENTS

FR 2742119 6/1997
SU 524728 8/1976

OTHER PUBLICATIONS

International Search Report and Written Opinion dated Jul. 18, 2014 in PCT/US14/23427 filed Mar. 11, 2014.
(Continued)

*Primary Examiner* — Lars A Olson
(74) *Attorney, Agent, or Firm* — Oblon, McClelland, Maier & Neustadt, L.L.P.

(57) ABSTRACT

An expandable and contractible boat comprises a first outer hull and a second outer hull symmetrically shaped and arranged with respect to one another. The first and second outer hulls are movable relative to one another, and each of the first and second outer hulls includes an outboard side portion, an inboard side portion, a bottom portion between the outboard side portion and the inboard side portion, and a concave chine portion connecting the outboard side portion and the bottom portion. A cross-section of each of the first and second outer hulls is recessed at the concave chine portion.

13 Claims, 69 Drawing Sheets

Related U.S. Application Data continuation-in-part of application No. 14/451,886, filed on Aug. 5, 2014, now Pat. No. 9,045,195, which is a continuation-in-part of application No. 14/137,740, filed on Dec. 20, 2013, now Pat. No. 8,820,255.

(60) Provisional application No. 61/794,503, filed on Mar. 15, 2013.

(51) Int. Cl.
*B60P 3/10* (2006.01)
*B63B 35/34* (2006.01)

(52) U.S. Cl.
CPC ..... *B63B 2001/145* (2013.01); *B63B 2241/24* (2013.01)

(58) Field of Classification Search
USPC ............... 114/61.1, 61.2, 292, 344, 353, 354
See application file for complete search history.

(56) References Cited

U.S. PATENT DOCUMENTS

| | | | |
|---|---|---|---|
| 3,799,237 A | 3/1974 | Proserpi | |
| 3,925,837 A | 12/1975 | Miller | |
| 4,909,169 A | 3/1990 | Skandaliaris et al. | |
| 5,265,550 A | 11/1993 | Harper, Jr. | |
| 5,517,940 A | 5/1996 | Beyer | |
| 5,829,376 A | 11/1998 | Kostanski | |
| 5,868,032 A | 2/1999 | Laskey | |
| 6,003,458 A | 12/1999 | Valliere | |
| 6,067,925 A | 5/2000 | Little | |
| 6,178,913 B1 | 1/2001 | Brignolio | |
| 6,298,802 B1 | 10/2001 | Brignolio | |
| 6,397,769 B1 | 6/2002 | Bullmer | |
| 6,564,735 B1 | 5/2003 | Jackson | |
| 6,647,913 B2 | 11/2003 | Brignolio | |
| 6,725,796 B2 | 4/2004 | Mensch | |
| 6,874,440 B1 | 4/2005 | Manderfield | |
| 7,810,830 B2 * | 10/2010 | Warren ................ | B60P 3/1033 114/344 |
| 7,827,926 B2 * | 11/2010 | Payne ..................... | B63B 1/20 114/292 |
| 8,820,255 B1 | 9/2014 | Poppell | |
| 9,045,195 B2 | 6/2015 | Poppell | |
| 2003/0116072 A1 | 6/2003 | Brignolio | |
| 2003/0172862 A1 | 9/2003 | Chacon | |
| 2013/0213288 A1 | 8/2013 | Hall | |

OTHER PUBLICATIONS http://www.google.com/patents/US20130213288?dq=velodyne+marine&hl=en&sa=X&ei=aByzUoKnKlnskQel.w4DQBQ&sqi=2&pjf=1&ved=0CEAQ6AEwAQ.
http://www.youtube.com/watch?v=Thl3iq1oFXc.
http://www.youtube.com/watch?v=re25D4dfvEA.

* cited by examiner

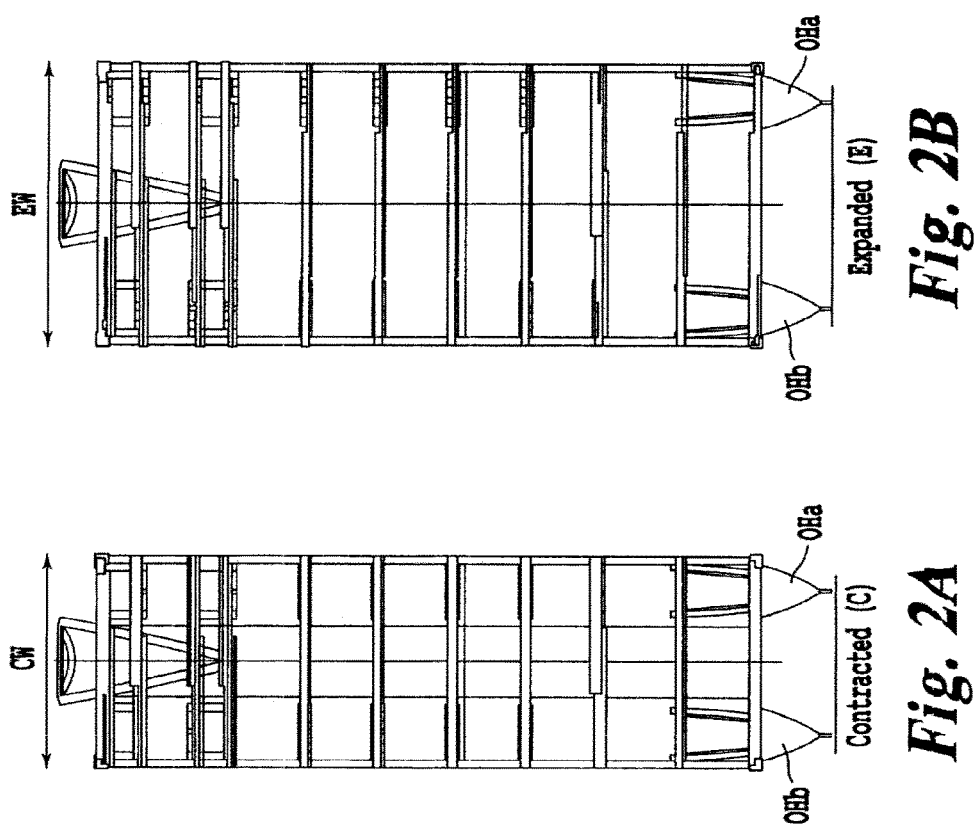

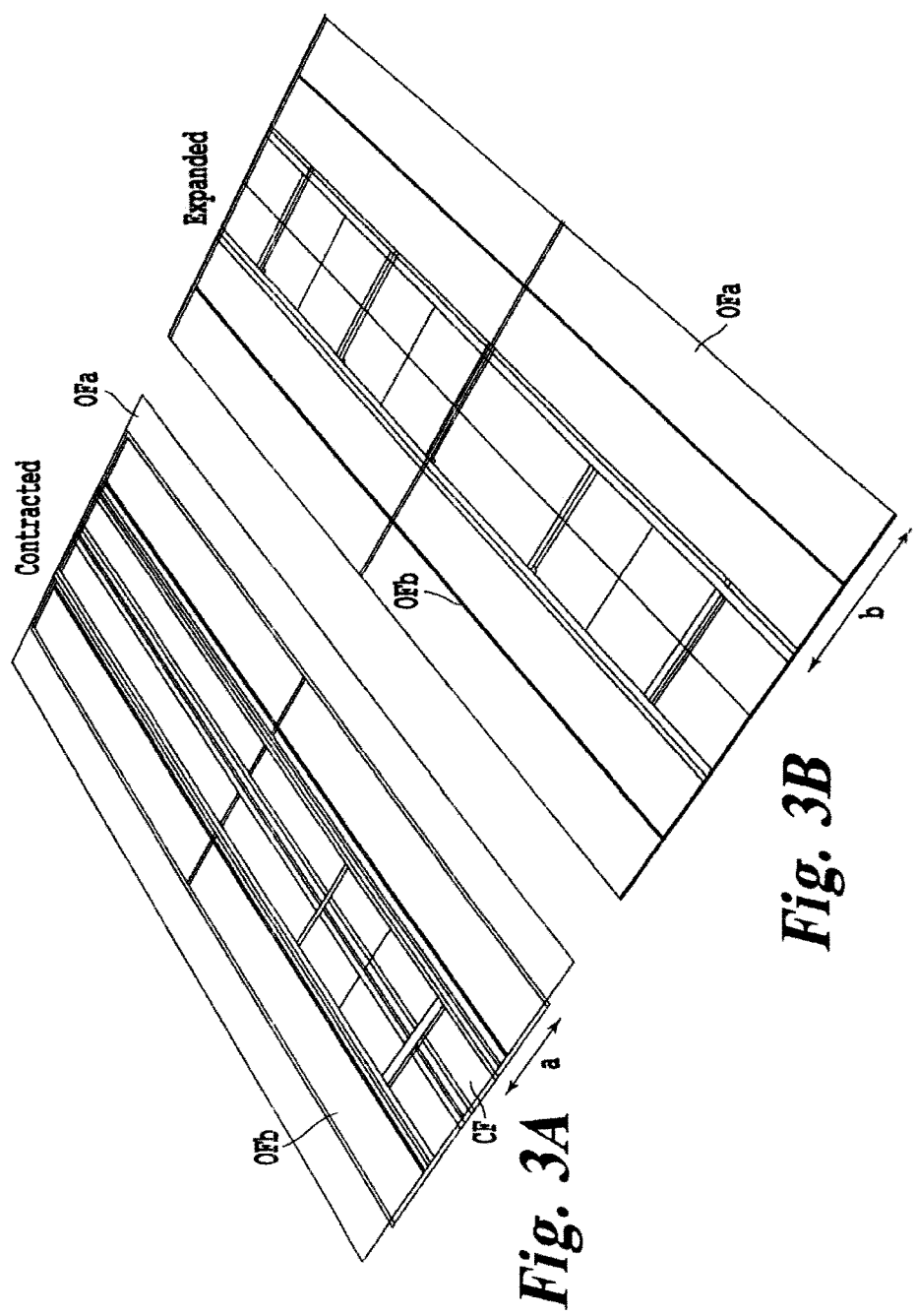

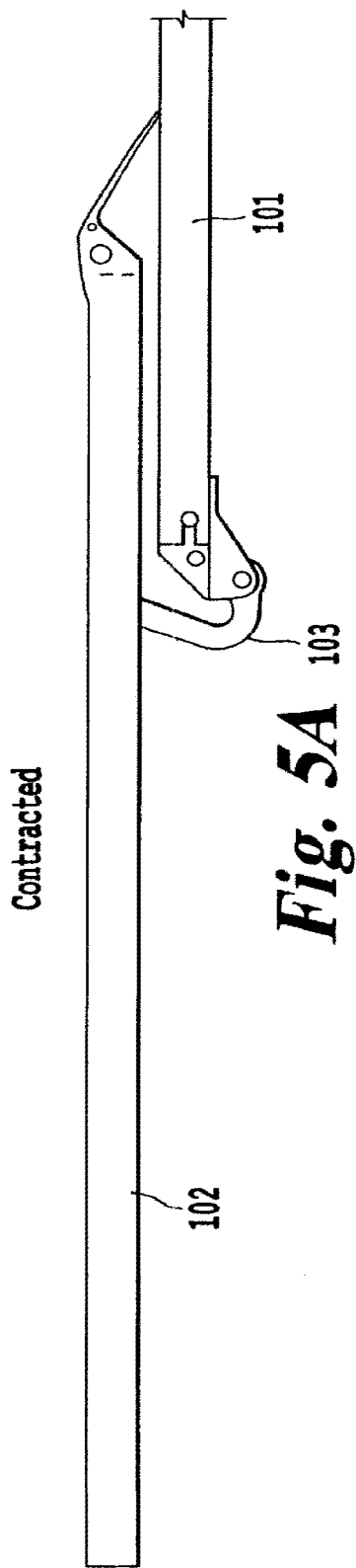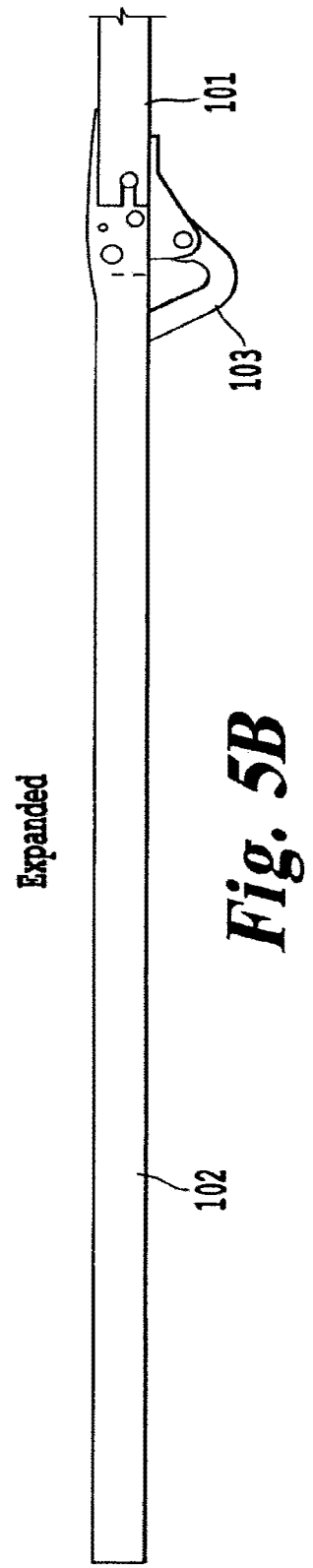

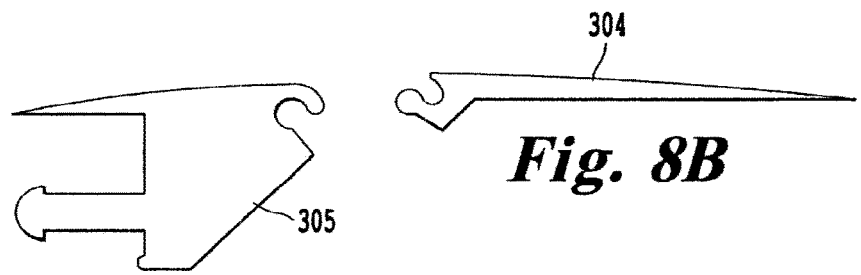
*Fig. 8B*
*Fig. 8A*
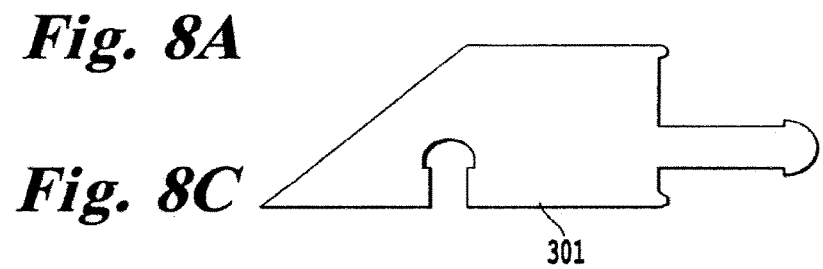
*Fig. 8C*
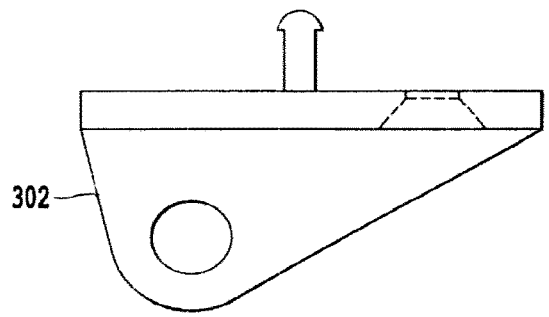
*Fig. 8D*
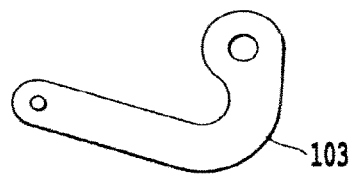
*Fig. 8E*

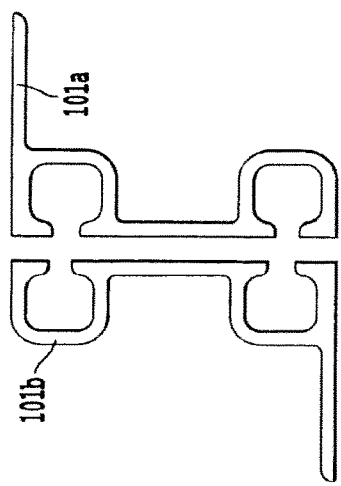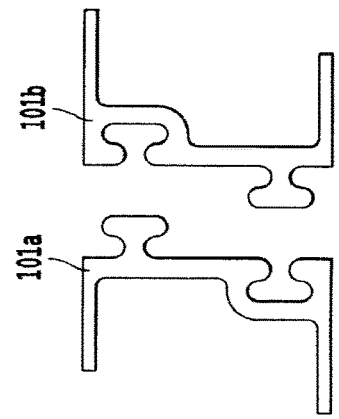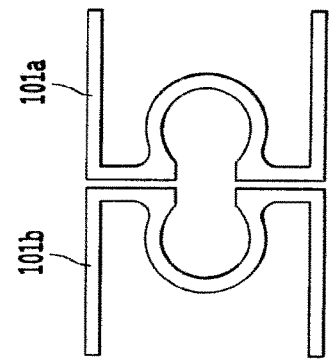
Fig. 18A
Fig. 18B
Fig. 18C

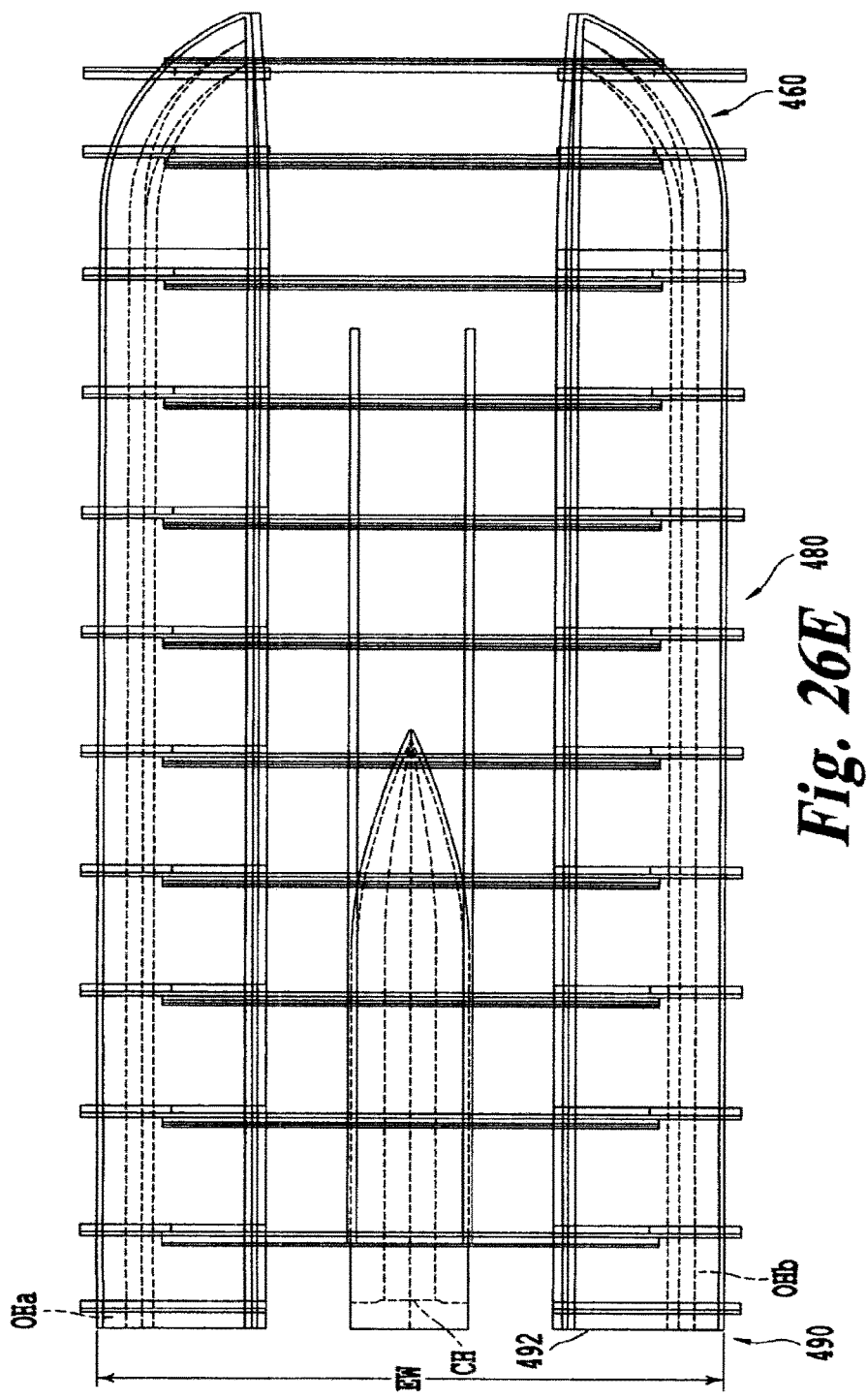

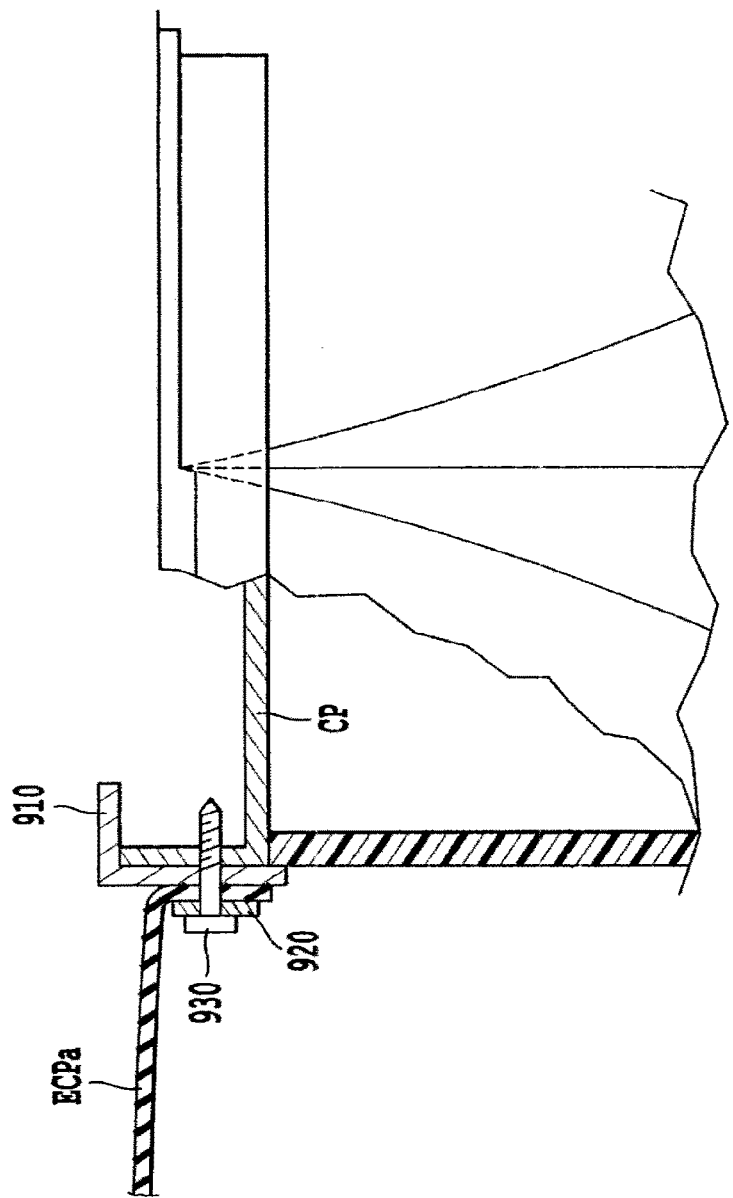

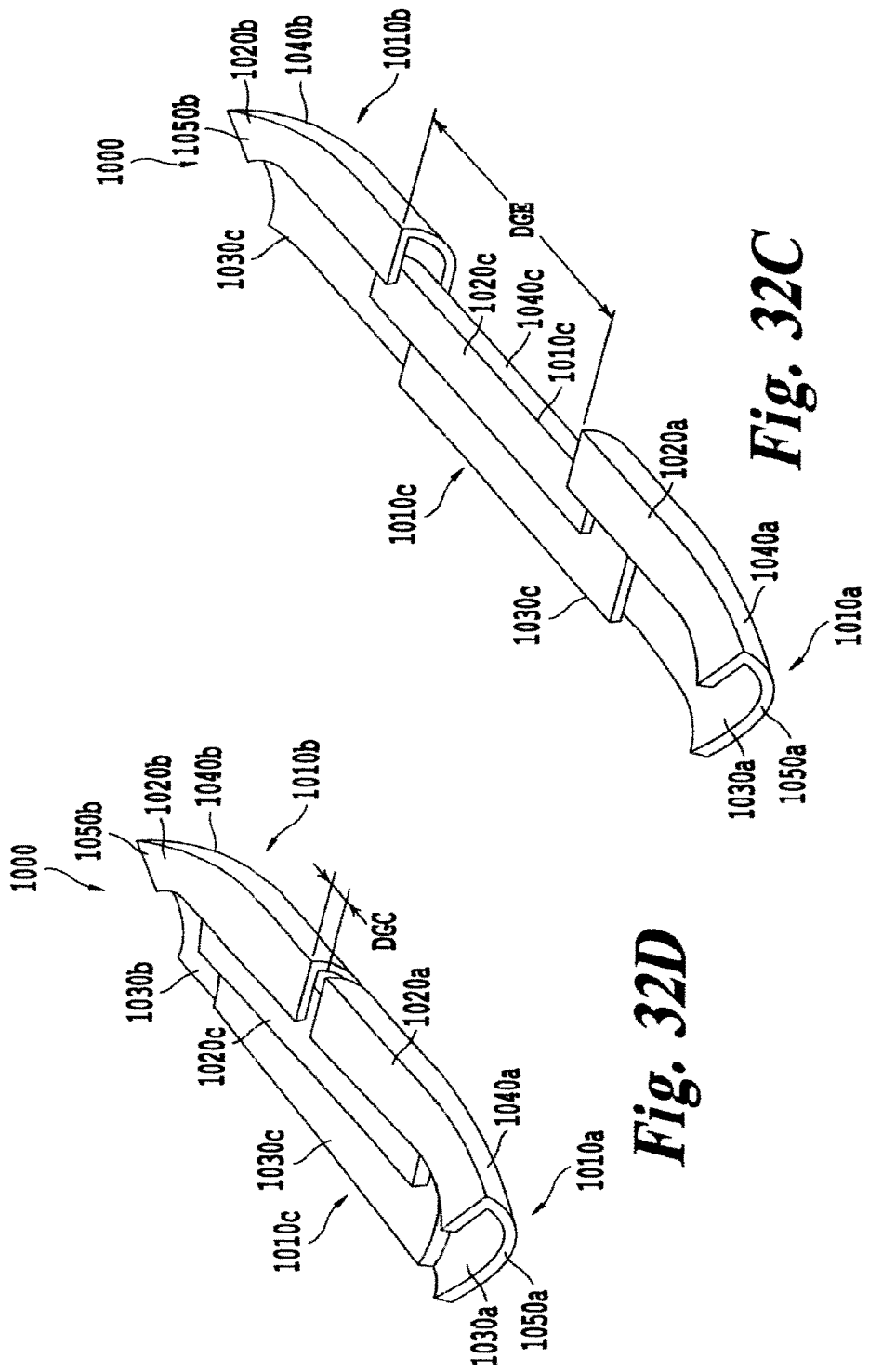

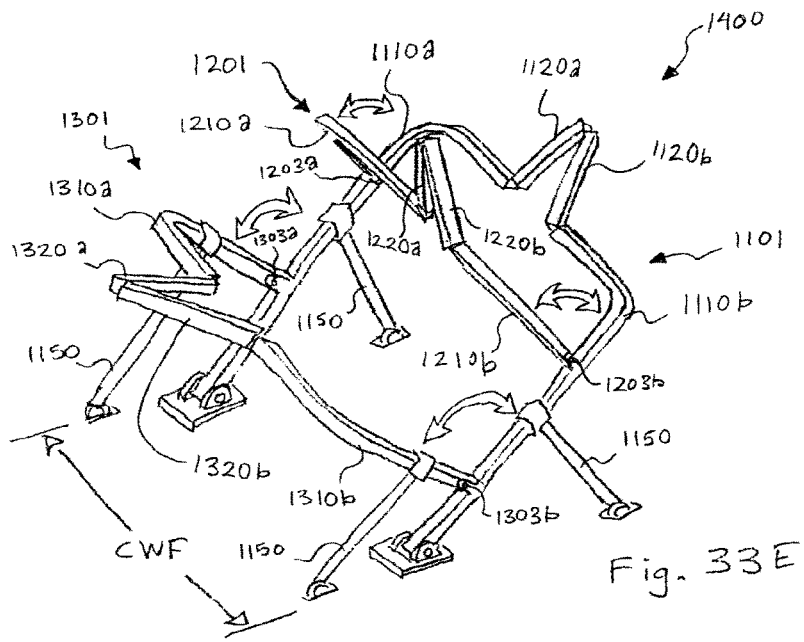
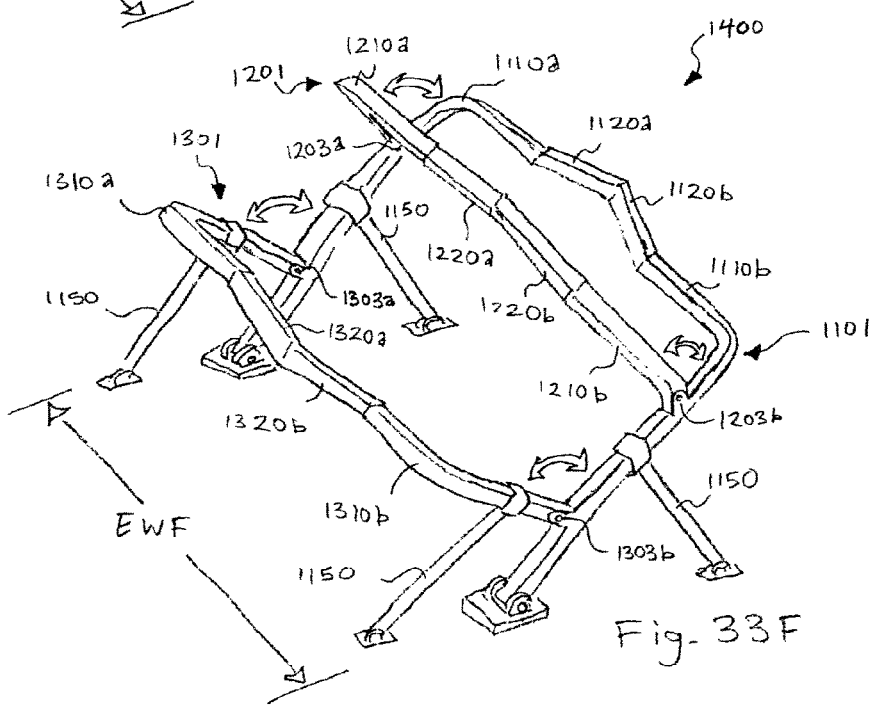

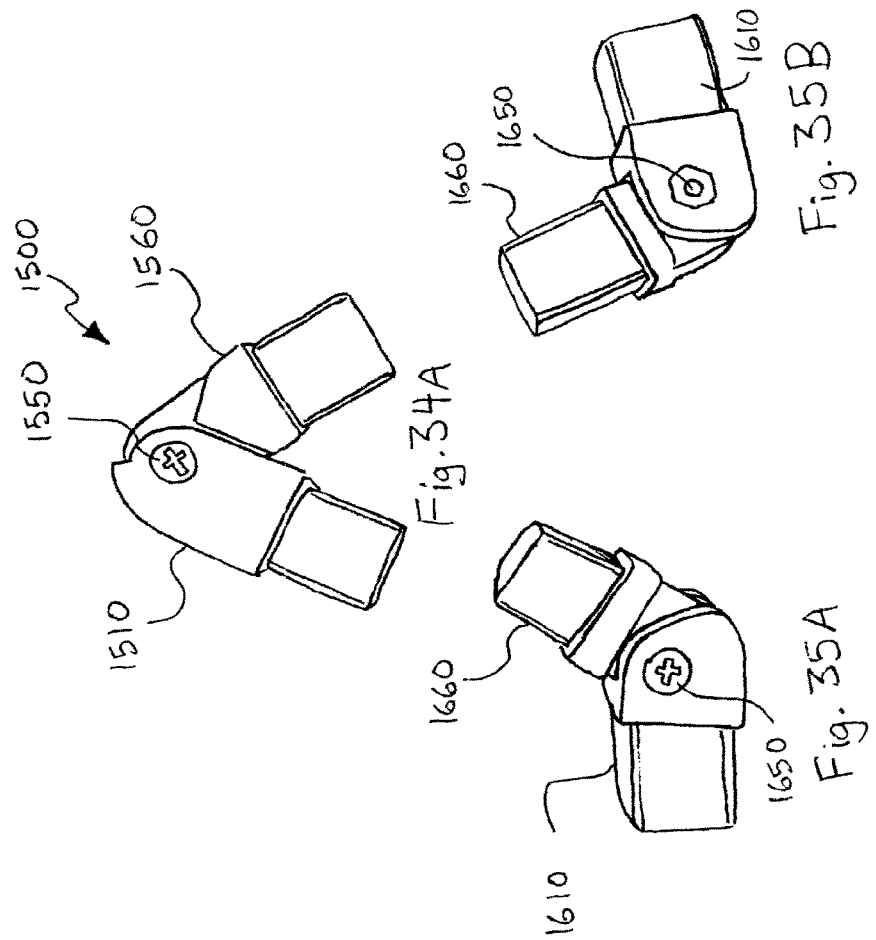

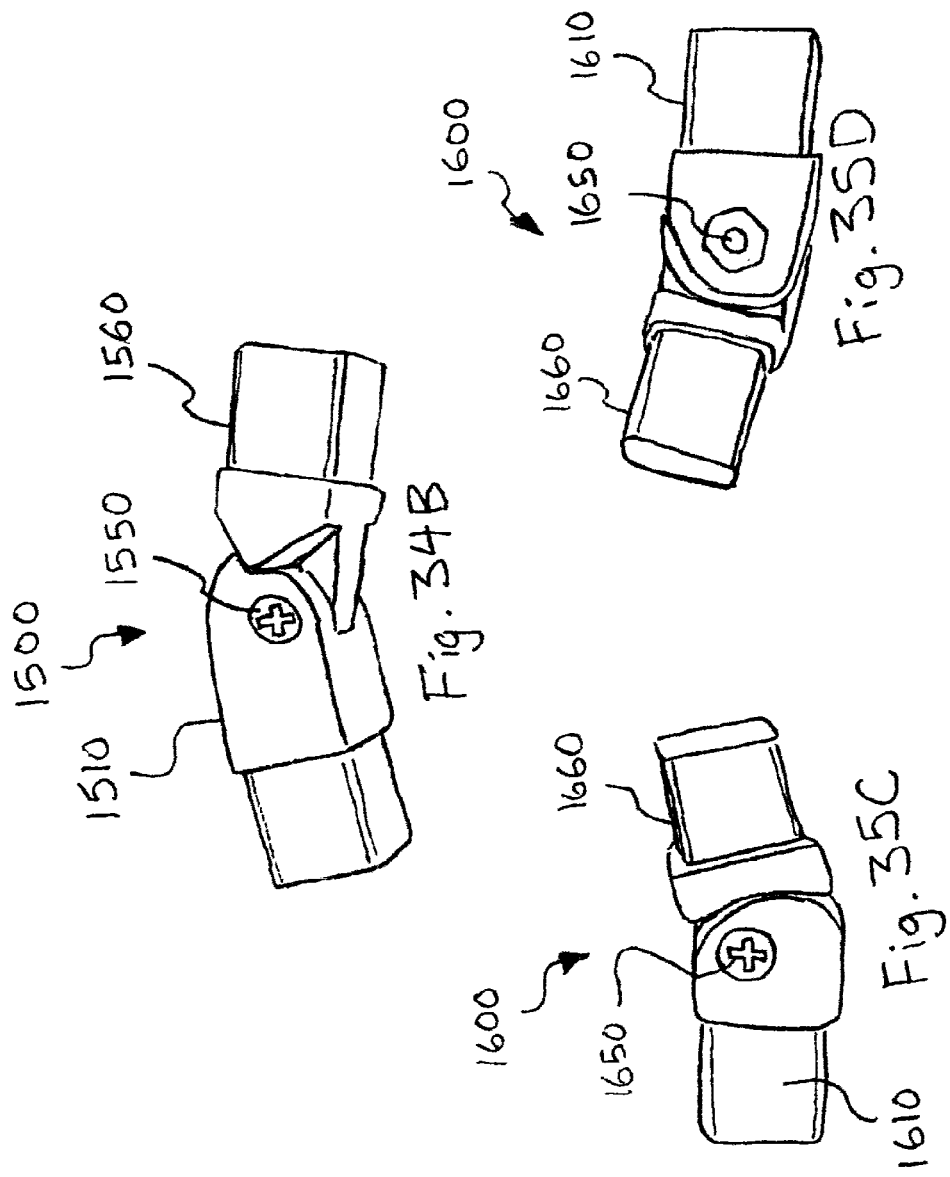

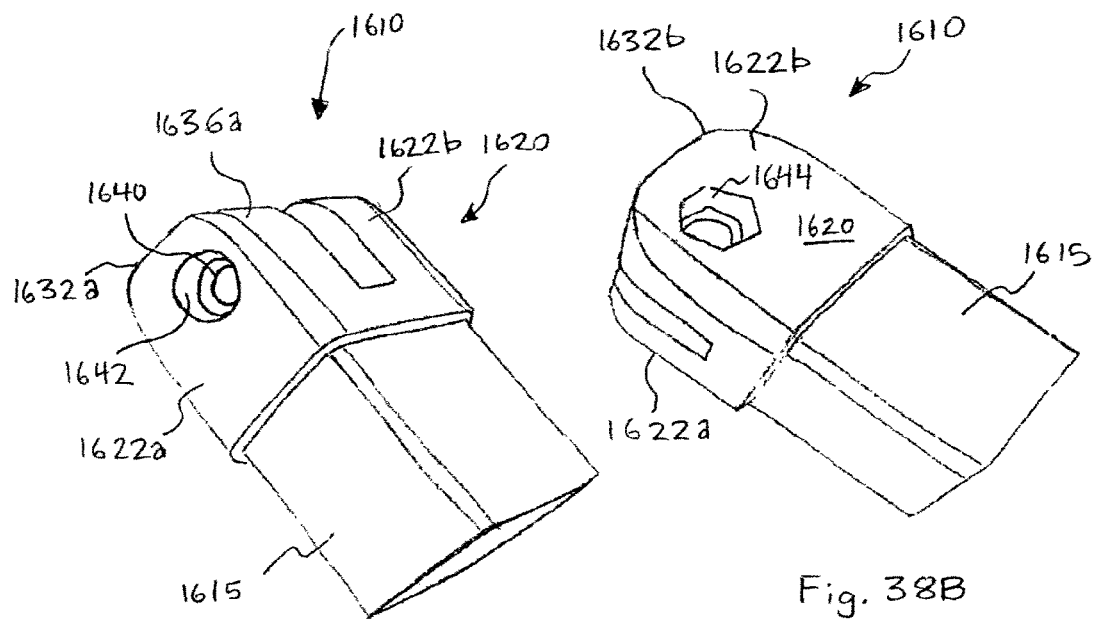
Fig. 38A
Fig. 38B
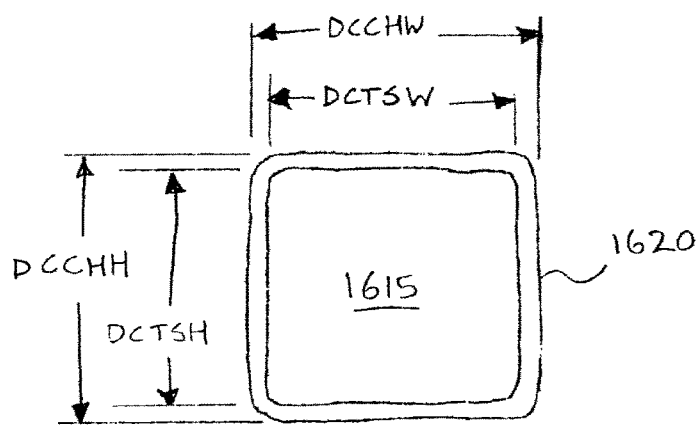
Fig. 38E

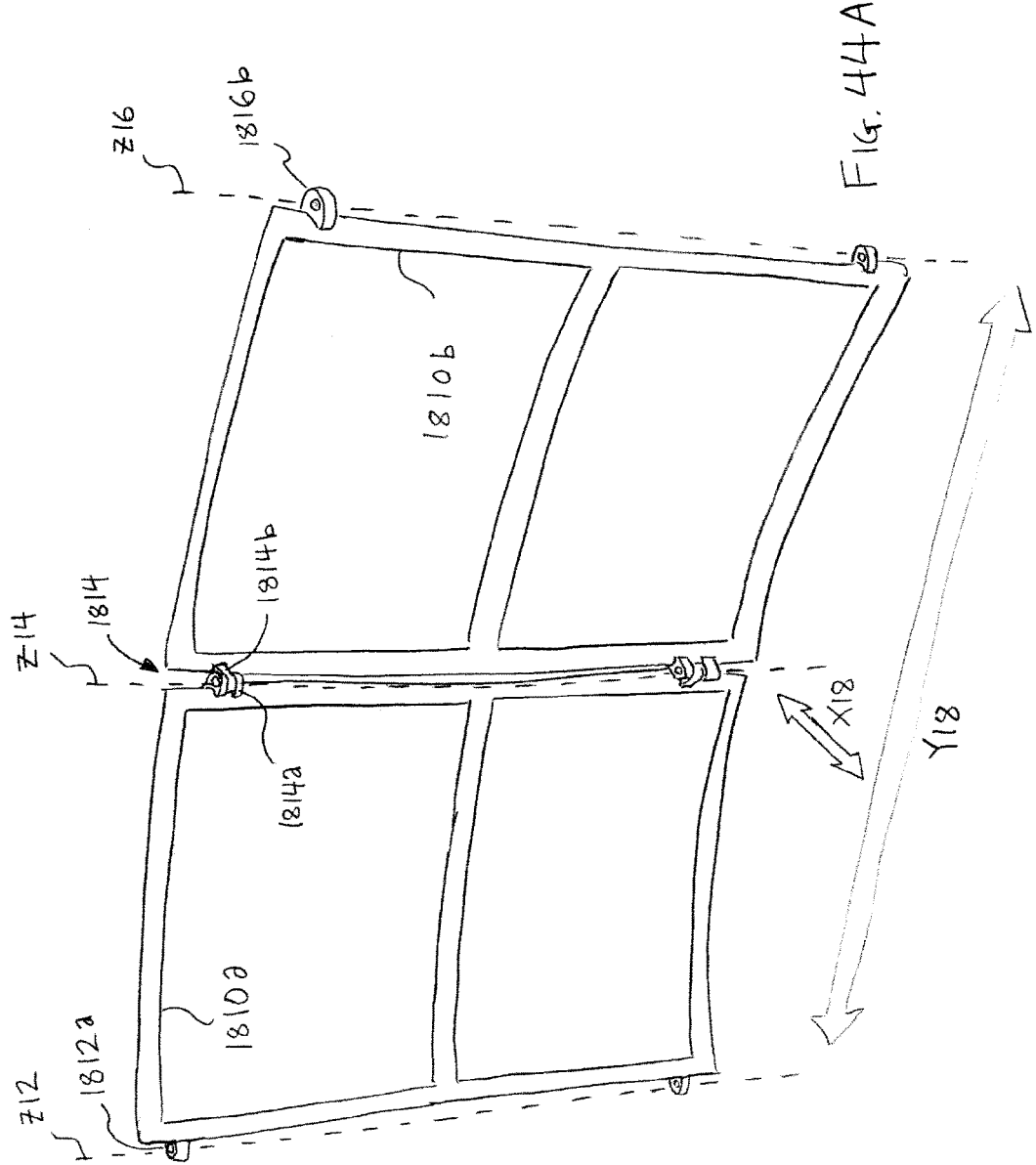

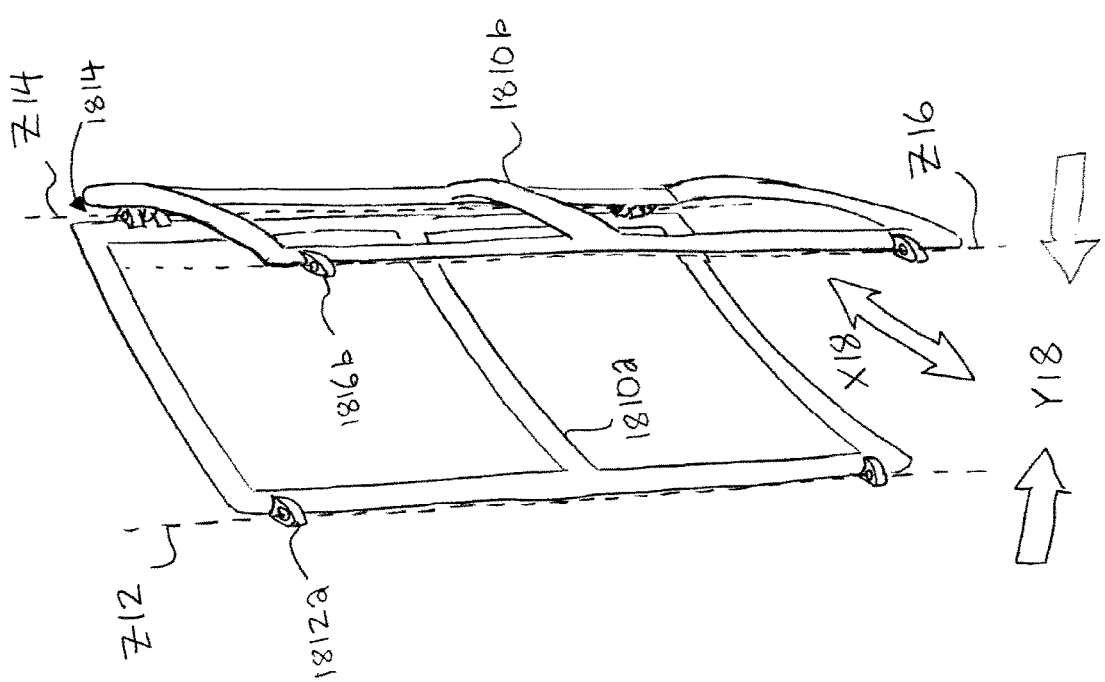

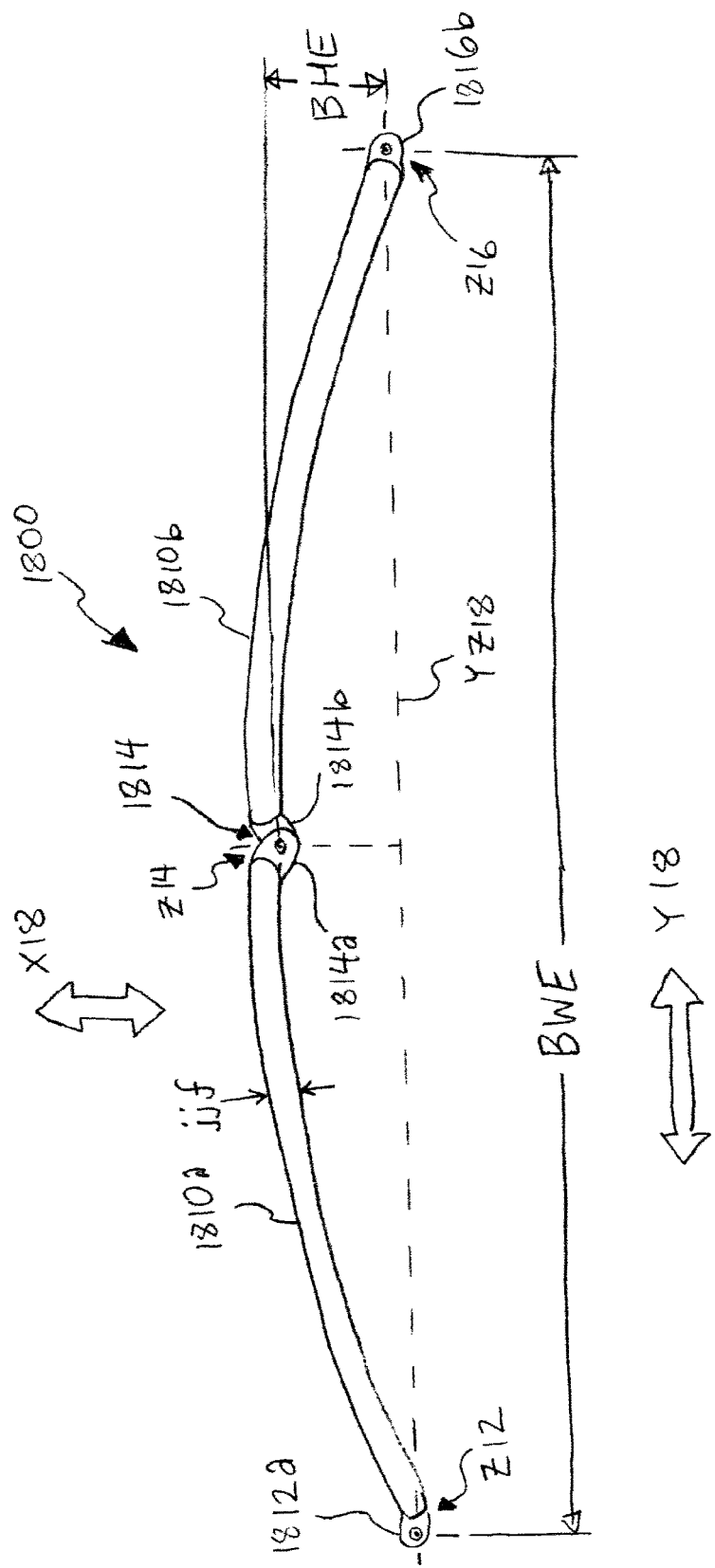

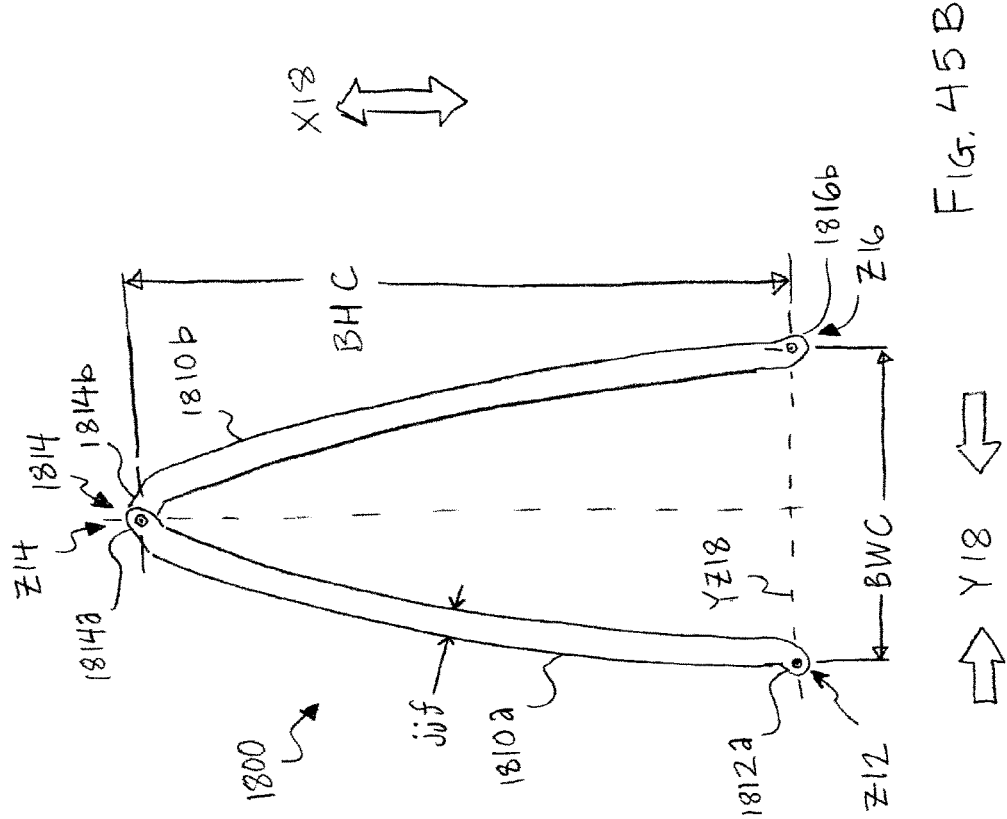

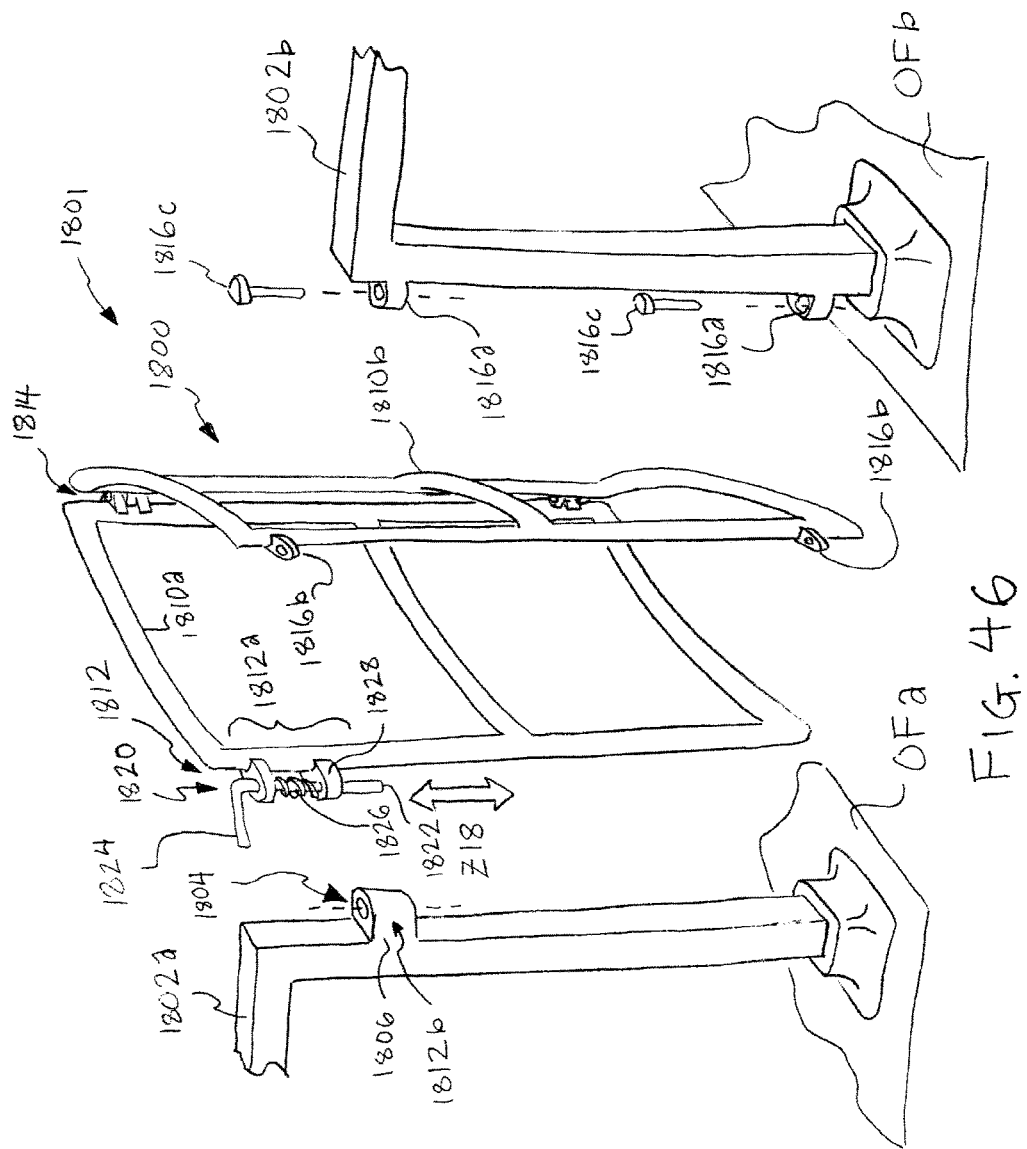

BOAT EXPANDING AND CONTRACTING
APPARATUS

CROSS-REFERENCE TO RELATED APPLICATIONS

This application is a continuation of U.S. application Ser. No. 14/712,320, filed on May 14, 2015, which is a continuation in part of and claims priority to U.S. application Ser. No. 14/451,886, filed on Aug. 5, 2014, which claims priority to U.S. application Ser. No. 14/137,740, filed on Dec. 20, 2013, which claims priority to U.S. Application No. 61/794,503, filed on Mar. 15, 2013, the entire contents of each of which are incorporated in the present document by reference.

BACKGROUND

The present invention relates to a system for boat expansion and contraction.

Getting a boat out of the water can be difficult, even with a suitable boat trailer. The boat must then be carried between the water and a storage location, typically on a trailer. For people who want to protect their boat from the elements and/or who do not have a large amount of storage space, or who want to store their boat at home in the off-season, a boat such as a pontoon boat or party-type boat variant may inconveniently occupy a significant amount of floor space.

Boats such as pontoon boats may have an average length between 16 and 24 feet, with a width between 6 and 10 feet, making them impossible to store in a standard one car garage, or even a two car garage (22×22 feet).

As an alternative to offsite storage, and for users with occasional to sparse use, boats which may be reduced in size and volume may be attractive. To reduce a boat's footprint in storage, other than fully inflatable boats, kit boats currently exist. However, an inconvenience of kit boats is their use of parts and materials which result in a weaker structure, with associated safety concerns and reduced comfort for users.

Due to their nature, kit boats may also inconveniently involve small parts, which are required for assembly but can be lost easily. In addition, poor clearances may lead to an inadequate assembly in a large number of instances.

SUMMARY

A pontoon boat includes two pontoons parallel to the bow to stern axis, and transverse beams which connect the pontoons. The pontoon boat has a width along the transverse beams which can vary from a contracted to an expanded state to allow for storage, and use, respectively.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 2A-B depict schematic top views of an exemplary embodiment in contracted and expanded states;

FIGS. 3A-B depict schematics of the floor of an exemplary embodiment in contracted and expanded states;

FIGS. 5A-B depict cross-sections of a portion of the floor of an exemplary embodiment in contracted and expanded states;

FIGS. 8A-E depict schematic views of several elements of an exemplary embodiment;

FIGS. 18A-F depict beam configurations and assemblies in exemplary embodiments;

FIGS. 26A-E depict expanded and contracted views of an exemplary embodiment;

FIGS. 31A-H depict expanded and contracted views of an exemplary embodiment;

FIGS. 32A-F depict expanded and contracted views, perspective views, and cutaway side views of an exemplary embodiment;

FIGS. 33A-F depict expanded and contracted views of an exemplary embodiment;

FIGS. 34A-B depict expanded and contracted views of an inboard hinge in accordance with an exemplary embodiment;

FIGS. 35A-D depict expanded and contracted views of an outboard hinge in accordance with an exemplary embodiment;

FIGS. 38A-E depict perspective views and schematic views of an outboard hinge clevis in accordance with an exemplary embodiment.

FIGS. 44A-B depict perspective views of an expandable and contractible barrier in accordance with an exemplary embodiment.

FIGS. 45A-B depict top views of an expandable and contractible barrier in accordance with an exemplary embodiment.

FIG. 46 depicts a perspective view of an expandable and contractible barrier in accordance with an exemplary embodiment.

DETAILED DESCRIPTION

Figure 1:
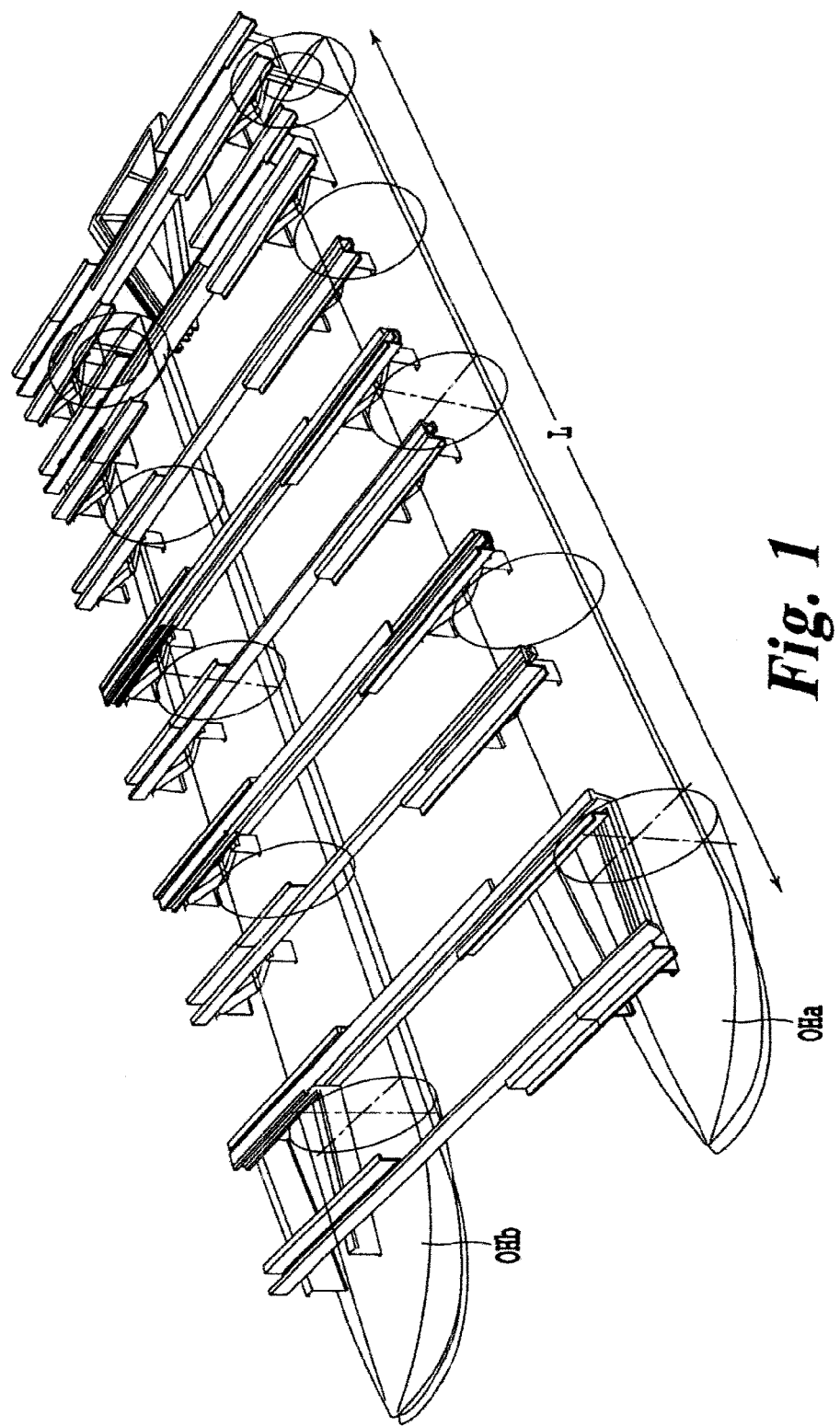
FIG. 1 depicts a schematic isometric view of an exemplary embodiment.

Referring now to the drawings, like reference numerals designate identical or corresponding parts throughout the several views.

It is an object and feature of an exemplary embodiment described herein to provide a boat expanding and contracting apparatus with a sliding floor. One advantage of an exemplary boat expanding and contracting system described herein is the ability to transport a boat by using narrow trailers which can be pulled on small roads, with the boat at a lower height, hence producing less wind resistance. In other words, an exemplary embodiment has a reduced aerodynamic profile leading to fuel efficiency improvements when transported on a trailer. In an exemplary embodiment, the boat system allows for easy launch and retrieval operations. An exemplary embodiment requires only a small amount of water to launch and retrieve the boat.

In addition, an exemplary embodiment of the boat can be parked inside a typical-size garage, unlike regular pontoon boats, yet provide the full usable surface of a conventional pontoon boat on the water. In exemplary embodiments, the exemplary boat expanding and contracting system described herein can be used on a variety of boat structures, such as a party boat, a Hobie Cat or Power Cat, various catamarans or trimarans, and small to large sailboats with various hull shapes and sizes.

These and other objects, advantages, and features of the exemplary boat expanding and contracting system described herein will be apparent to one skilled in the art from a consideration of this specification, including the attached drawings.

Figure 19:
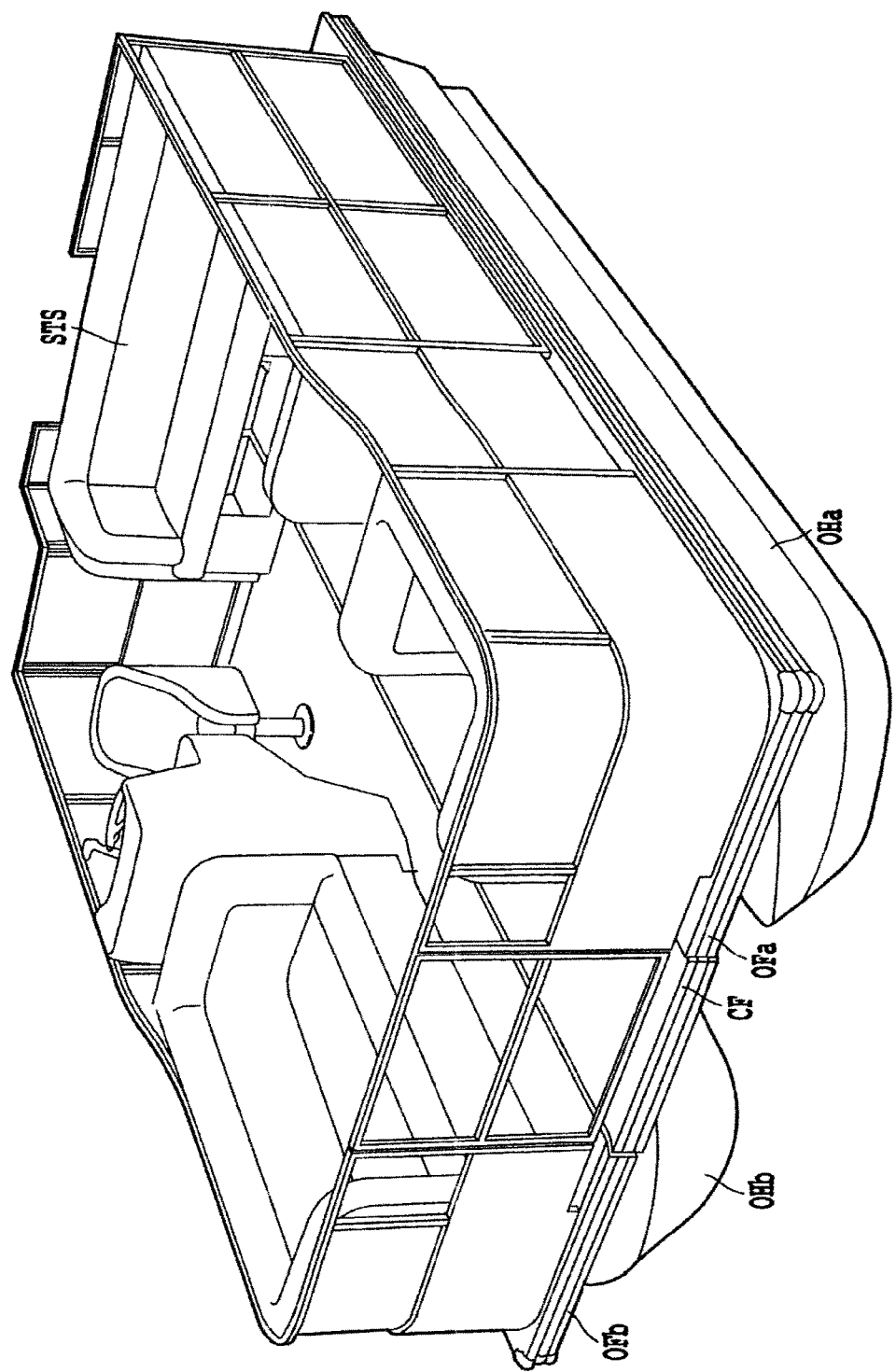
FIG. 19 depicts a three-dimensional representation of a boat using an exemplary embodiment.
Figure 20:
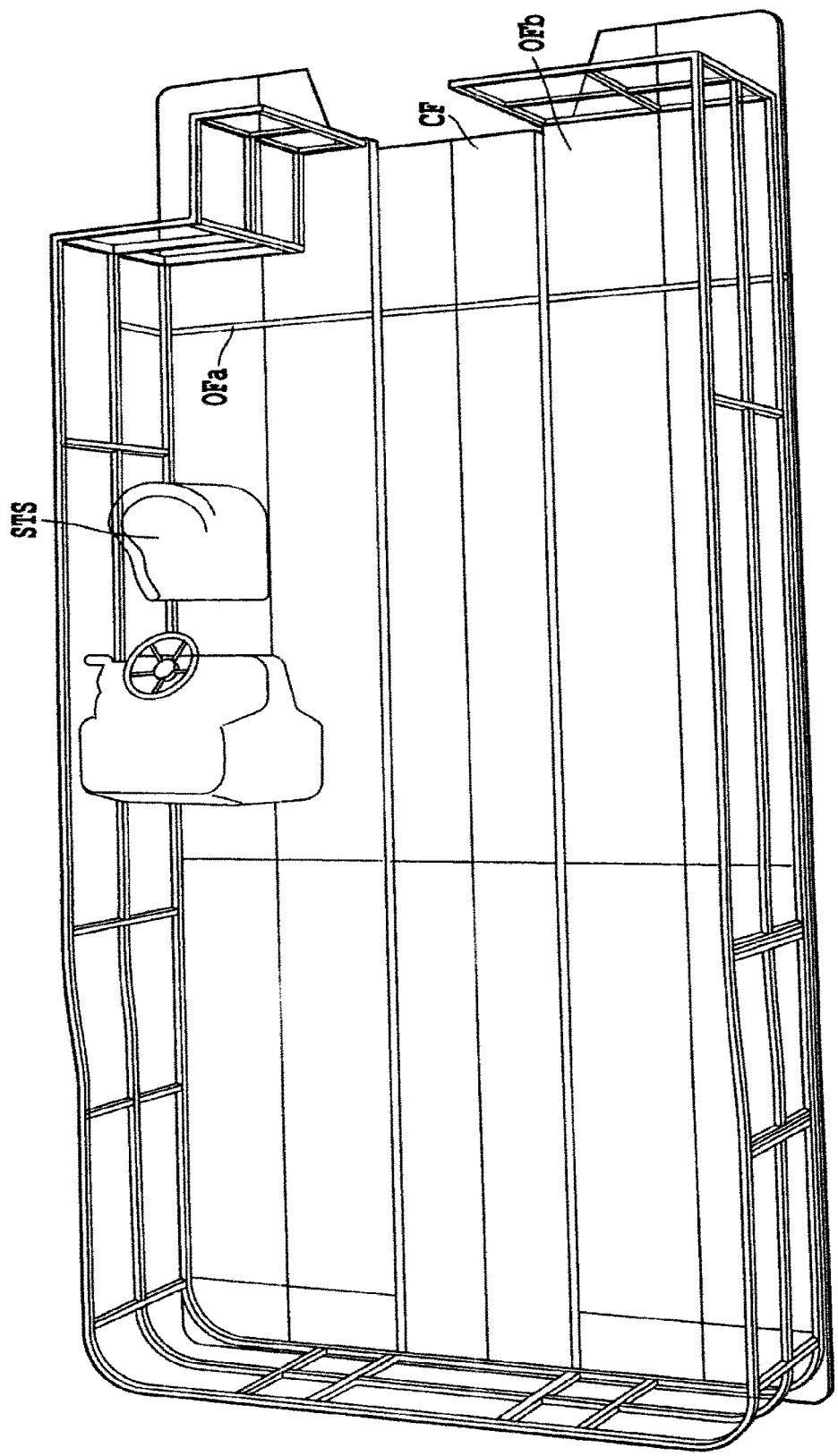
FIG. 20 depicts a schematic upper view of a boat using an exemplary embodiment.

Referring to FIG. 19, an exemplary embodiment of an expanding and contracting system is shown on a pontoon boat with seats (STS), with central panel (CF) and side floor panels (OFa, Ofb). Similarly in FIG. 20, an exemplary embodiment of a boat using the expanding and contracting system is shown. As shown in FIGS. 19 and 20, seats and instrument panels are attached to the side floor panels, while the central floor panel remains free of any attachments. In other exemplary embodiments, the seats can be configured in any number of ways along the sides of the boat, such that the seats can remain in place and allow the expanding and contracting process to take place.

As shown in the exemplary embodiment of FIG. 1, the floor panels of the pontoon boat are located above a structure which includes two pontoons (1) parallel to the bow to stern axis, and transverse beams (2) which connect the pontoons. Floor panels are fixed to the transverse beams (2) which connect the pontoons. In an exemplary embodiment, a railing is present around the boat, and an opening allowing passengers to embark or disembark is aligned with the central panel. In an exemplary embodiment, the engine of the pontoon boat is attached to the boat structural components directly below the central floor panel.

Referring to the exemplary embodiment shown in FIG. 2, the pontoon boat can be in a contracted configuration (C), or in an expanded configuration (E). In the contracted configuration (C), portions of the boat deck or floor, and the associated pontoons are moved inward towards a line along the center of the deck from bow to stern. In this exemplary embodiment, the length (L) of the boat does not vary, but the width of the boat from outer edge to outer edge varies between (CW) in the contracted configuration, and (EW) in the expanded configuration. In an exemplary embodiment, a boat may have an expanded width (EW) of 120", for a contracted width (CW) of 84". In other exemplary embodiments, a boat may have an expanded width between 84" and 120", and a contracted width between 72" and 102".

In an exemplary embodiment, a boat may have an expanded width of 102", for a contracted width of 75". In an exemplary embodiment, a boat may have an expanded width of 104", for a contracted width of 84". In exemplary embodiments, the length (L) of the boat may be between 17'6" to 32', while the increase in width between the contracted and expanded configurations is up to 30".

As shown in FIG. 3, in an exemplary embodiment, the floor of the boat includes a central floor portion (CF) and two outer floor portions (OFa-b). In the contracted configuration, the outer floors overlap partially with the central floor in the height direction, such that a less-than-full portion of the outer floors, with width (a), protrudes from the central floor in the width direction. In the expanded configuration, the full width (b) of the outer floors protrudes from the central floor portion. Thus, the outer floors do not overlap the central floor portion in the expanded configuration.

Figure 4A:
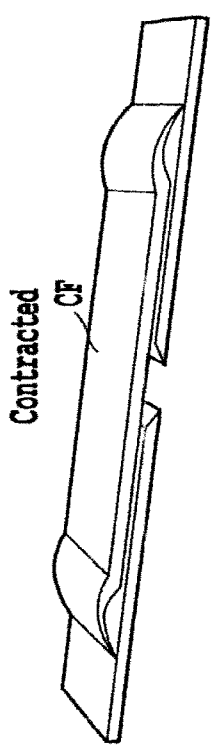
FIGS. 4A-B depict isometric views of a portion of the floor of an exemplary embodiment in contracted and expanded states.
Figure 4B:
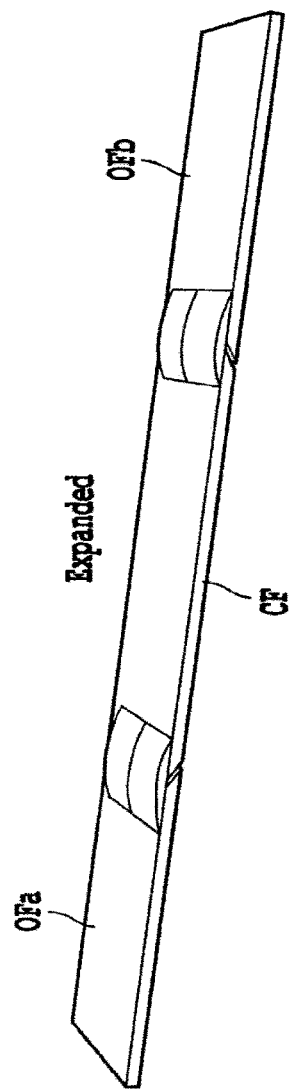

FIGS. 4A-B display an exemplary embodiment of a mechanism by which the width of the boat is reduced from the expanded to the contracted configuration. In this exemplary embodiment, the outer floors (OFa-b) slide under the central floor panel (CF). In an alternate embodiment, the outer floors (OFa-b) slide over the central floor panel (CF).

In a first exemplary embodiment, as the central floor panel is raised by two actuating cylinders the outer floor panels move below the raised central floor panel, until they abut each other in the center. The central floor panel, once raised, provides the necessary clearance for the two outer floor panels to come together. In an exemplary embodiment, the transition from contracted to expanded state, and vice versa, can take place while the boat is in use on the water. In an exemplary embodiment an on/off type control such as a lever, switch or button can initiate or end the expansion or contraction of the floor.

In a second exemplary embodiment, the central floor panel is lowered by two actuating cylinders and the outer floor panels move above the lowered central floor panel, until they abut each other in the center. The central floor panel, once lowered, provides the necessary clearance for the two outer floor panels to come together. In an exemplary embodiment, the expansion and/or contraction mechanism carried out by actuator cylinders is powered by DC motors, and/or by manual cranks. The actuators also provide a locking mechanism for both the expanded and contracted states.

As shown in an exemplary embodiment in FIGS. 5A-B, a pivot and slide mechanism is used to move the outer floor panels from a contracted to an expanded configuration, and vice versa. A beam (101) of an outer floor panel is shown, connected to a J-bracket (103), which moves along the C-track (102) of the central floor panel (CF). In the expanded configuration shown in FIG. 5B, the C-track (102) and the beam (101) are level, and the J-bracket (103) is located at an end of the C-track. In the contracted configuration, the C-track (102) partially overlaps the beam (101) which has moved towards the center of the boat, and below the C-track. The floor panels slide below the central panel, and accordingly the central floor board slides over the outer floor panels.

Figure 16B:
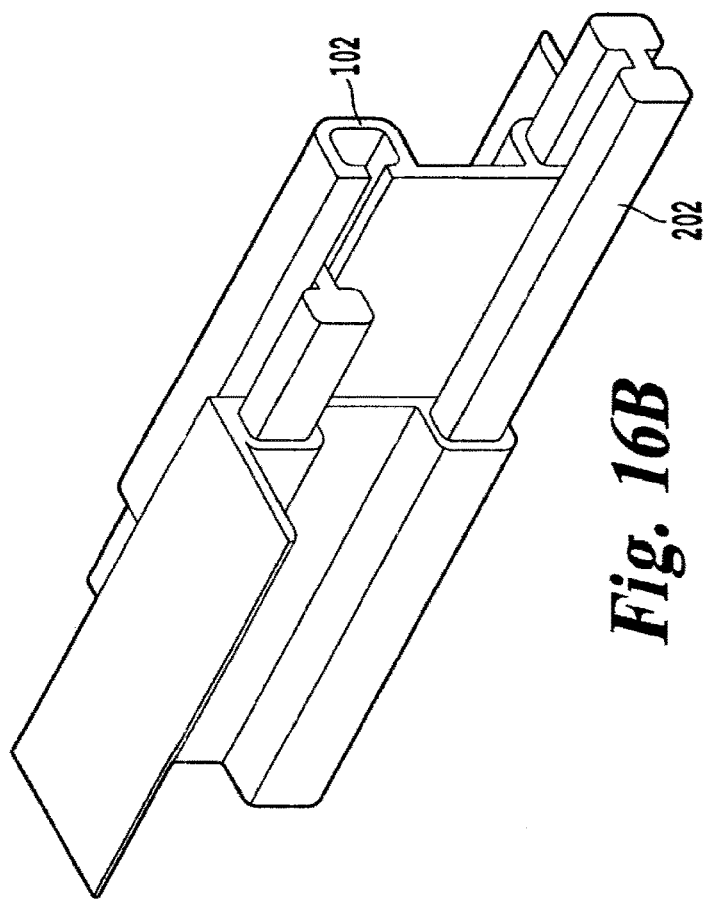
FIGS. 16A-B depict the connection between two beams in an exemplary embodiment.
Figure 16A:
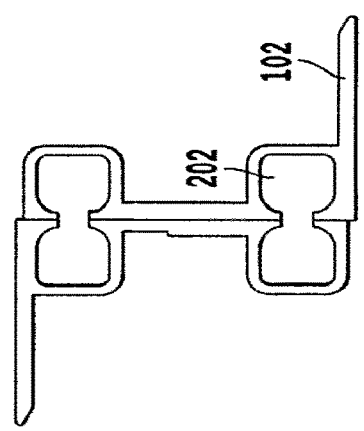

The beams (101) of the outer floor portions can vary in length between the expanded and contracted configurations. As shown in the exemplary embodiment of FIGS. 16A-B, a pair of beams (101) can be connected by a dog bone element, such that each beam (101) can slide with respect to the other member of the beam pair.

Figure 18F:
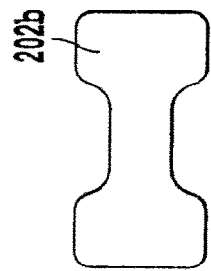
Figure 18E:
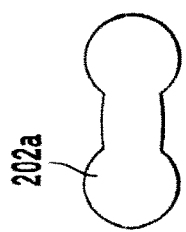

FIGS. 18A-D depict four different beam pairs, with different beam geometries. The exemplary embodiment shown in FIG. 18A uses two dog-bone shaped elements, such as element (202b) shown in FIG. 18F, to connect the beam pair, whereas the exemplary embodiment of FIG. 18D uses a single dog-bone shaped element (202a) to connect the beam pair. In the exemplary embodiment of FIG. 18B, no dog-bone shaped element is required to connect the beam pair of beams (101a), as the geometry of each beam allows the interlocking of the beam pair without an additional element. The exemplary embodiment shown in FIG. 18C uses a peanut-shaped element, such as the one shown in FIG. 18E, to connect the beam pair of beams (101c).

Figure 17:
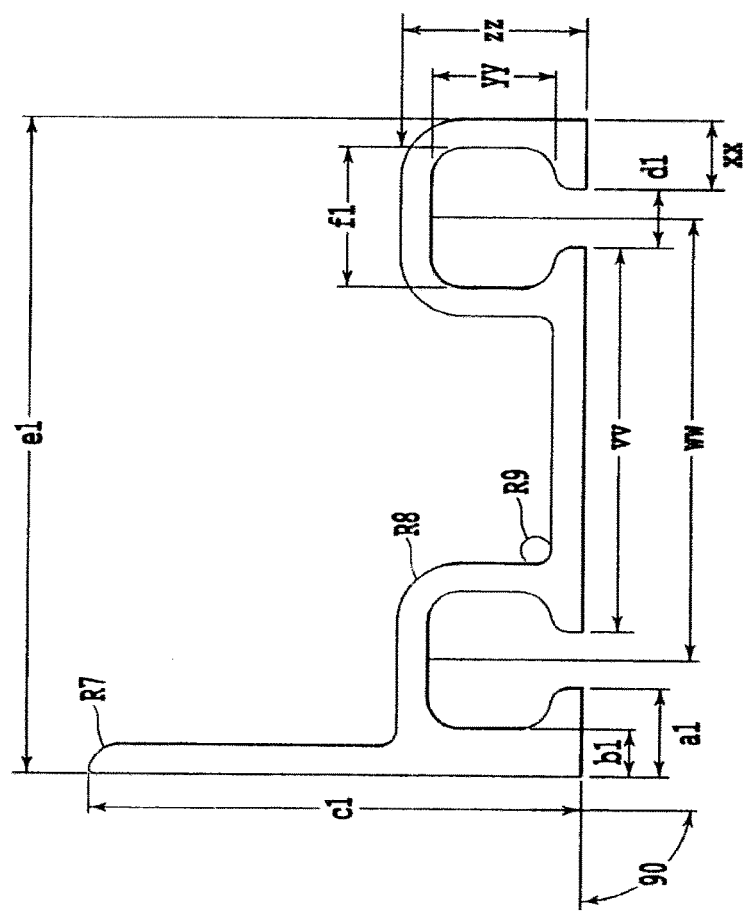
FIG. 17 depicts a schematic view of a beam cross-section in an exemplary embodiment.

Referring to the exemplary embodiment shown in FIG. 17, and FIG. 18A, a beam (101a), such as that shown in FIG. 18A has overall dimensions e1 and c1, with widths a1, b1, vv, ww, d1, xx and f1, heights yy, and zz, and radii R7, R8, and R9. In a preferred embodiment, e1 is 2.938", c1 is 2.000", a1 is 0.376", b1 is 0.188", vv is 1.750", ww is 2.000", d1 is 0.250", xx is 0.313", f1 is 0.625", yy is 0.500", zz is 0.750", R7 is 0.125", R8 is 0.280" and R9 is 0.062". In alternative embodiments, e1 is between 2.9 and 3.0", c1 is between 1.9 and 2.1", a1 is between 0.3 and 0.4", b1 is between 0.18 and 0.2", vv is between 1.7 and 1.8", ww is between 1.9 and 2.1", d1 is between 0.23 and 0.27", xx is between 0.3 and 0.4", f1 is between 0.6 and 0.65", yy is between 0.45 and 0.55", zz is between 0.7 and 0.8", R7 is between 0.12 and 0.13", R8 is between 0.25" and 0.3" and R9 is between 0.06" and 0.08".

Figure 18D:
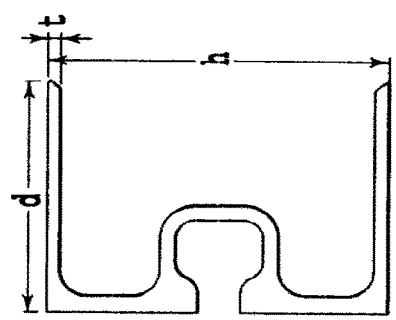

Referring to the exemplary embodiment of FIG. 18D, a beam (101d) has a cross-section with overall dimensions d, t and h, and with widths t1 and t2. In an exemplary embodiment, d is 2", t is 1/8", h is 2 15/16", t1 is 1 1/4" and t2 is 1 5/16". In alternative embodiments, d is between 1.8" and 2.1", t is between 0.1" and 0.15", h" is between 2.9" and 3.1", t1 is between 1.2" and 1.3", and t2 is between 1.3" and 1.4".

Figure 6:
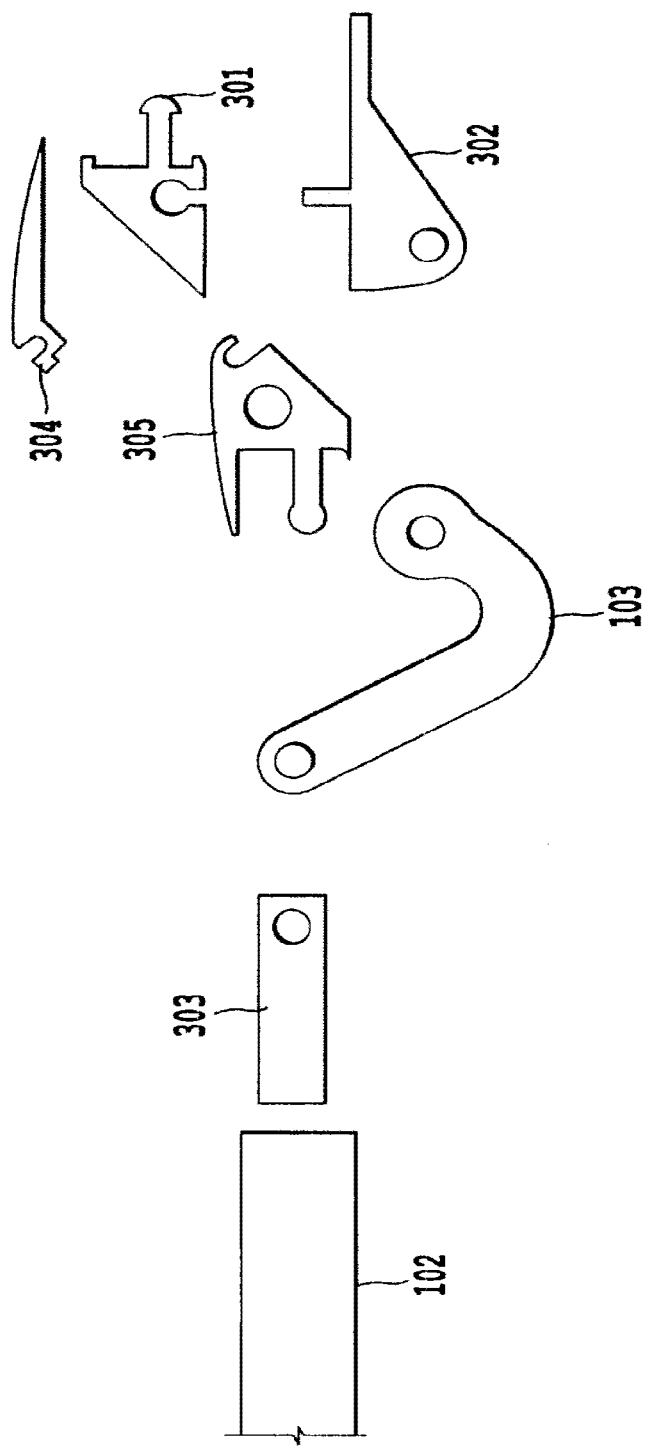
FIG. 6 depicts a portion of the assembly of an exemplary embodiment.
Figure 7A:
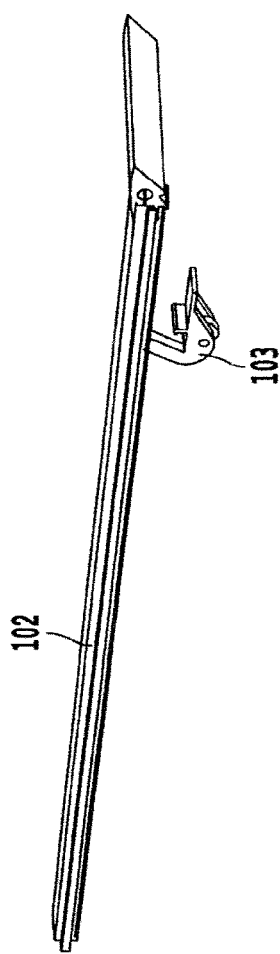
FIGS. 7A-C depict isometric views of a portion of the assembly of an exemplary embodiment.
Figure 7B:
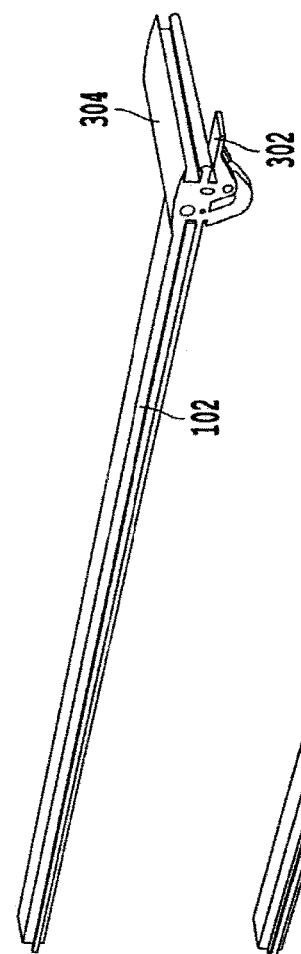
Figure 7C:
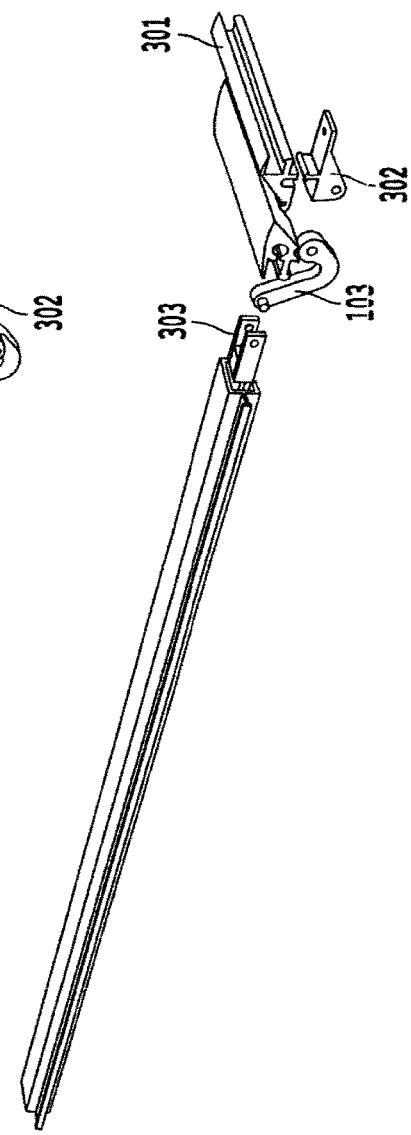
Figure 12:
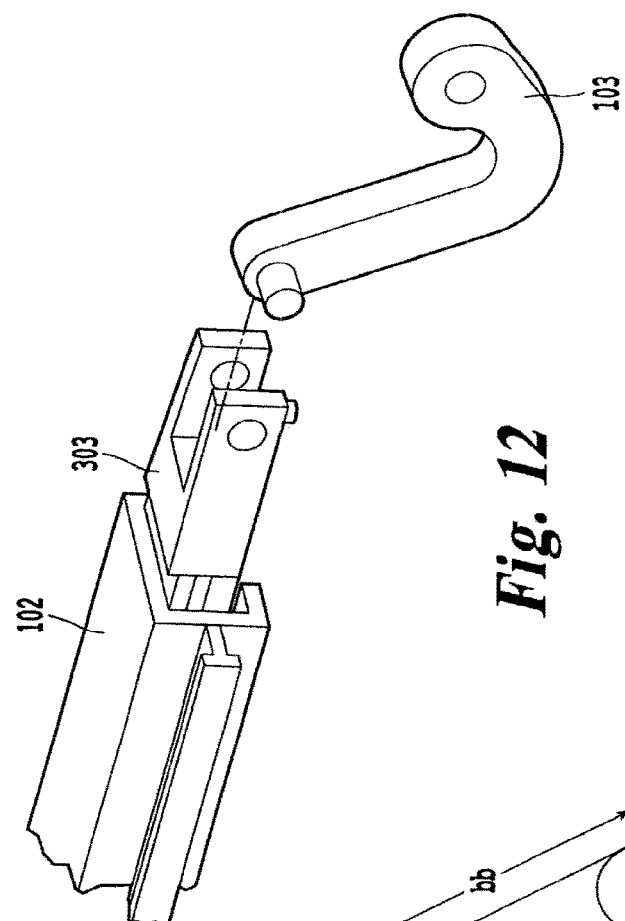
FIG. 12 depicts an isometric view of an assembly of an exemplary embodiment.
Figure 14A:
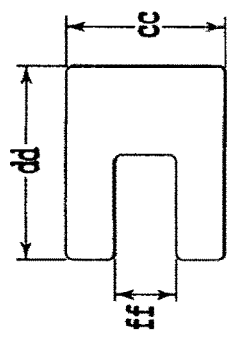
FIGS. 14A-B depict schematic views of a slide of an exemplary embodiment.
Figure 14B:
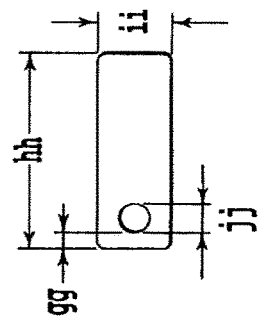

FIG. 6 displays some of the elements used to connect a C-track to a beam. Referring to the exemplary embodiment shown in FIG. 12, the slide fits within the C-bracket beam, and a pin of the J-bracket connects the J-bracket and the slide. The J-bracket (103) is attached to a slide (303) on one end, and to an inner end cap (305) at the other end, such that the J-bracket can pivot about the slide (303) as the slide moves along the C-track (102). Referring to the exemplary embodiment in FIGS. 14A-B, the slide element (303) has overall dimensions dd, ee and ii, with a slot width ff, and through holes with a diameter jj, at a distance gg from the edge of the slide. In a preferred embodiment, dd is 1.5", ee is 1.13", ii is 0.48", ff is 0.44", jj is 0.22" and gg is 0.13". In alternative embodiments, dd is between 1.25" and 1.75", ee is between 1.1" and 1.5", ii is between 0.45" and 0.52", ff is between 0.4" and 0.5", jj is between 0.2" and 0.25" and gg is between 0.1" and 0.2".

Figure 15:
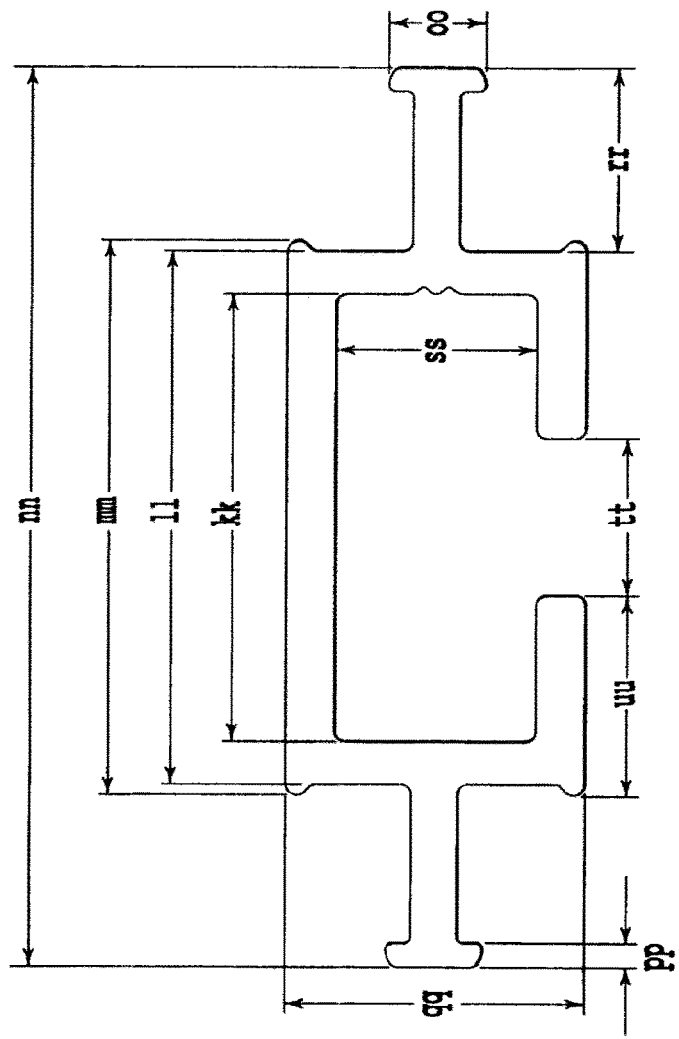
FIG. 15 depicts a schematic view of a C-track of an exemplary embodiment.

Referring to the exemplary embodiment shown in FIG. 15, the C-track beam (102) has overall dimensions qq and nn, with widths pp, uu, tt, ss, rr, kk, ll, mm, and nn, with a height oo. The C-track has inside radii R6, and outside radii R4 and R5. In a preferred embodiment, qq is 0.750", nn is 2.480", pp is 0.060", uu is 0.561", tt is 0.438", ss is 0.500", rr is 0.490", kk is 1.250", ll is 1.500", mm is 1.560" and nn is 2.480", with a height oo of 0.250". In this embodiment R6 is 0.031", R4 is 0.030" and R5 is 0.030". In alternative embodiments, qq is between 0.7" and 0.8", nn is between 2.4" and 2.51", pp is between 0.050" and 0.070", uu is between 0.55" and 0.57", tt is between 0.4" and 0.5", ss is between 0.45" and 0.55", rr is between 0.450" and 0.520", kk is between 1.2" and 1.3", ll is between 1.4" and 1.600", mm is between 1.5" and 1.6", and nn is between 2.4" and 2.5", with a height oo between 0.24" and 0.26". In these embodiments R6 is between 0.03" and 0.04", R4 is between 0.028" and 0.032" and R5 is between 0.028" and 0.032".

Figure 13:
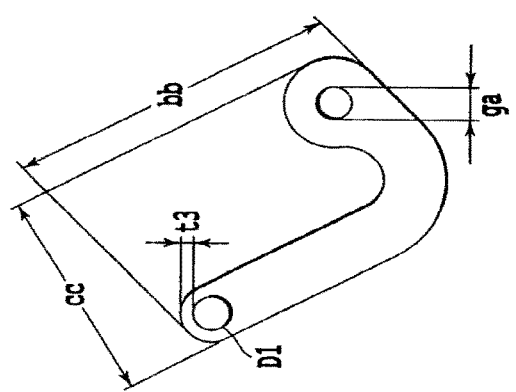
FIG. 13 depicts a schematic view of a J-bracket of an exemplary embodiment.

Referring to the exemplary embodiment of a J-bracket (103) shown in FIG. 13, the J-bracket has overall dimensions cc and bb, with a hole at one end with diameter aa, and a pin on its other end, with diameter D1, at a distance t3 from the edge of the J-bracket. In a preferred embodiment, cc is 1.50", bb is 2.27", aa is 0.25', D1 is 0.23" and t3 is 0.10". In alternative embodiments, cc is between 1.25" and 1.75", bb is between 2.2" and 2.3", aa is between 0.2" and 0.3", D1 is between 0.2" and 0.25", and t3 is between 0.05" and 0.15".

When transitioning between contracted and expanded configurations, the slide moves along the C-track, while the J-bracket can pivot about the slide, to lower or raise the outer floor portions.

As shown in FIG. 6, the inner end cap (305) is connected to the J-bracket (103), to the outer end cap (301), to the guide pad eye (302), and to an end cap toe guard (304). In an exemplary embodiment, the end cap toe guard provides a smooth transition between the raised central panel and the side panels when the boat is in a contracted configuration.

Figure 10:
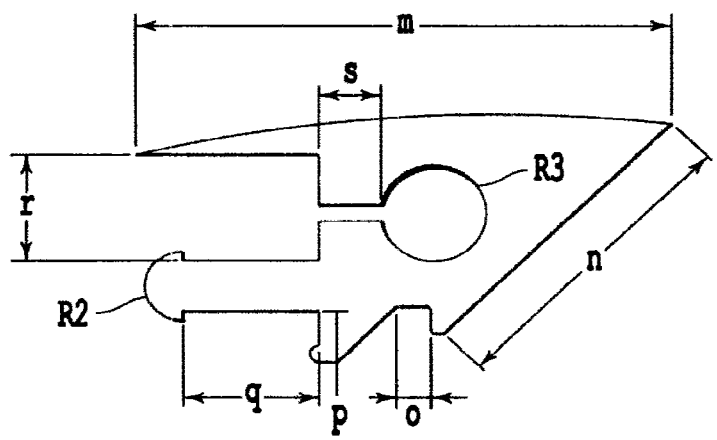
FIG. 10 depicts a schematic view of an inner end cap of an exemplary embodiment.

Referring to the exemplary embodiment shown in FIG. 10, an inner end cap (305) has width dimensions m, q, s and o, with height dimensions r and p. A central tab has a radius R2, and a central hole has a radius R3. In an exemplary embodiment the central hole is a cut-out of any shape, intended to reduce the amount of material and the associated weight of the part. The portion of the inner end cap which interfaces with the outer end cap has a length n. In a preferred embodiment, m is 1.743", q is 0.447", s is 0.205", and o is 0.102". Similarly, in a preferred embodiment, r is 0.381", p is 0.177", R2 is 0.125", and R3 is 0.170". In alternative embodiments, m is between 1.7" and 1.8", q is between 0.4" and 0.5", s is between 0.2" and 0.21", and o is between 0.1" and 0.11". Similarly, in alternative embodiments, r is between 0.3" and 0.4", p is between 0.15" and 0.2", R2 is between 0.12" and 0.13", and R3 is between 0.16" and 0.18".

Figure 9:
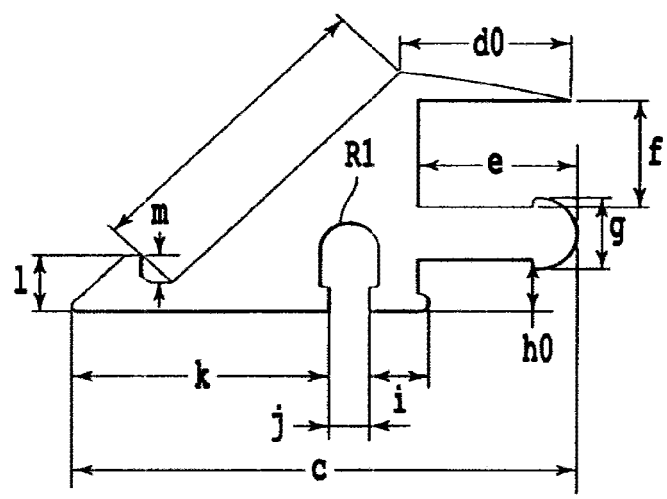
FIG. 9 depicts a schematic view of an outer end cap of an exemplary embodiment.

Referring to the exemplary embodiment shown in FIG. 9, an outer end cap (301) has width dimensions e, i, j, k, and d0, with an overall width c; and height dimensions g, f, h0, l and m. The portion of the outer end cap which interfaces with the inner end cap has a length n. The slot which interfaces with the guide pad eye has a radius R1. In a preferred embodiment, e is 0.50", i is 0.186", j is 0.135", k is 0.844", and d0 is 0.551", while c is 1.627". Similarly, in a preferred embodiment, g is 0.252", f is 0.384", h0 is 0.181", l is 0.200" and m is 0.100", with R1 0.097". In alternative embodiments, e is between 0.4" and 0.55", i is between 0.1" and 0.2", j is between 0.13" and 0.14", k is between 0.8" and 0.9", d0 is between 0.5" and 0.6", while c is between 1.5" and 1.7". Similarly, in alternative embodiments, g is between 0.2" and 0.3", f is between 0.3" and 0.4", h0 is between 0.1" and 0.2", l is between 0.15" and 0.25" and m is between 0.09" and 0.11", with R1 between 0.095" and 0.099".

Figure 11B:
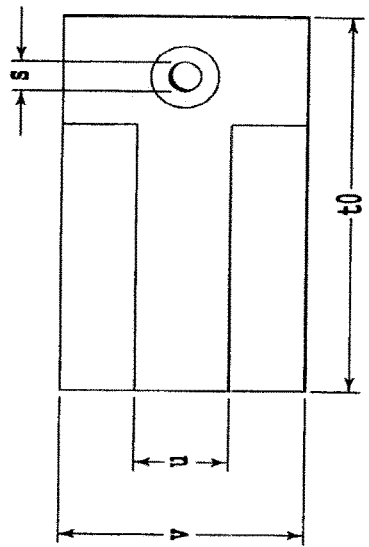
FIGS. 11A-C depict schematic views of a guide pad eye of an exemplary embodiment.
Figure 11C:
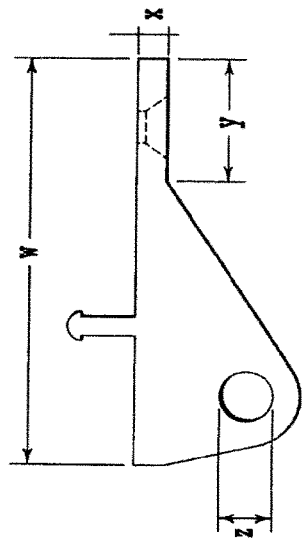
Figure 11A:
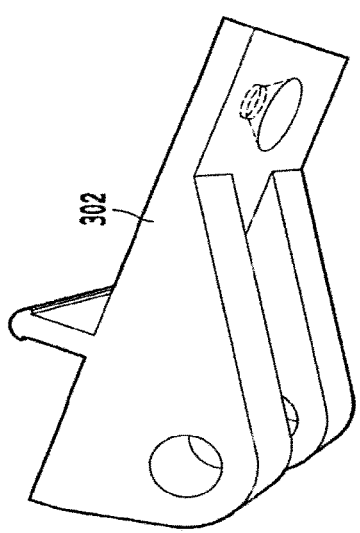

Referring to the exemplary embodiment shown in FIGS. 11A-C, the guide pad eye (302) has overall dimensions v and w, with a slot width u, pin diameter s, plate thickness x, hole diameter z, and overhang length y. In a preferred embodiment, v is 1.13", w is 2.04", u is 0.44", s is 0.16", z is 0.25", x is 0.13" and y is 0.61". In alternative embodiments, v is between 1.1" and 1.15", w is between 2" and 2.1", u is between 0.4" and 0.5", s is between 0.14" and 0.18", z is between 0.23" and 0.27", x is between 0.11" and 0.15", and y is between 0.59" and 0.63".

Figure 21A:
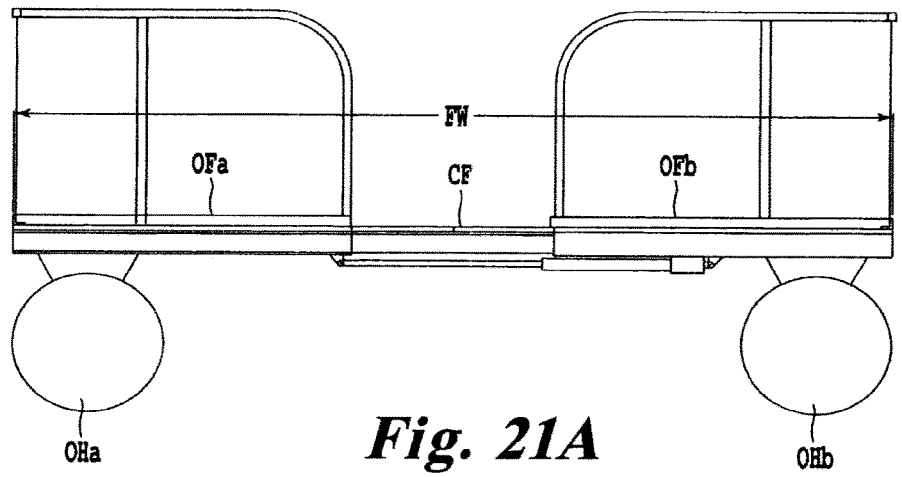
FIGS. 21A-B depict expanded and contracted views of an exemplary embodiment.
Figure 21B:
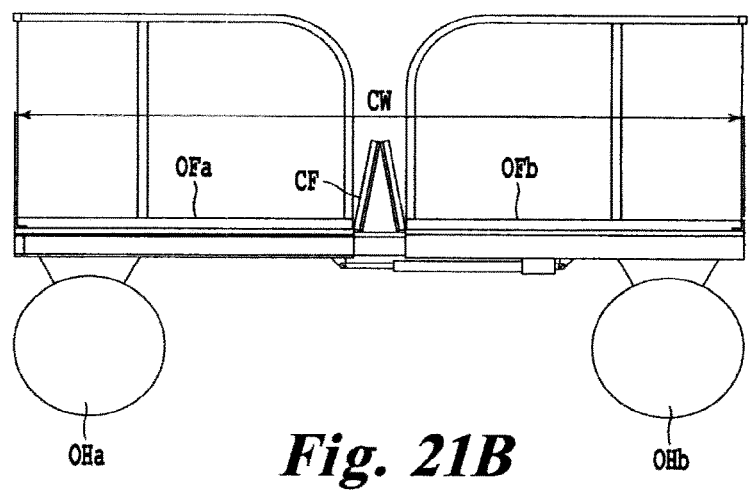

In an alternate embodiment, as shown in FIGS. 21A-B, the central panel (CF) includes a central hinge. Accordingly, in the contracted configuration, as shown in FIG. 21B, the central panel folds up. In exemplary embodiments, in the contracted configuration, the folded central panel is 15" in height, and between 2 and 2.5" wide. In alternative embodiments, the central panel includes two hinges, and folds up as a tripartite panel. In alternative embodiments, the central panel folds down below the main deck surface.

Figure 22A:
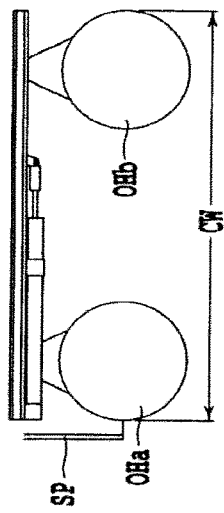
FIGS. 22A-B depict expanded and contracted views of an exemplary embodiment.
Figure 22B:
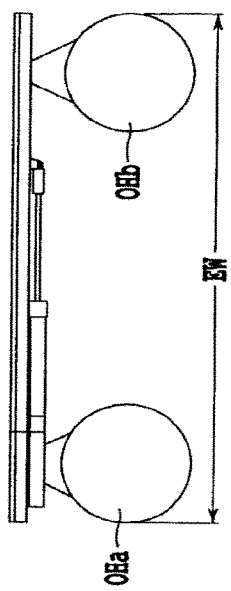

In an alternate embodiment, as shown in FIGS. 22A-B, an expanding and contracting mechanism includes a rod (100) and a sprocket or gear (200), with the central panel which in the contracted position overlaps at least one side panel. In another embodiment, the central panel may also include hinges.

Figure 23A:
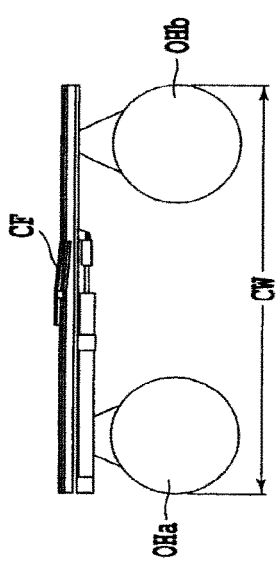
FIGS. 23A-B depict expanded and contracted views of an exemplary embodiment.
Figure 23B:
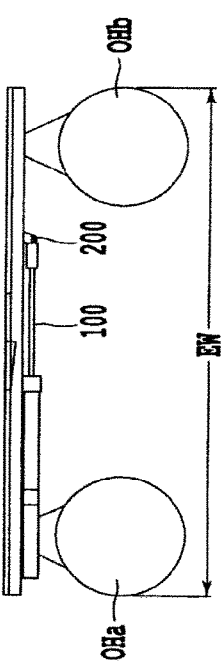

In an alternate embodiment, as shown in FIGS. 23A-B, a rod (100) and a sprocket or gear (200) drive the expansion and contraction, with a side panel (SP) which is located at an edge of the boat deck. In an exemplary embodiment, the side panel (SP) is hinged, and in the contracted position, as shown in FIG. 23A, rests vertically at an edge of the boat deck. In an exemplary embodiment, as shown in FIG. 23B, under the action of the rod and sprocket mechanism, the side panel is moved from a vertical to a horizontal position.

Figure 24A:
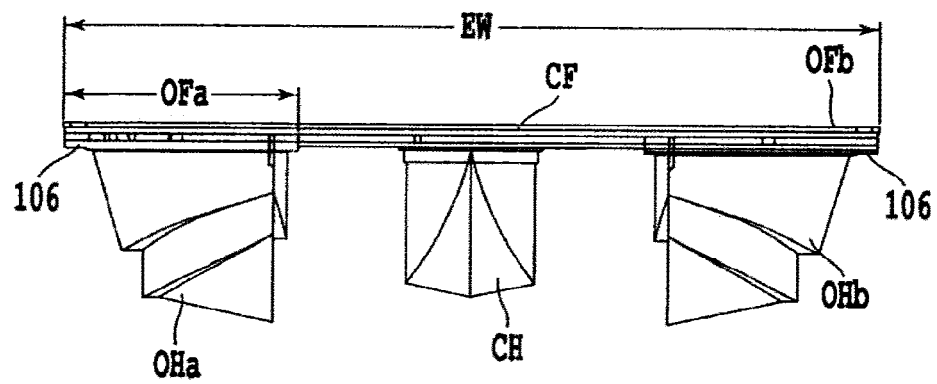
FIGS. 24A-E depict an expanded cross-sectional view, a contracted cross-sectional view, and a side view of an exemplary embodiment.
Figure 24B:
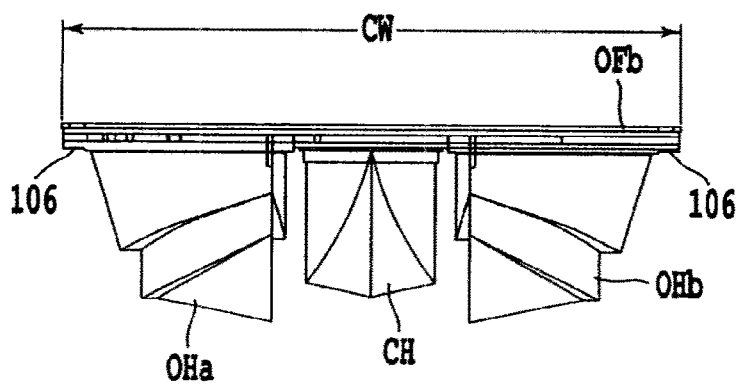
Figure 24C:
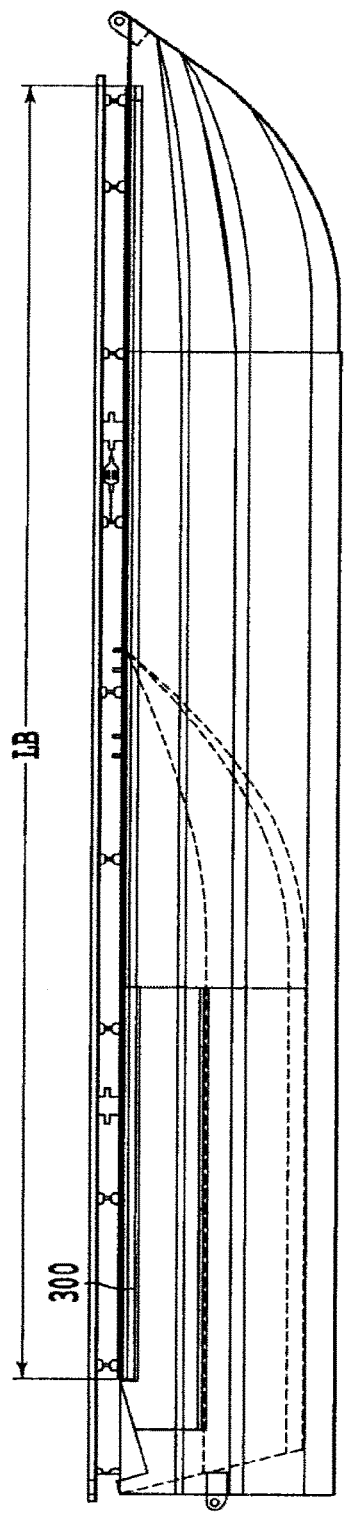
Figure 24D:
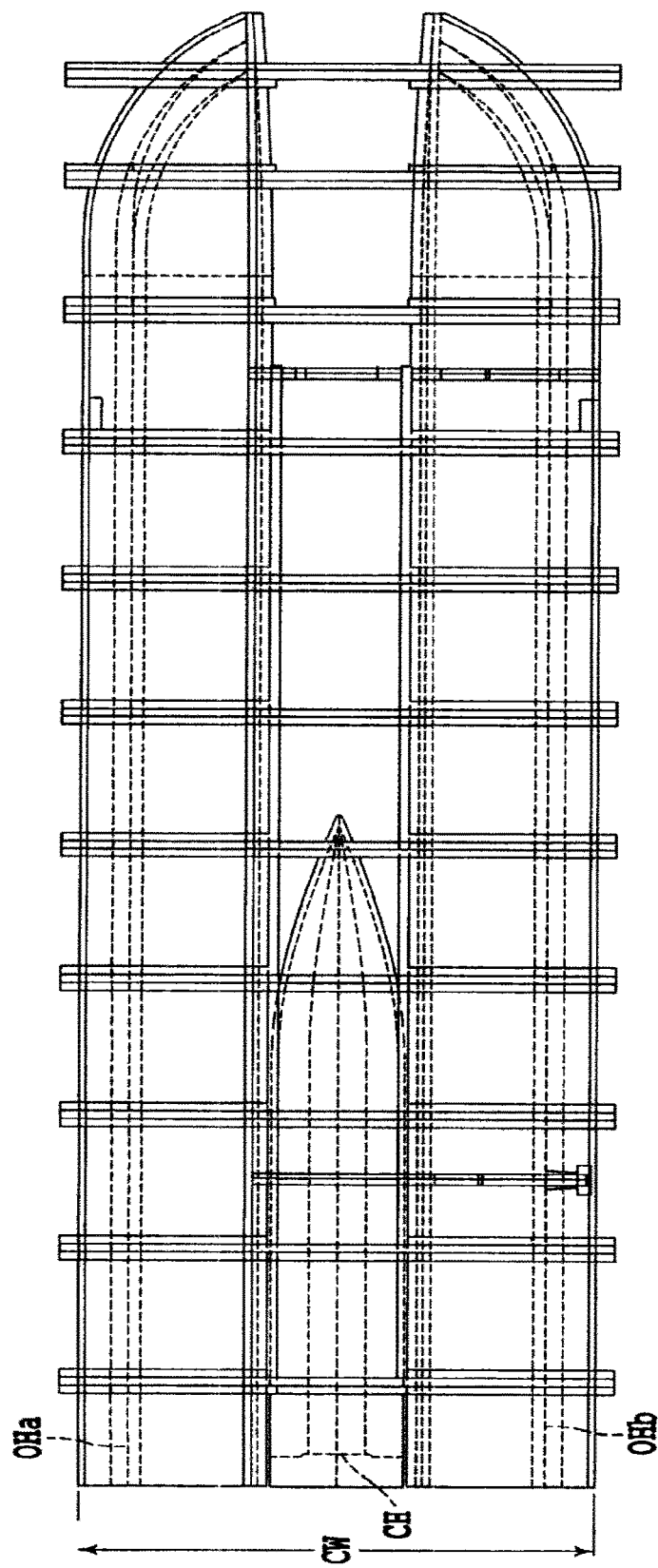
Figure 24E:
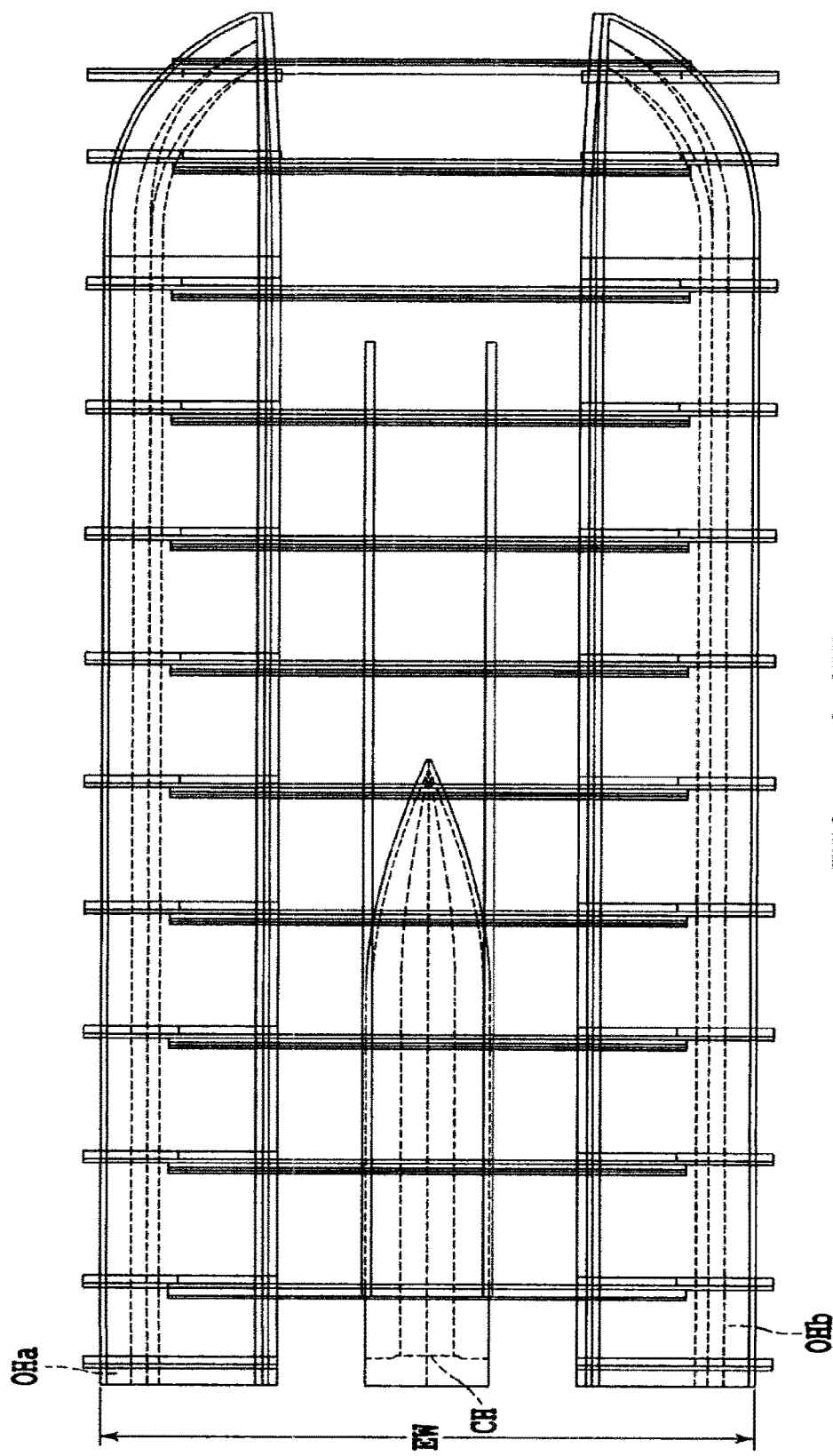

In an alternate embodiment, as shown in FIGS. 24A-C, a trimaran is fitted with any of the above-mentioned expanding and contracting systems. In an exemplary embodiment, the boat has a contracted width of 90" and an expanded width of 120". In an exemplary embodiment, a central beam (300) acts as a backbone, tying all central beams together. In an exemplary embodiment, the central beam (300) is a 1" by 2" by ¼" beam with a length of 184" along the longitudinal direction of the boat. In an exemplary embodiment, each outer hull is attached to a beam (106), while the central hull is attached to a C-track type beam (102). In an exemplary embodiment, beams (106) have a length of 34", and the C-track beam (102) has a length of 90", transverse to the longitudinal direction of the boat. In an expanded configuration, the outer hulls (OHa, Ohb) move inward towards the central hull (CH) as the beams (106) slide along the c-track type beam (102), while the side panels OFa and Ofb are raised and slide over the central panel (CF). In alternative embodiments, the side panels are lowered and slide under the central panel (CF). In alternative embodiments, panels of the boat deck are otherwise adjusted to reduce the width of the boat deck from the expanded to the contracted configuration.

Figure 25A:
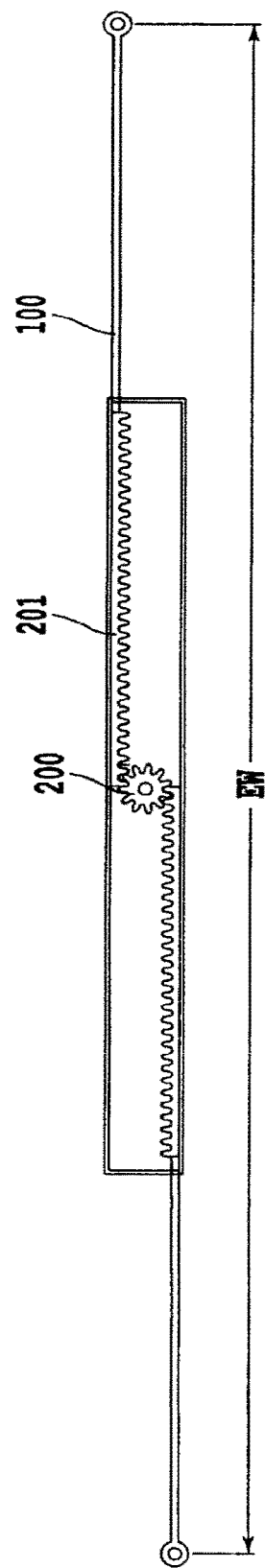
FIGS. 25A-B depict expanded and contracted views of an exemplary embodiment.
Figure 25B:
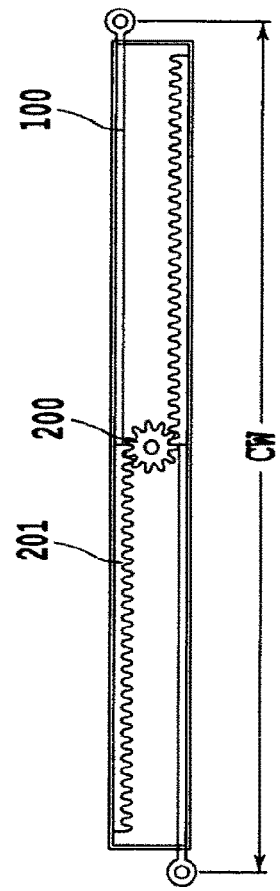

In an alternate embodiment, as shown in FIGS. 25A-B, the expansion and contraction of the boat floor is obtained with a gear and geared rail mechanism. In this exemplary embodiment, a gear (200) is located between upper and lower rods (100) which have a portion including a geared rail (201). As the geared rails move over the gear (200), the boat floor transitions from an expanded width (EW) to a contracted width (CW) as shown in FIGS. 25A and 25B. In an exemplary embodiment, the expanded width is 63" while the contracted width is 33".

In an alternate embodiment, a boat has a single floor panel, with hulls which are attached to a contracting and expanding mechanism, such that the distance between the hulls can be reduced to fit onto a trailer, and increased when the boat is used, but the overall dimensions of the floor panel remain constant. In an exemplary embodiment, a gear and geared rail system, such as the one shown in FIGS. 25A and B, are used to move the hulls. In alternate embodiments, any of the above-described expansion and contraction mechanisms can be used to move the hulls from an expanded to a contracted configuration.

Referring now to FIGS. 24, 26-28, 30, and 31, embodiments of various space-saving hulls and boats having space-saving hulls are shown. A space-saving hull in accordance with an embodiment may be used in a boat having a fixed width, such as a sailboat, a pontoon boat, or a barge, for example. A space-saving hull in accordance with an embodiment alternatively may be used in any of the expandable and contractible boats and boat floors discussed herein.

FIGS. 26A-E correspond to FIGS. 24A-E, showing an embodiment including a first space-saving hull shape. Referring to FIGS. 27A-E, these figures show an embodiment including a second space-saving hull shape.

Any of the space-saving hull shapes discussed herein, may have an advantage of fitting between the wheels of a boat trailer and having a small overall height on the trailer, while still providing a large, wide floor surface and desirable displacement characteristics as compared to a circular or other hull shape. In particular, space-saving hulls as shown in any of FIGS. 24A-E, 26A-E, 27A-E, 28, 30, and 31A-F may provide a cross section having a wider top portion and a narrower bottom portion than existing pontoon boat hull designs.

Moreover, space-saving hulls in accordance with various embodiments may have the advantages of reduced drag, a smoother ride, improved handling, higher boat speeds at lower engine speeds, and reduced fuel consumption.

Figure 26A:
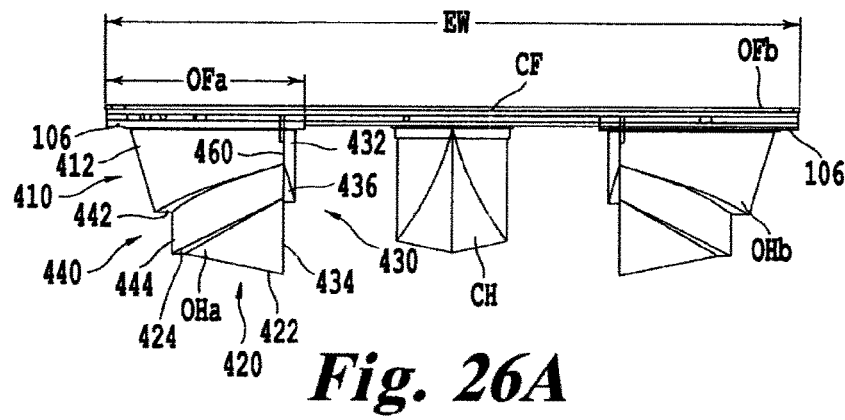
Figure 27A:
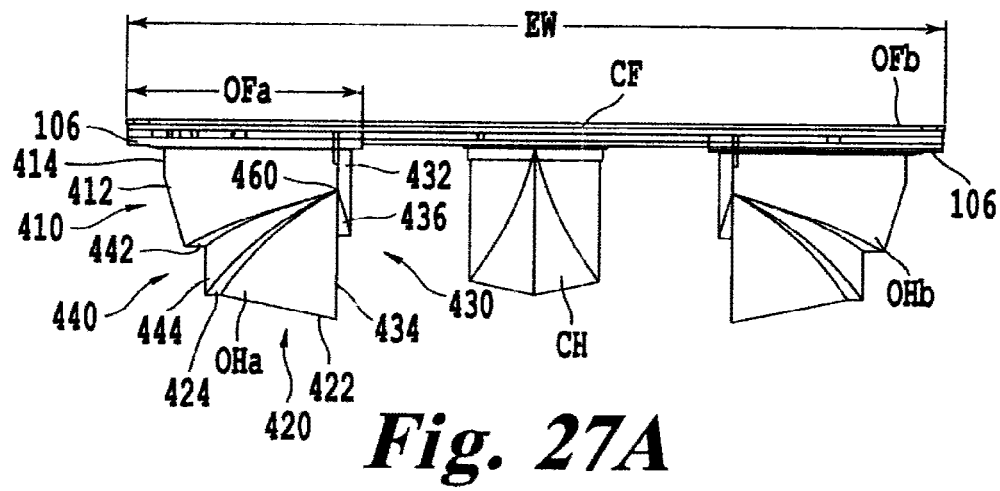
FIG. 27A-E depict expanded and contracted views of an exemplary embodiment.

Referring now to FIGS. 26A and 27A, outer hulls OHa, OHb are connected to a floor having one or more panels OFa, OFb, CF. The outer hulls OHa, OHb are arranged in parallel along a bow to stern axis. Each of the outer hulls OHa, OHb includes an outboard side portion 410, a bottom portion 420, an inboard side portion 430, and a concave chine portion 440 that connects the outboard side portion 410 with the bottom portion 420.

Still referring to FIGS. 26A and 27A, in some embodiments, the bottom portion 420 slopes upward toward the outboard side portion 410. In some embodiments, the inboard side portion 430 is oriented substantially vertically, abutting the bottom portion, and connected to the bottom portion.

Still referring to FIGS. 26A and 27A, in some embodiments, the concave chine portion 440 includes an upper chine panel 442 and a lower chine panel 444. In some embodiments, the upper chine panel 442 has the form of a substantially flat panel that curves upward in a bow portion 460 of the boat and the lower chine panel 444 has the form of a substantially flat panel that curves upward in the bow portion 460 of the boat, as shown in FIGS. 26A-E and 27A-E. In other embodiments, the upper chine panel 442 and lower chine panel 444 of the concave chine portion 440 may have arcuate or curved shapes.

In some embodiments, as shown in FIGS. 24, 26-28, 30, and 31, the upper chine panel 442 forms a right angle with the lower chine panel 444. In other embodiments, the upper chine panel 442 may form a different angle or angles with the lower chine panel 444. In still other embodiments, a transition between the upper chine panel 442 and the lower chine panel 444 may be smoothly blended.

In some embodiments, as shown in FIGS. 24, 26-28, 30, and 31, the bottom portion 420 of each of the outer hulls OHa, OHb includes a bottom panel 422 and an outboard strake panel 424 connected to the bottom panel 422 and to the concave chine portion 440. Advantageously, the outboard strake panel 424 of each of the outer hulls OHa, OHb may channel water smoothly under each of the outer hulls OHa, OHb. This may result in improved performance, reduced splashing, and a smoother ride.

In some embodiments, as shown in FIGS. 24, 26-28, 30, and 31, the bottom portion 420 forms a right angle with the concave chine portion 440. In some embodiments, as shown in FIGS. 24, 26-28, 30, and 31, the outboard strake panel 424 forms a right angle with the lower chine panel 444. In other embodiments, the bottom portion 420 may form a different angle or angles with the concave chine portion 440.

In some embodiments, as shown in FIGS. 24, 26-28, 30, and 31, the inboard side portion 430 includes an upper inboard side panel 432, a lower inboard side panel 434, and an inboard strake panel 436 that connects the lower inboard side panel with the upper inboard side panel 432. In some embodiments, as shown in FIGS. 24, 26-28, 30, and 31, the inboard strake panel 436 is situated at essentially the same elevation as the concave chine portion 440, while in other embodiments they may be situated at different elevations.

In various embodiments, as shown in FIGS. 24, 26-28, 30, and 31, the inboard strake panel 436 of each of the outer hulls OHa, OHb has an essentially flat profile and is oriented substantially horizontally and curves upward in the bow portion 460 of the boat. Advantageously, the inboard strake panel 436 of each of the outer hulls OHa, OHb may channel water smoothly under each of the outer hulls OHa, OHb. This may result in improved performance, reduced splashing, and a smoother ride.

Figure 30:
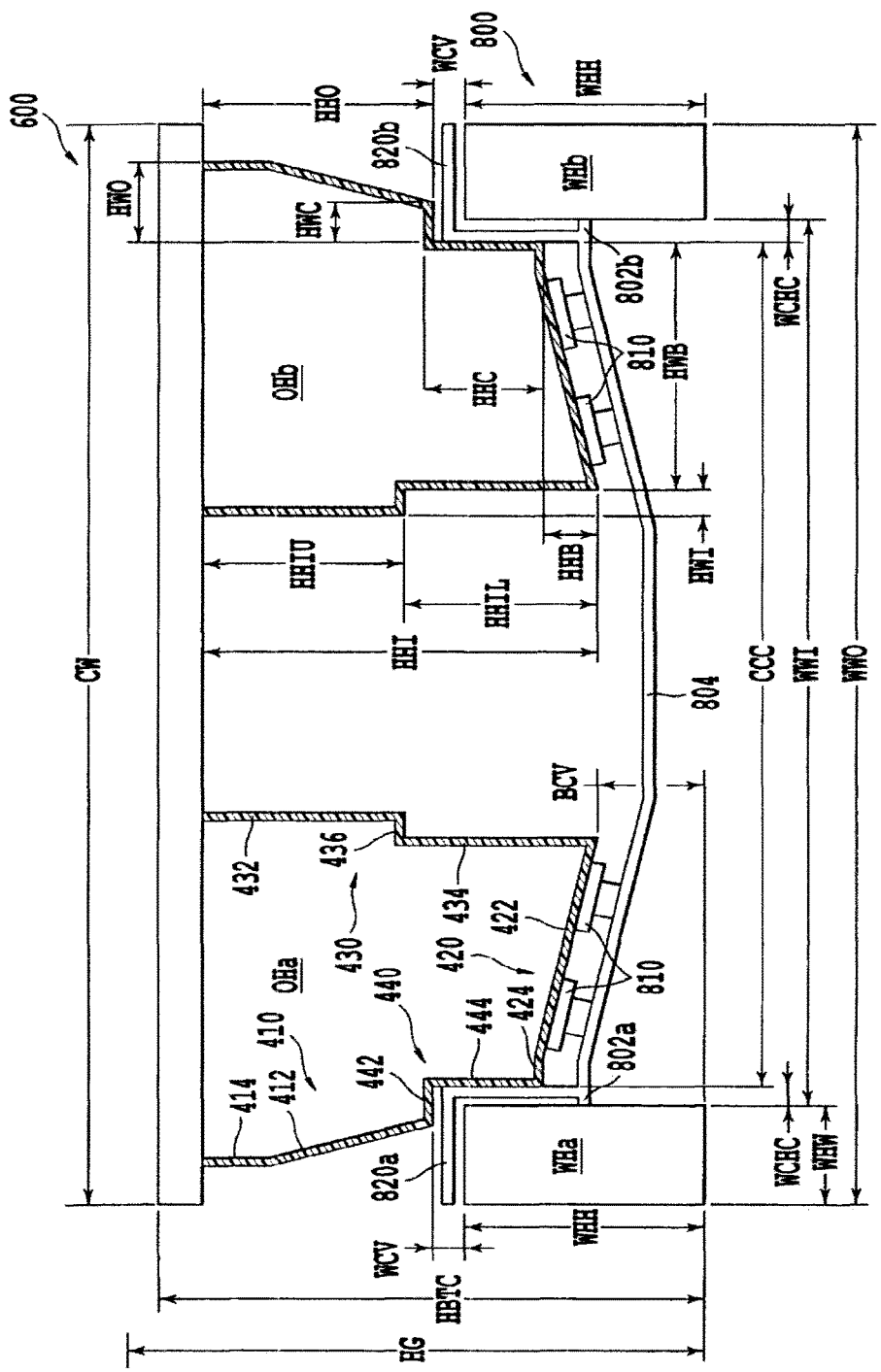
FIG. 30 depicts a cross-sectional view of an exemplary embodiment.

In some embodiments, as shown in FIGS. 24 and 26, the outboard side portion 410 includes an outboard side panel 412. In other embodiments, as shown in FIGS. 27, 28, and 30, the outboard side portion includes an upper outboard side panel 414 that connects the outboard side panel 410 to the floor of the boat, for example, via one or more beams.

Figure 26B:
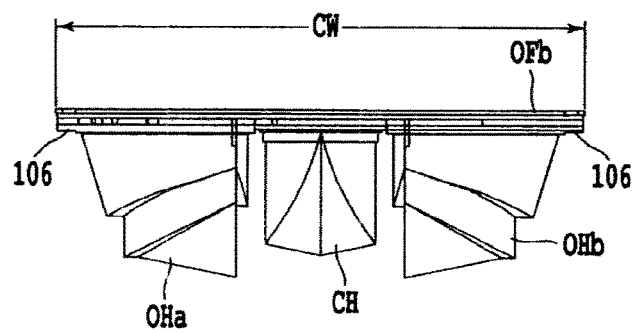
Figure 26C:
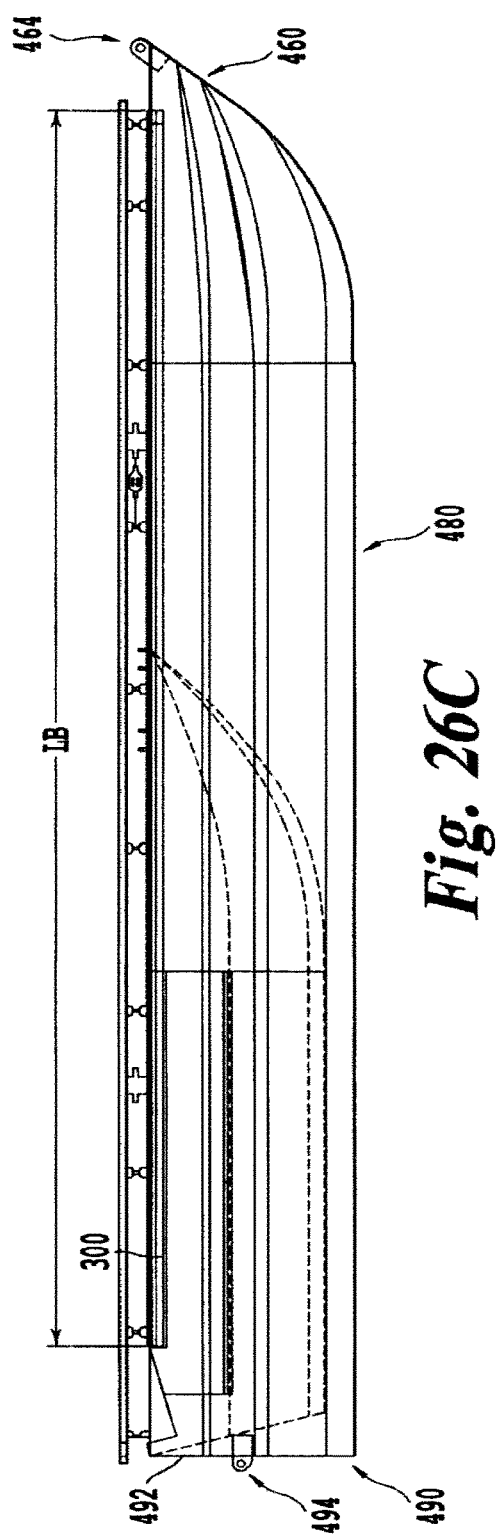
Figure 26D:
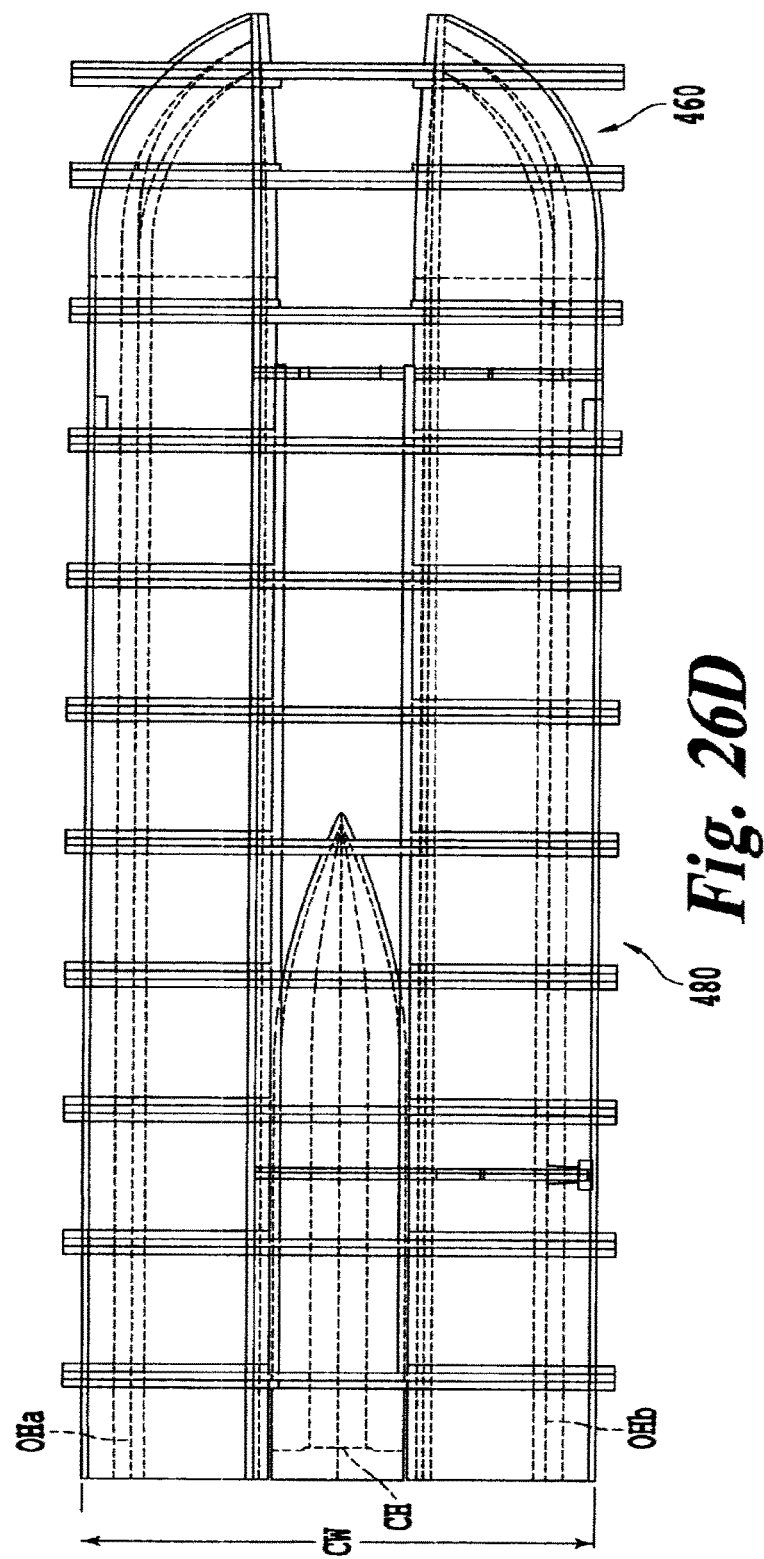
Figure 27B:
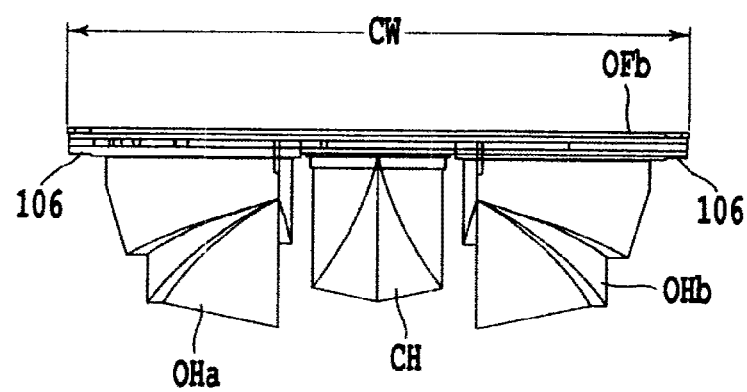
Figure 27C:
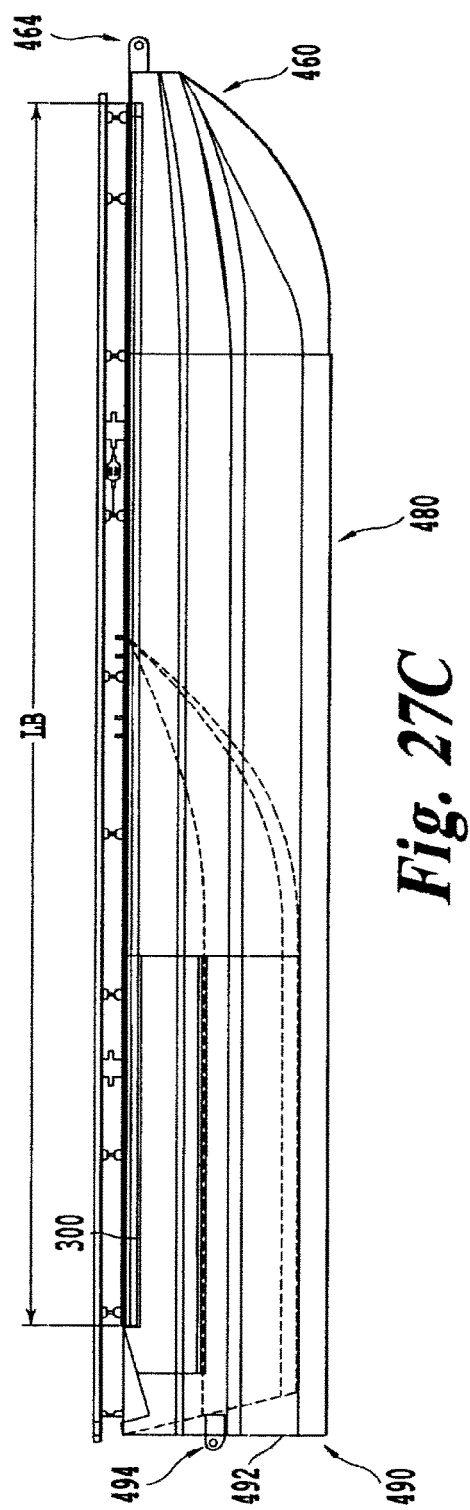
Figure 27D:
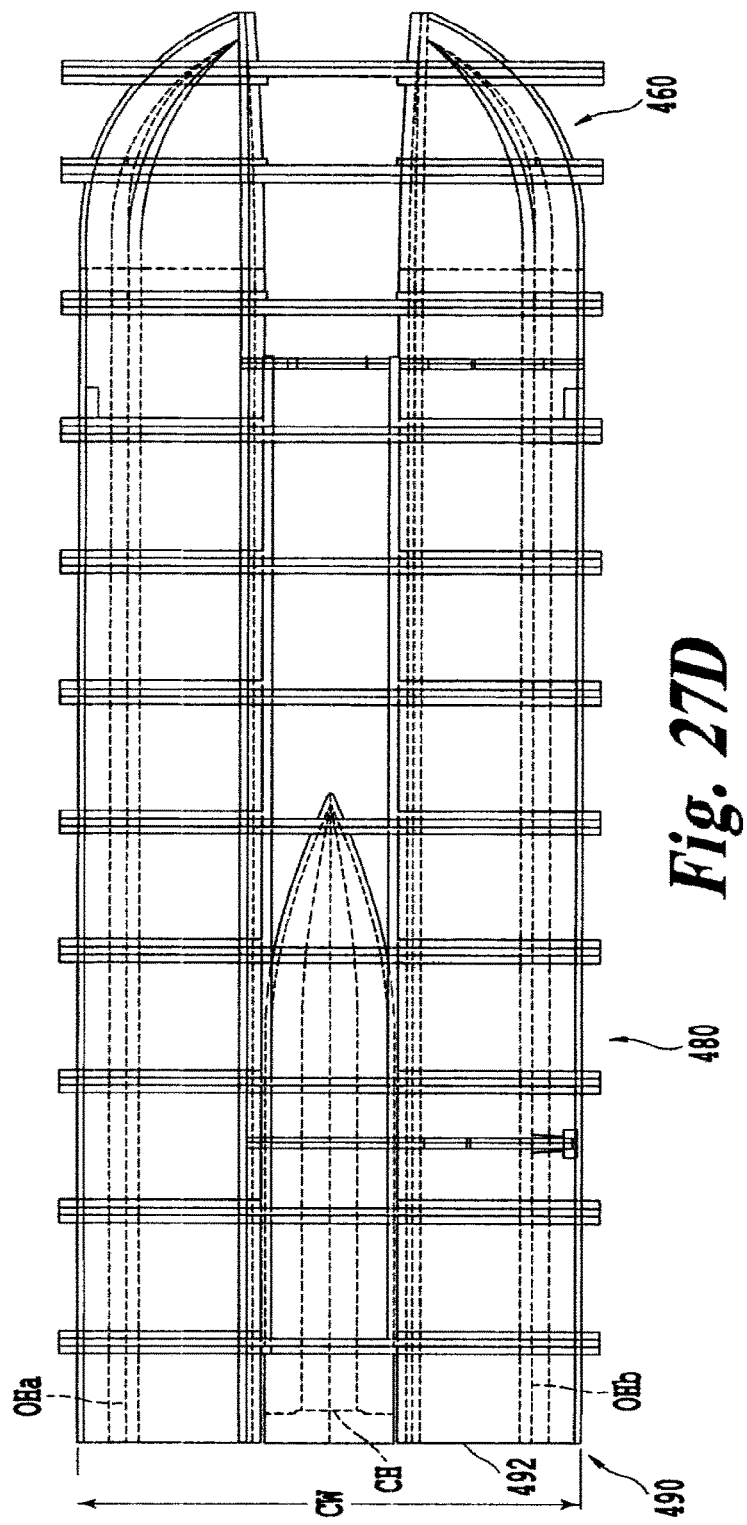
Figure 27E:
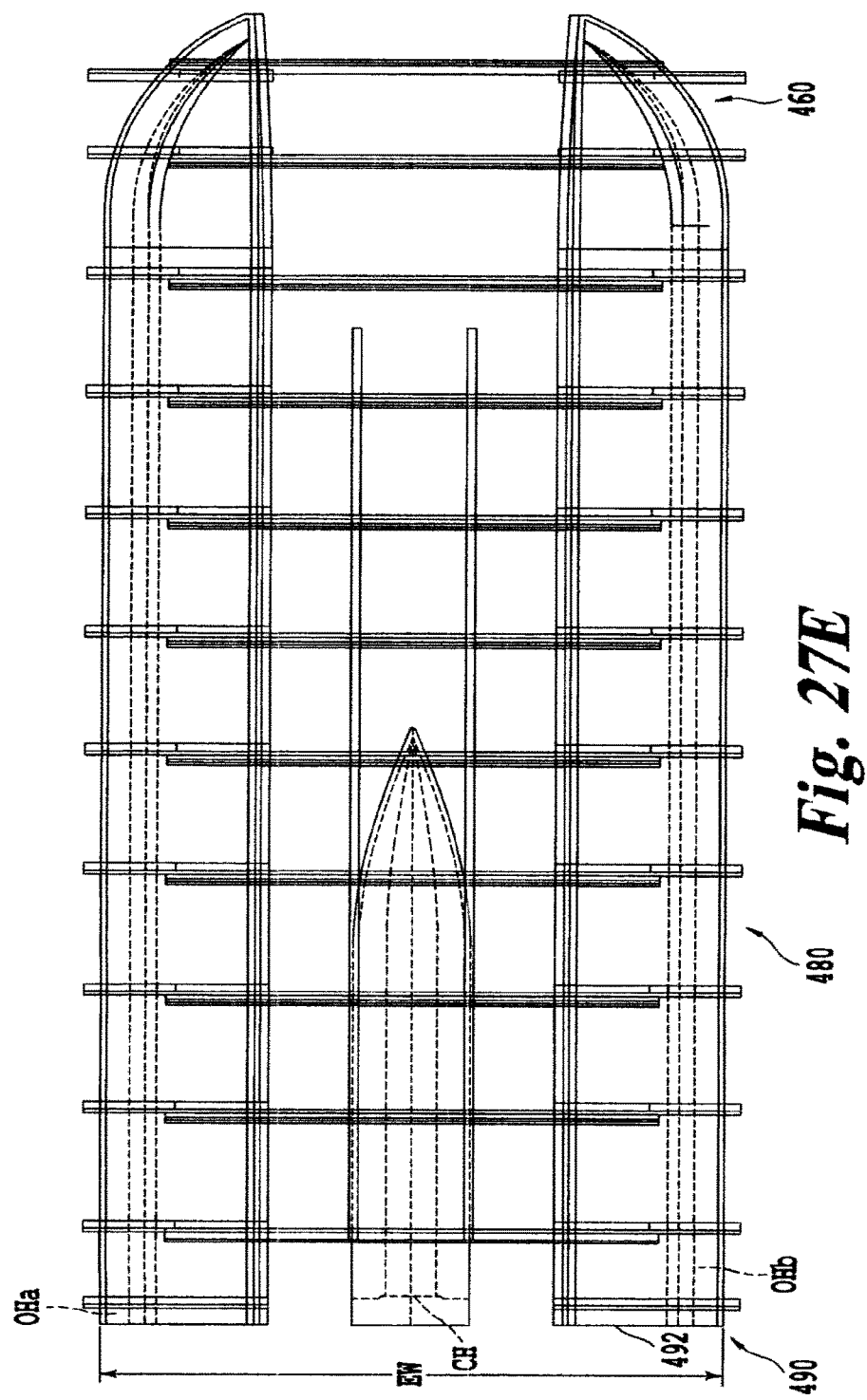
Figure 28:
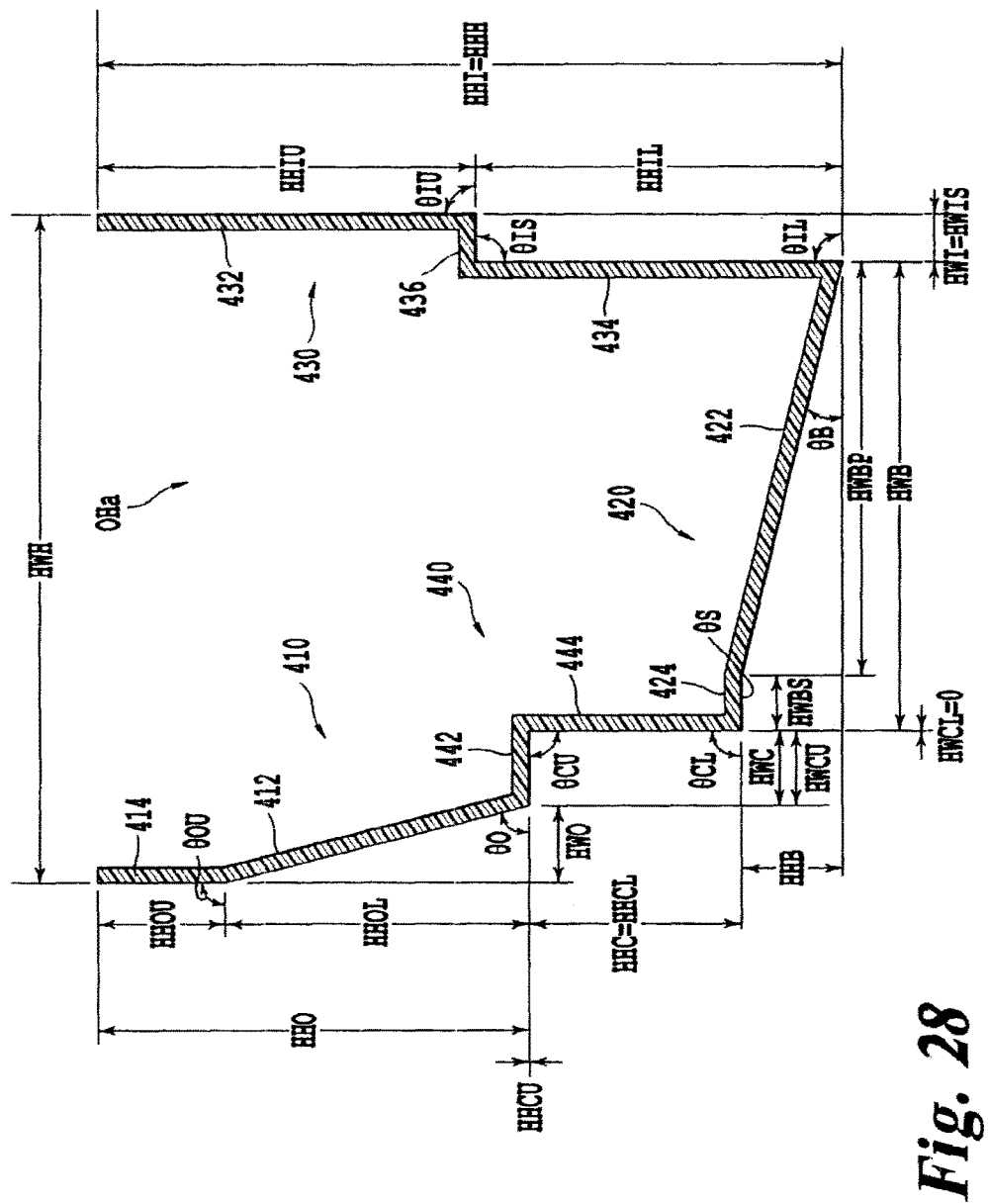
FIG. 28 depicts a cutaway section view of an outer hull in accordance with an embodiment.

Referring to FIGS. 26B and 27B, some embodiments including a space-saving hull shape expand and contract between the expanded width EW shown in FIGS. 26A and 27A and the contracted width CW shown in FIGS. 26B and 27B.

Referring to FIGS. 26A-E and 27A-E, some embodiments include the bow portion 460, in which the outboard side portion 410, the concave chine portion 440, the bottom portion 420, and the inboard side portion 430 may curve so as to converge at a common planar surface. In some embodiments, the common planar surface of the bow portion 460 is substantially co-planar with the lower inboard side panel 434, as shown in FIGS. 24, 26, and 27. In still other embodiments, the bow portion 460 includes a common point on which the concave chine portion 440 and the bottom portion 420 converge, as shown in FIG. 27A-E. In some embodiments, the bow portion 460 include an eye portion 464.

Referring to FIGS. 26C-E and FIGS. 27C-E, each of the outer hulls OHa, OHb includes a middle portion 480 rearward of the bow portion 460, and a stern portion 490 rearward of the middle portion 480. In some embodiments, the middle portion 480 has a substantially constant cross-sectional profile between the bow portion 460 and the stern portion 490. In other embodiments (not shown) the cross-sectional profile of the middle portion 480 may vary between the bow portion 460 and the stern portion 490.

In some embodiments, the stern portion 490 has a substantially flat transom portion 492. In other embodiments (not shown) the stern portion may have a different shape. In some embodiments, the stern portion 490 includes a stern eye portion 494.

In accordance with some embodiments, the outer hulls OHa, OHb are constructed of a metal such as aluminum. In other embodiments, the outer hulls OHa, OHb may be constructed of another material such as fiberglass. In the case of aluminum construction, the various portions of the outer hulls OHa, OHb may be formed and rolled from flat sheets, which are welded together. The outer hulls OHa, OHb may include internal structural components forming bulkheads, stringers, and other reinforcing features to give strength and resiliency to the outer hulls OHa, OHb.

Referring now to FIG. 28, a front cross-sectional view of a middle portion 480 of a single outer hull OHa is shown. In various embodiments, the outer hull OHa is substantially symmetrical with the outer hull OHb. Accordingly, the same discussion with respect to the outer hull OHa shown in FIG. 28 may apply to an outer hull OHb. As already discussed above, the outer hull OHa in accordance with an embodiment includes an outboard side portion 410, a bottom portion 420, an inboard side portion 430, and a concave chine portion 440 that connects the outboard side portion 410 with the bottom portion 420.

Still referring to FIG. 28, in an embodiment, the outboard side portion 410 includes an outboard side panel 412 and an upper outboard side panel 414. In an embodiment, the concave chine portion 440 includes an upper chine panel 442 and a lower chine panel 444. In an embodiment, the bottom portion 420 includes a bottom panel 422 and an outboard strake panel 424. In an embodiment, the inboard side portion 430 includes an upper inboard side panel 432, a lower inboard side panel 434, and an inboard strake panel 436.

Still referring to FIG. 28, in an embodiment, the outer hull OHa has an overall width HWH and an overall height HHH. In various embodiments, the overall width HWH is equal to the sum of a width HWO of the outboard side portion 410, a width HWC of the chine portion 440, a width HWB of the bottom portion 420, and a width HWI of the inboard side portion 430. In some embodiments, the width HWB is equal to the sum of a width HWBS of the outboard strake panel 424 and a width HWBP of the bottom panel 422. In some embodiments, the width HWI is equal to a width HWIS of the inboard strake panel 436. In some embodiments, the width HWCL of the lower chine portion is zero, while in other embodiments, the width HWCL of the lower chine portion may be non-zero, Still referring to FIG. 28, in various embodiments, the overall height HHH is equal to the sum of a height HHB of the bottom portion 420, a height HHC of the concave chine portion 440, and a height HIM of the outboard side portion 410. In some embodiments, the overall height HHH is equal to a height HHI of the inboard side portion 430. In some embodiments, the overall height HHH is equal to the sum of a height HHIU of the upper inboard side panel 432 and the height HHIL of the lower inboard side panel 434. In some embodiments, the height HHC is equal to a height HHCL of the lower chine panel 444. In other embodiments, the height HHC of the chine portion 444 is equal to the sum of the height HHCL of the lower chine panel 444 and a height HHCU of the upper chine panel 442. As shown in FIG. 28, HHCU in some embodiments is zero, while in other embodiments, the height HHCU of the upper chine panel may be non-zero.

In various embodiments, HWH is between 27" and 30", HWO is between 1.5 and 4.5", HWC is between 3" and 5", HWB is between 18" and 26", HWBS is between 1" and 3", HWI is between 0" and 2", and HWIS is between 0" and 2". In various embodiments, HHH is between 20" and 30", HHI is between 20" and 30", HHB is between 2" and 8", HHC is between 6" and 9", HHCL is between 6" and 8", HHCU is between 0" and 1", HWCU is between 1" and 8", HWCL is between 0" and 1", HHO is between 6" and 16", HHIL is between 9" and 20", and HHIU is between 6" and 14".

In various embodiments, HWH is 28", HWO is 3", HWC is 3", HWB is 22.2", HWBS is 2", HWI is 1", and HWIS is 1". In an embodiment, HHH is 22", HHI is 22", HHB is 4.5", HHC is 8", HHCL is 8", HHCU is 0", HWCU is 3", HWCL is 0", HHO is 12", HHIL is 12.5", and HHIU is 9.5".

Still referring to FIG. 28, in some embodiments, the lowest point on the outer hull OHa is at an intersection of the bottom portion 422 and the inboard side portion 430, and more specifically at the intersection of the bottom panel 422 with the lower inboard side panel 434. Advantageously, the inboard side portion 430 in some embodiments may have an essentially vertical profile, which may increase buoyancy while also maintaining a compact horizontal profile. The essentially vertical profile of the inboard side portion 430 in accordance with some embodiments may further improve boat handling under speed.

Still referring to FIG. 28, in some embodiments, the bottom portion 420 has a dead rise angle (an angle formed with the horizontal) θB of between 12 degrees and 26 degrees. In other embodiments, the bottom portion 420 may have a dead rise angle θB of between 14 degrees and 19 degrees. In an embodiment, θB is 14 degrees.

Still referring to FIG. 28, in some embodiments, the outboard strake panel 424 forms an angle θS of 0 degrees with the horizontal, being essentially horizontal. In other embodiments, the angle θS between the outboard strake panel 424 and the horizontal may have a value between 45 degrees and negative 45 degrees.

Still referring to FIG. 28, in some embodiments, the lower chine panel 444 forms an angle θCL of 90 degrees with the horizontal, being essentially vertical. In other embodiments, the angle θCL between the lower chine panel 444 and the horizontal may be between 75 degrees and 105 degrees. Advantageously, in accordance with some embodiments, the lower chine panel 444 having a steep angle relative to the horizontal may contribute to the concave shape of the concave chine portion 440, reducing the chine-to-chine width CCC shown in FIG. 30.

Still referring to FIG. 28, in some embodiments, the upper chine panel 442 forms an angle θCU of 90 degrees with the vertical, being essentially horizontal. In other embodiments, the angle θCU between the upper chine panel 442 and the horizontal may be between 85 degrees and 95 degrees. Advantageously, the upper chine panel 442 having a shallow angle relative to the horizontal may contribute to the concave shape of the concave chine portion 440, reducing the height HHCU of the upper chine panel and thereby allowing a hull in accordance with an embodiment to ride lower on a trailer.

Still referring to FIG. 28, in some embodiments, the outboard side panel 412 forms an angle θO of 76 degrees with the horizontal. In other embodiments, the angle θO between the outboard side panel 412 and the horizontal may be between 70 degrees and 90 degrees.

Still referring to FIG. 28, in some embodiments, the upper outboard side panel 414 forms an angle θOU of 90 degrees with the horizontal. In other embodiments, the angle θOU between the upper outboard side panel 414 and the horizontal may be between 85 degrees and 95 degrees.

Still referring to FIG. 28, in some embodiments, the lower inboard side panel 434 forms an angle θIL of 90 degrees with the horizontal, being essentially vertical. In other embodiments, the angle θIL between the lower inboard side panel 434 and the horizontal may be between 85 degrees and 95 degrees.

Still referring to FIG. 28, in some embodiments, the inboard strake panel 436 forms an angle θIS of 90 degrees with the vertical, being essentially horizontal. In other embodiments, the angle θIS between the inboard strake panel 436 and the horizontal may be between 85 degrees and 95 degrees.

Still referring to FIG. 28, in some embodiments, the upper inboard side panel 432 forms an angle θIU of 90 degrees with the horizontal, being essentially vertical. In other embodiments, the angle θIU between the upper inboard side panel 432 and the horizontal may be between 85 degrees and 95 degrees.

Figure 29:
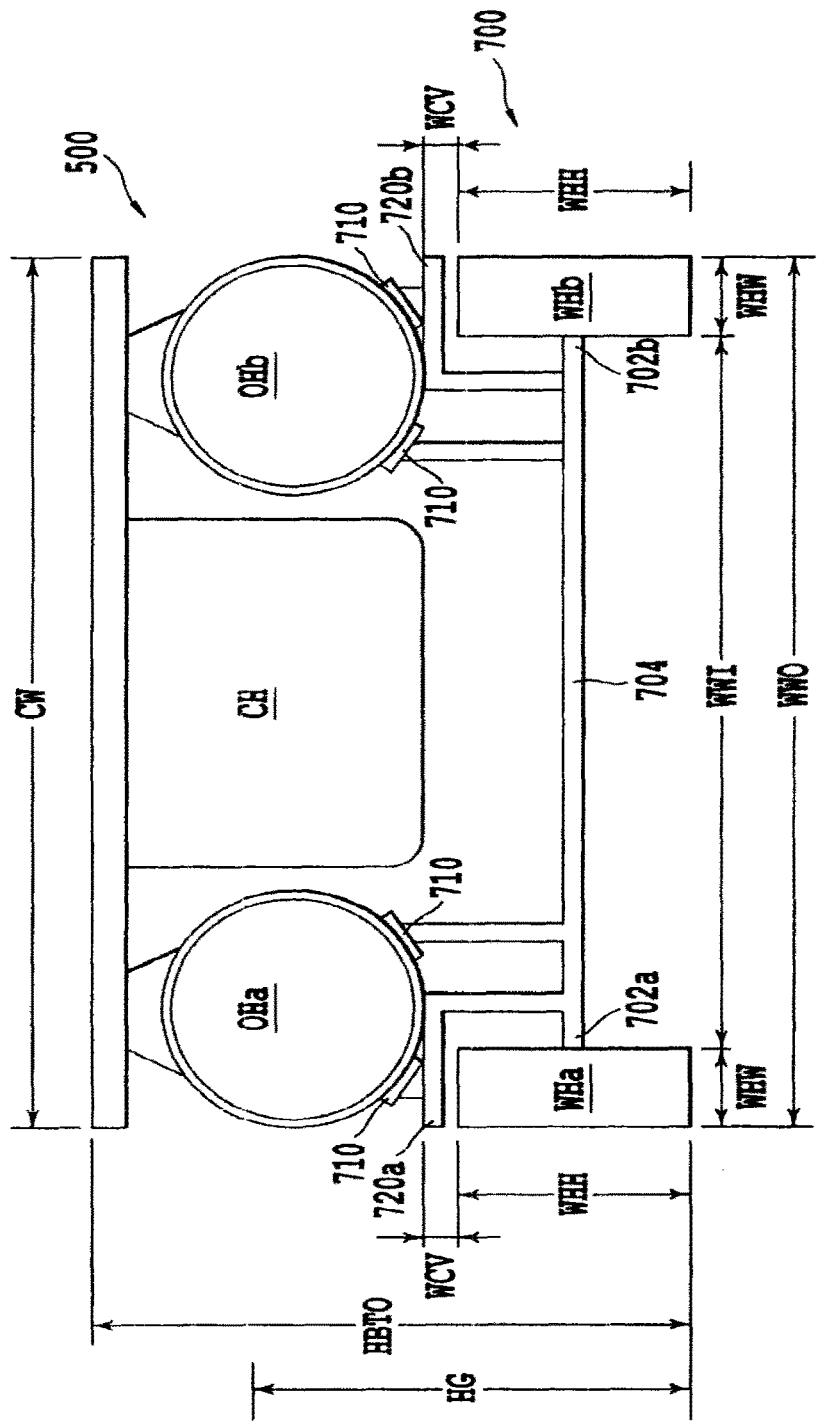
FIG. 29 depicts cross-sectional view of an exemplary embodiment.

Referring now to FIG. 29, a trailer 700 for a boat 500 has wheels WHa, WHb spaced apart and rotatably attached to a structural portion 704 of the trailer 700 by one or more axle portions 702a, 702b. The wheels WHa, WHb of the trailer 700 each have a wheel height WHH and a wheel width WHW. In various embodiments, WHH may be between 13" and 18" and WHW may be between 6" and 12". In an embodiment, WHH is 15" and WHW is 9".

Still referring to FIG. 29, inner edges of the wheels WHa, WHb of the trailer 700 are spaced apart a width WWI. Outer edges of the wheels WHa, WHb are spaced apart a width WWO. In various embodiments, the overall width of the trailer 700 may correspond to this width WWO. In various embodiments, WWI may be between 60" and 108". In an embodiment, the width WWI is 72". In various embodiments, WWO may be between 72" and 120". In an embodiment, the width WWO is 102".

Still referring to FIG. 29, a boat 500 has outer hulls OHa, OHb and a central hull CH connected to a floor. The boat 500 has a width CW, equal to the contracted width discussed above. The boat may have circular or elliptical hulls. The combination of the boat and the trailer 700 when the boat is resting on the trailer 700 has the height HBTO. HBTO may be, for example, between 86" and 102". HBTO may be 92".

Still referring to FIG. 29, a height HG of a garage may be less than the combined height HBTO of the boat resting on the trailer 700. In various embodiments, the garage height HG may be between 84" and 90". In an embodiment, the garage height HG is 84". Accordingly, a combination of the trailer 700 and the boat 500 may be too tall to store in the garage. This may require one of several alternatives. For instance, the boat may be required to be stored outdoors, resulting in wear due to weather, lack of security, and related issues. As a second alternative, this may require a larger storage space to be constructed, resulting in added expense. As a third alternative, outer hulls OHa, OHb having smaller displacement volumes may be used, thereby reducing the overall height HBTO. However, this may adversely affect the performance of the boat. For instance, lower-displacement hulls may reduce the capacity of the boat to carry passengers or cargo or to support a wide, stable floor.

Still referring to FIG. 29, when the boat rests on bunks 710 of the trailer 700, the closest portion of the outer hulls OHa, OHb a vertical distance between the top edges of the wheels WHa, WHb and the outer hulls OHa, OHb may define a vertical wheel clearance WCV. As shown in FIG. 29, the trailer 700 includes fenders 720a, 720b in the space defining the vertical wheel clearance WCV. WCV may be between 1.5" and 6". As shown in FIG. 29, the central hull CH may effectively limit the extent to which the outer hulls OHa, OHb can be contracted towards one another, also thereby providing a lower bound on the width CW.

Referring now to FIG. 30, the wheels WHa, WHb of a trailer 800 are shown, in like manner as in FIG. 29. The wheels WHa, WHb rotatably attach to a structural portion 804 of the trailer 800 via axles 802a, 802b. The outer hulls OHa, OHb of a boat 600 rest on bunks 810 attached to the structural member 804 of the trailer 800.

In an embodiment, the cross-sectional area, and thus the displacement volume, for a given portion of the outer hulls OHa, OHb of a boat 600 is greater than or equal to the cross-sectional area, and thus the displacement volume, for a given portion of the outer hulls OHa, OHb of the boat 500 of FIG. 29.

Still referring to FIG. 30, the boat 600 has a width CW, equal to the contracted width CW discussed above. In some embodiments, the width 600 is fixed. In other embodiments, the width of the boat 600 is variable, as discussed above. Thus, when a boat in accordance with an embodiment is in the contracted state, it may have a contracted width CW. Alternatively, the boat 600 may have a fixed width CW.

In various embodiments, the boat 600 has a chine-to-chine width CCC defined as the distance between the concave chine portions 440. In some embodiments, the chine-to-chine width CCC is more particularly equal to the distance between the lower chine panels 444 of the concave chine portions 440 of the outer hulls OHa and OHb.

As shown in FIG. 30, the chine-to-chine width CCC is smaller than the width WWI between the inner edges of the wheels WHa, WHb. Accordingly, when the boat 600 rests on the trailer 800, the closest portion of the outer hulls OHa, OHb to the top and inner edges of the wheels WHa, WHb is the concave chine portion 440.

Still referring to FIG. 30, in an embodiment, the vertical wheel clearance WCV between the top edges of the wheels WHa, WHb and the outer hulls OHa, OHb is defined by a space between the top edges of the wheels WHa, WHb and the upper chine panels 442 of each of the outer hulls OHa, OHb. A horizontal wheel clearance WCHC in the contracted position is defined by a space between the inner edges of the wheels WHa, WHb and the lower chine panels 444 of each of the outer hulls OHa, OHb. Thus, in the boat 600 in accordance with an embodiment, the concave chine portion 440 of each outer hull OHa, OHb may fit horizontally between the wheels WHa, WHb of the trailer. Notably, the vertical wheel clearance WCV of the boat 600 of width CW in accordance with an embodiment may be greater than or equal to the vertical wheel clearance WCV of the boat 500 of width CW resting on the trailer. Thus, in accordance with an embodiment, an overall height of the boat 500 resting on the trailer may be reduced without sacrificing displacement volume and without sacrificing vertical wheel clearance WCV by substituting space-saving outer hulls OHa, OHb in the place of hulls of another cross-sectional shape, such as a circle or an ellipse. In other words, for a given hull displacement, a space-saving hull in accordance with an embodiment may support a wider overall boat than a circular-shaped hull or an elliptical-shaped hull while still fitting between the wheels WHa, WHb of the trailer 800.

Still referring to FIG. 30, in some embodiments fenders 820a, 820b or other structural elements of the trailer may be disposed in the space defined by the vertical wheel clearance WCV and the horizontal wheel clearance WCHC. In some embodiments, the vertical wheel clearance WCV may include a vertical distance by which the wheels WHa, WHb may travel relative to a structural portion of the trailer, to absorb road vibrations, for example. In some embodiments, the horizontal wheel clearance WCHC may include a margin in which the wheels WHa, WHb may safely rotate without impinging on the boat 600 or on another portion of the trailer 800.

In various embodiments, the chine-to-chine width CCC may be between 60" and 98". In an embodiment, the chine-to-chine width CCC is 67.8". In various embodiments, the vertical wheel clearance WCV may be between 1.5" and 6". In an embodiment, the vertical wheel clearance WCV is 3.5". In various embodiments, the horizontal wheel clearance WCHC may be between 1" and 4". In an embodiment, the horizontal wheel clearance WCHC is 2".

Referring now to FIGS. 31A-F, in an embodiment, a boat having outer hulls OHa, OHb and a central hull CH connected to beams 106 includes a central pan CP fixedly connected to the central hull CH and to the beams 106, and expandable and contractible pans ECPa, ECPb disposed between the central hull CH and each of the outer hulls OHa, OHb and between the central pan CP and each of the outer hulls OHa, OHb.

Figure 31A:
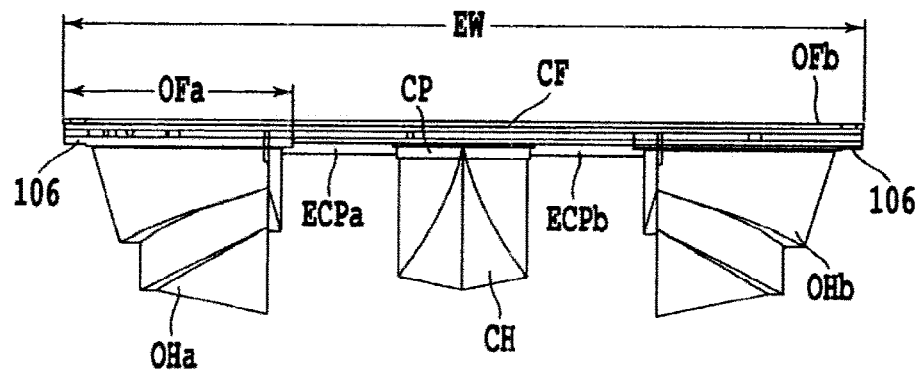
Figure 31B:
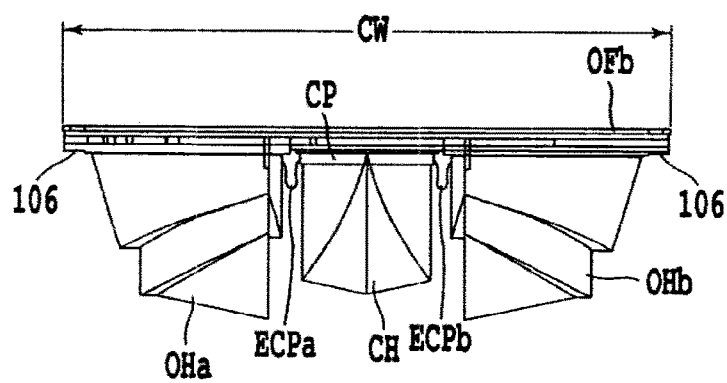

In accordance with an embodiment shown in FIG. 31A, when the boat is in the expanded state, the boat has the expanded width EW discussed above and the outer hulls OHa, OHb are spaced apart from the central hull CH. In accordance with an embodiment shown in FIG. 31B, when the boat is in the contracted state, the boat has the contracted width CW as discussed above and the outer hulls OHa, OHb are disposed closer to the central hull CH than in the expanded state.

Figure 31C:
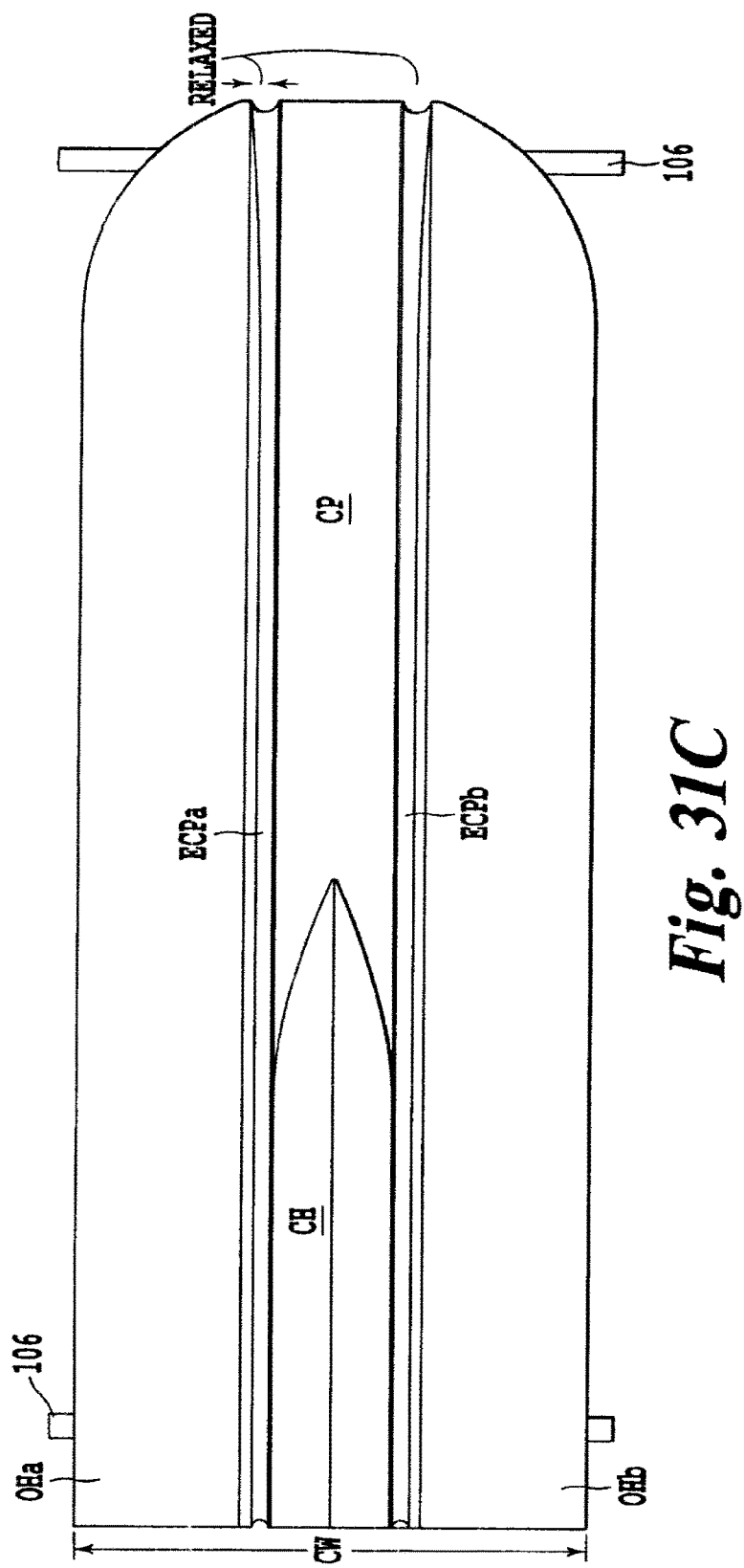
Figure 31D:
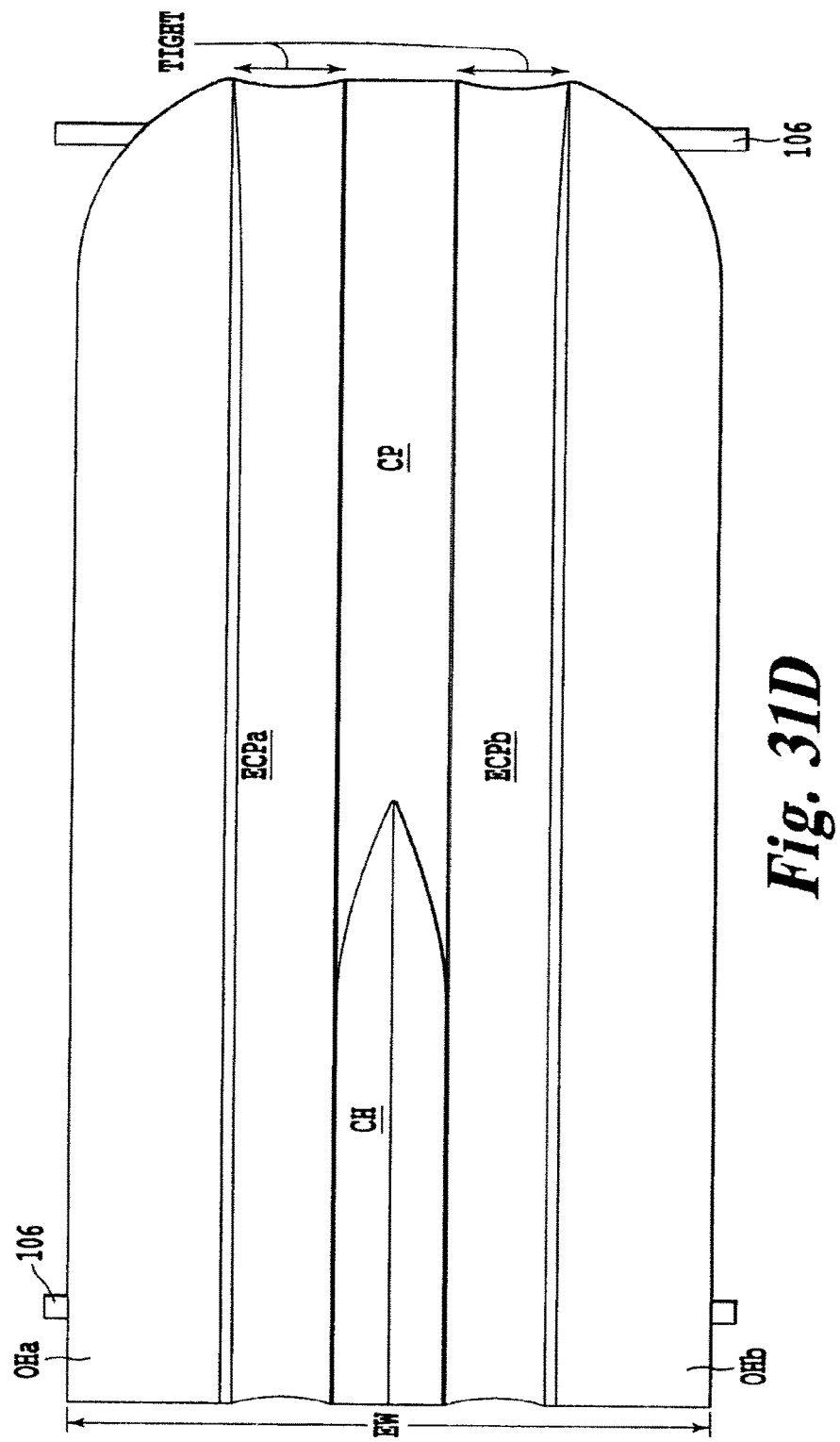

As shown in FIGS. 31C-D, in some embodiments, the central hull CH extends along a portion of the bow-to-stern axis a distance shorter than the overall length of the boat. In various embodiments, the length of the central hull CH may be between 4' and 14'. In an embodiment, the central hull CH is 10' long and the boat is 22' long. Accordingly, in an embodiment, the central pan CP extends from the bow of the boat a distance of 12' until it intersects an upper portion of the central hull CH. In an embodiment, the bottom surface of the central pan CP has a cut-out shape corresponding to a top profile shape of the central hull CH to fit snugly around the central hull CH, thereby deflecting water away from the area where the central hull CH attaches to the central floor CF.

As shown in FIGS. 31A-B and 31G-H, the central pan CP may have a generally rectangular cross section. In an embodiment, the central pan CP may between 2" and 4" tall. In an embodiment, the central pan CP is 3" tall. In some embodiments, the central pan CP includes a front portion that is closed between the central floor CF and a bottom surface of the central pan CP. For instance, as shown in FIGS. 32E-F, a front portion of the central pan CP curves downward, away from the bow end of the boat, thereby closing off the central pan CP.

In various embodiments, the central pan CP may be made of a rigid material such as aluminum, fiberglass, or plastic. In other embodiments, the central pan CP may include a combination of rigid members and compliant members, such as a membrane mounted on a frame. Advantageously, the central pan may provide a substantially smooth surface to deflect water away from a bottom portion of the floor of the boat, which may also improve the performance of the boat. In an embodiment, as shown in FIGS. 31C-D, the central pan CP extends along substantially the whole length of the boat. In this manner, the central pan CP provides an attachment surface along a portion of the boat not occupied by the central hull CH onto which the expandable and contractible pans ECPa, ECPb are be attached.

Referring again to FIGS. 31A-F, in various embodiments, the expandable and contractible pans ECPa, ECPb are made of a flexible material such that when a boat in accordance with an embodiment is in the contracted state, the expandable and contractible pans ECPa, ECPb are in a relaxed state, as shown in FIGS. 31B-C. On the other hand, when the boat is in the expanded state, the expandable and contractible pans ECPa, ECPb may be in a state of tension, as shown by the arrows in FIGS. 31A and 31D, thereby providing a substantially smooth surface to deflect water away from the bottom portion of the floor of the boat. This also may improve the performance of the boat. In testing, a boat fitted with expandable and contractible pans ECPa, ECPb gained approximately 20% in speed over the same boat with the expandable and contractible pans removed.

Figure 31E:
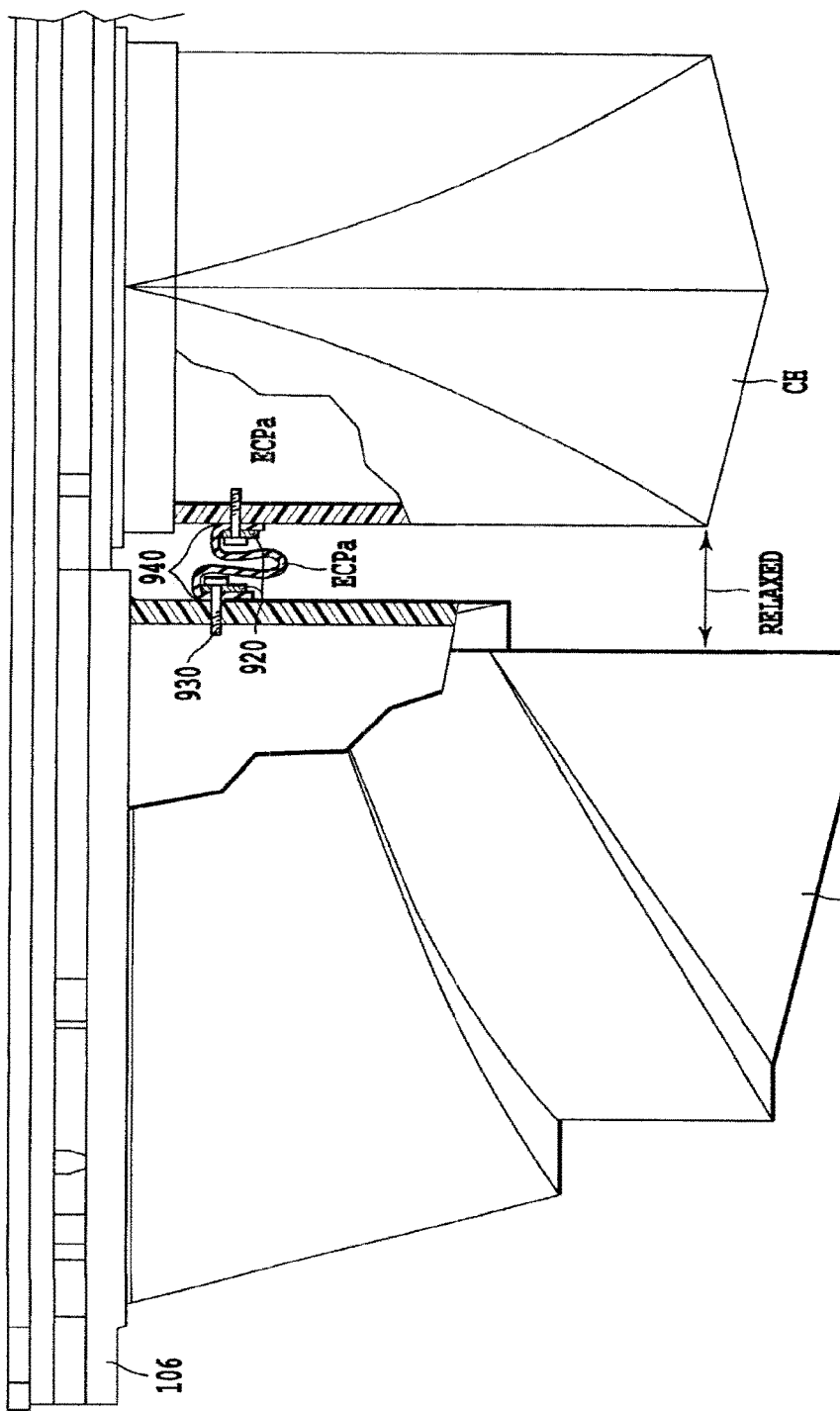
Figure 31F:
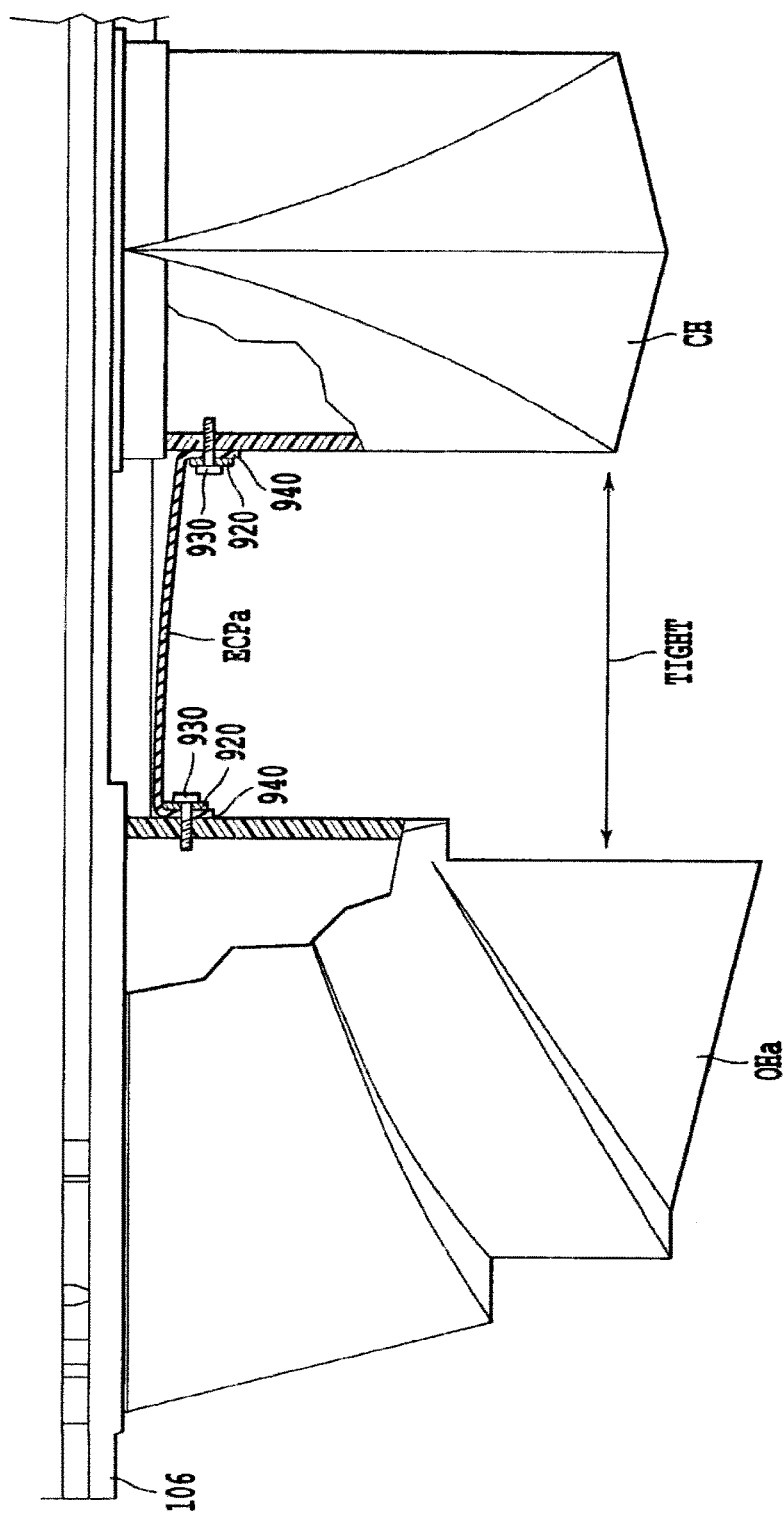

Referring now to FIGS. 31E-F, in an embodiment, any of various fixing devices including screws, bolts, clips, or the like may be used to fixedly attach the expandable and contractible pans ECPa, ECPb along their longitudinal edges to the outer hulls OHa, OHb and to the central hull CH and the central pan CP. An embodiment includes screws 930 fixedly inserted through sides of the outer hulls OHa, OHb and the central hull CH and the central pan CP. In an embodiment, along portions of the boat where the central hull CH is present, the expandable and contractible pans ECPa, ECPb attach to the central hull CH while along portions of the boat where the central pan CP is present, the expandable and contractible pans ECPa, ECPb attach to the central pan CP. In an embodiment shown in FIG. 31E, retainers 920 are disposed between the screws 930 and the expandable and contractible pans ECPa, ECPb. The retainers 920 distribute the force of the screws 930 across the expandable and contractible pans ECPa, ECPb, thereby fixing the expandable and contractible pans ECPa, ECPb to the outer hulls OHa, OHb. In an embodiment, the retainers 920 may be used in combination with the screws 930 in like manner to fix the expandable and contractible pans ECPa, ECPb to the central hull CH, as shown in FIGS. 31E-F.

Separate from, or in combination with the retainers 920 and the screws 930, embodiments may include an adhesive 940 disposed between each of the outer hulls OHa, OHb and the abutting portions of the expandable and contractible pans ECPa, ECPb and between the central hull CH and the abutting portions of the expandable and contractible pans ECPa, ECPb. In various embodiments, the adhesive 940 is especially suited for adhering to aluminum and to an elastomeric material. In an embodiment, the adhesive 940 includes cyanoacrylate.

In various embodiments, the retainers 920 are made in the form of thin strips of a stiff material such as aluminum or plastic, for example. Still referring to FIGS. 31E-F, each of the retainers 920 may have a thickness of between 0.0625" and 0.25" and a height CPGH between 0.625" and 0.875". In an embodiment, each of the retainers 920 has a thickness of 0.125" and a height CPGH (FIG. 32E) of 0.75".

Still referring to FIGS. 31E-F, each of the expandable and contractible pans ECPa, ECPb may have a thickness of between 0.03" and 0.06". In an embodiment, each of the expandable and contractible pans ECPa, ECPb has a thickness of 0.045". In an embodiment, the expandable and contractible pans ECPa, ECPb fold easily and not overly bulky or heavy. In various embodiments, the expandable and contractible pans ECPa, ECPb may be made of a material or combination of materials that is highly resilient to repeated tightening and relaxing cycles, such as rubber, fiber-reinforced elastomer, fabric, or aramid fiber, for example.

In an exemplary embodiment, the flexible material of the expandable and contractible pans ECPa, ECPb is an elastic material. In an exemplary embodiment, the flexible, elastic material is strainable in one or more dimensions in an elastic regime such that the flexible, elastic material returns to its original unstrained size upon being released from a strained condition of 150% its unstrained size in the one or more dimensions.

In accordance with another embodiment, a single expandable and contractible pan may be affixed between two hulls of a boat having only two hulls, such as a sailing catamaran, for example.

Figure 31G:
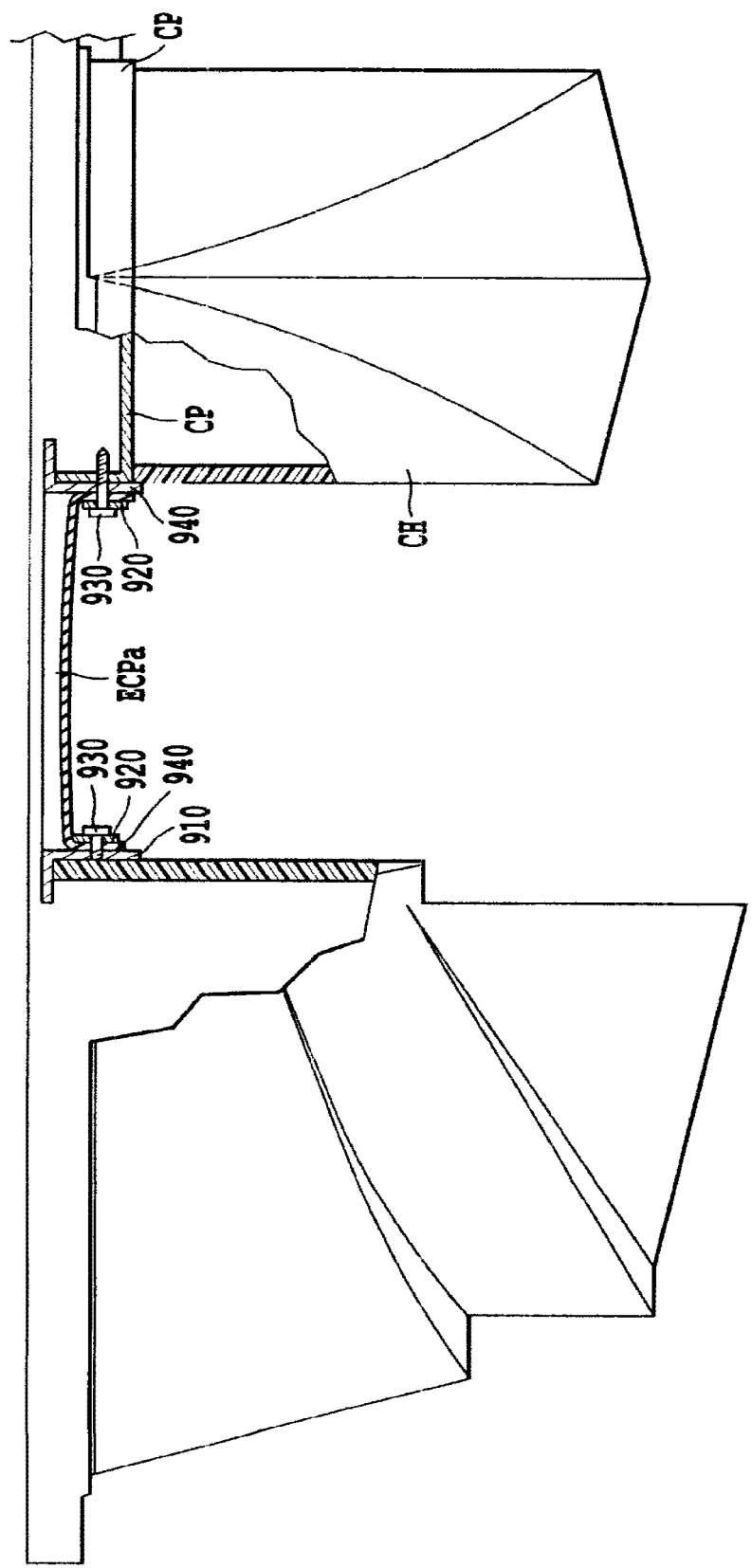

Referring now to FIG. 31G, in an embodiment, the screws 930 may be attached to a beam 910, such as an angle stock. The beam 910 may be made of a rigid material such as aluminum or fiberglass. In some embodiments, the beam 910 may be between 2" and 4". In an embodiment, the beam 910 is 3". In some embodiments, the screws 930 do not pierce the outer hulls OHa, OHb or the central hull CH. As shown in FIGS. 31G-H, in some embodiments, the screws 930 are attached to the central pan CP.

In embodiments, the screws 930 are spaced apart between 6" and 18" along the bow-to-stern axis. In an embodiment, the screws 930 are spaced apart every 9" along the bow to stern axis.

Referring now to FIGS. 32A-32F, some embodiments include a deflector apparatus 1000. In an embodiment, the deflector apparatus 1000 includes a first outer deflector 1010a that attaches to the boat between the outer floor OFa and the outer hull OHa, a second outer deflector 1010b that attaches to the boat between the outer floor OFb and the outer hull OHb, and a central deflector 1010*c* that attaches to the boat between the central floor CF and the central hull CH. In various embodiments, the deflectors 1010*a-c* may be attached by any of various fixing devices including screws, bolts, clips, or the like. In other embodiments, the deflectors 1010*a-c* may be attached by welding or the like. In some embodiments, the deflectors 1010*a-c* attach to the hulls OHa, OHb, and CH. In other embodiments, the deflectors 1010*a-c* attach to the floors OFa, OFb, and CF.

Figure 32A:
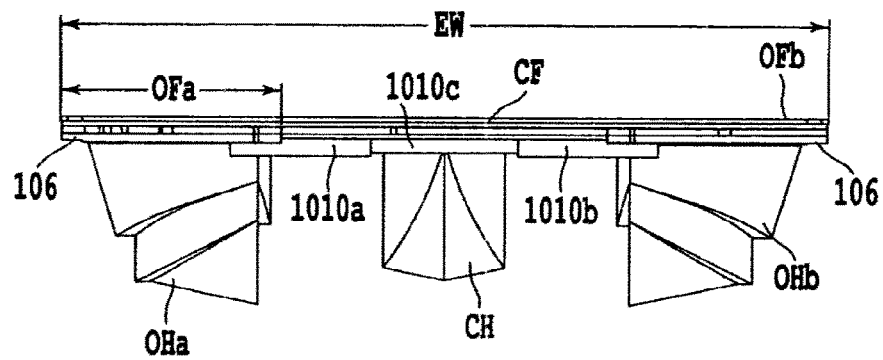
Figure 32B:
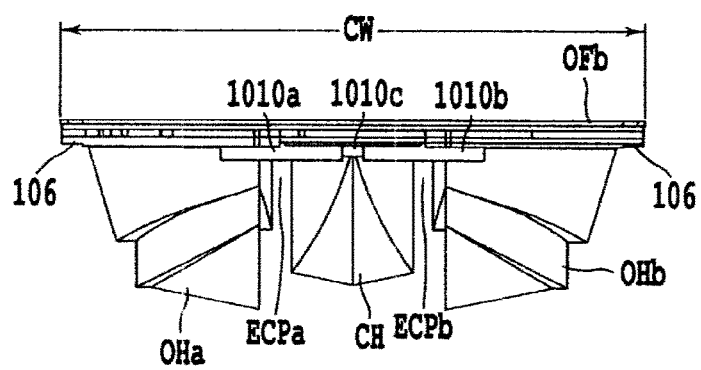
Figure 32E:
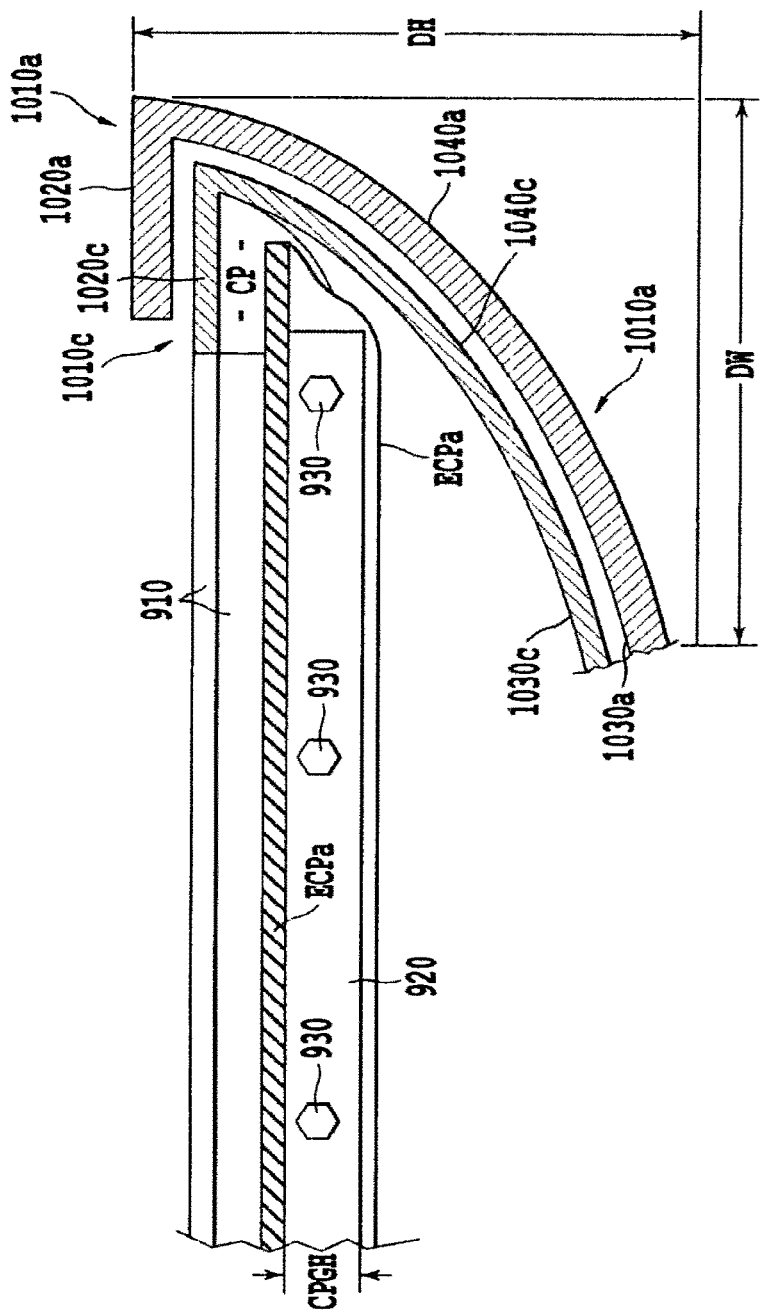
Figure 32F:
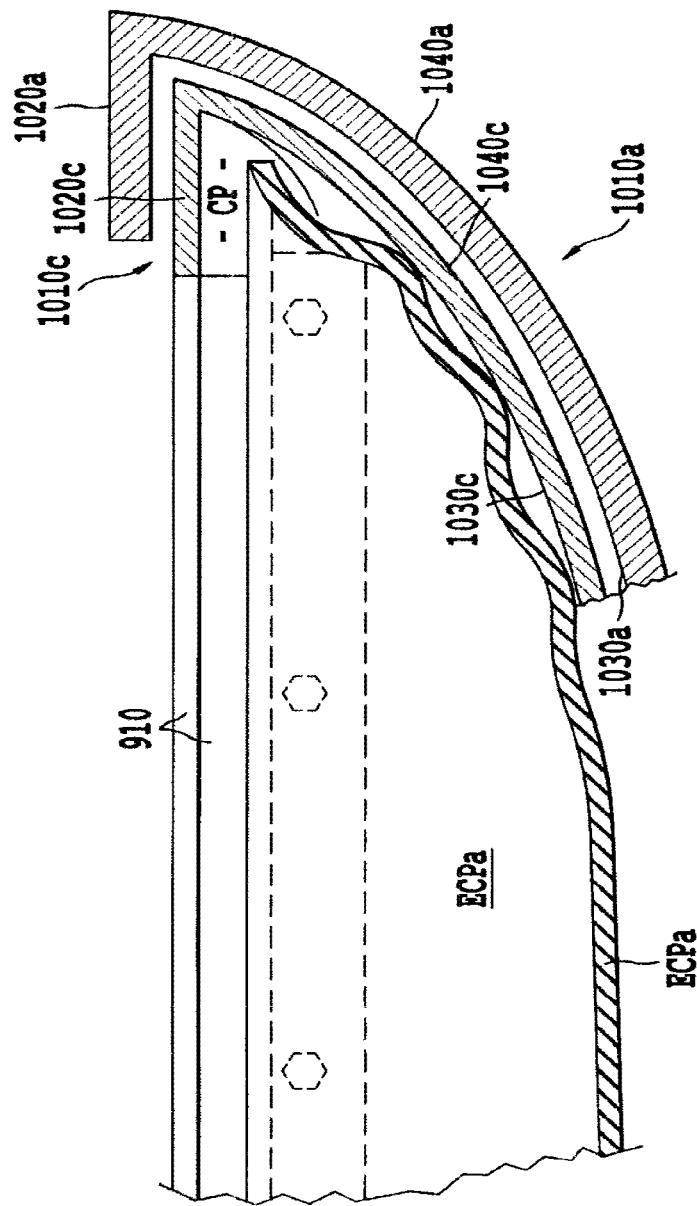

In an embodiment, the outer deflector 1010*a* moves with the outer hull OHa and the outer deflector 1010*b* moves with the outer hull OHb between the expanded state (FIG. 32A) and the contracted state (FIG. 32B). In an embodiment shown in FIGS. 32A-F, the outer deflectors 1010*a*, 1010*b* overlap the central deflector 1010*c*. In the contracted stated (FIG. 32D), the outer deflectors 1010*a*, 1010*b* are spaced apart by a gap DGC. In the expanded state (FIG. 32C), the outer deflectors 1010*a*, 1010*b* are spaced apart by a gap DGE greater than DGC.

In embodiments as shown in FIGS. 32C-32F, the outer deflector 1010*a* has an attachment portion 1020*a*, an interior portion 1030*a*, an exterior portion 1040*a*, and an outboard end portion 1050*a*. In an embodiment, the attachment portion 1020*a* comprises a flange that is mountable between the outer floor OFa and the outer hull OHa. In an embodiment as shown in FIG. 32F, the interior portion 1030*a* overlaps a front edge of the expandable and contractible pan ECPa such that the interior portion 103*a* supports the expandable and contractible pan ECPa from beneath in the contracted position. The exterior portion 1040*a* deflects water away from the expandable and contractible pan ECPa, thereby reducing entry of water from the front of the boat into the space between the floor and the expandable and contractible pan ECPa. In some embodiments, the outboard end portion 1050*a* is curved to match a curvature of the outer hull OHa.

In embodiments as shown in FIGS. 32C-32D, the outer deflector 1010*b* has an attachment portion 1020*b*, an interior portion 1030*b*, an exterior portion 1040*b*, and an outboard end portion 1050*b*. In an embodiment, the attachment portion 1020*b* comprises a flange that is mountable between the outer floor OFb and the outer hull OHb. In an embodiment, in the same manner as interior portion 1030*a* in FIG. 32F, the interior portion 1030*b* overlaps a front edge of the expandable and contractible pan ECPb such that the interior portion 103*b* supports the expandable and contractible pan ECPb from beneath in the contracted position. In an embodiment, in the same manner as exterior portion 1040*a* in FIGS. 32E-F, the exterior portion 1040*b* deflects water away from the expandable and contractible pan ECPb, thereby reducing entry of water from the front of the boat into the space between the floor and the expandable and contractible pan ECPb. In some embodiments, the outboard end portion 1050*b* is curved to match a curvature of the outer hull OHb.

In embodiments as shown in FIGS. 32C-32F, the central deflector 1010*c* has an attachment portion 1020*c*, an interior portion 1030*c*, and an exterior portion 1040*c*. In an embodiment, the attachment portion 1020*c* comprises a flange that is mountable between the central floor CF and the central pan CP. In an embodiment, as shown in FIG. 32F, the interior portion 1030*c* overlaps a front edge of the expandable and contractible pan ECPa, and in like manner overlaps a front edge of the expandable and contractible pan ECPb, such that the interior portion 103*c* supports the expandable and contractible pans ECPa, ECPb from beneath in the contracted position. In an embodiment, the exterior portion 1040*c* deflects water away from central pan and away from the expandable and contractible pans ECPa, ECPb, thereby reducing entry of water from the front of the boat into the space between the floor and the expandable and contractible pans ECPa, ECPb.

As shown in FIGS. 32C-32F, in some embodiments, the deflectors 1030*a-c* nest together with gaps between them, thereby reducing interference from the deflectors 1030*a-c* when moving between the expanded state (FIGS. 32C and 32E) and the contracted state (FIGS. 32D and 32F).

In various embodiments, stern ends of the expandable and contractible pans ECPa, ECPb are open, permitting water to drain off the expandable and contractible pans ECPa, ECPb out the stern of the boat. When a boat in accordance with an embodiment is in motion, the water's inertia may cause the water to drain. When a boat in accordance with an embodiment is stationary, the boat may be inclined along the bow-to-stern axis, thereby causing water to drain off the expandable and contractible pans ECPa, ECPb. For example, the weight of an engine on the stern of a boat may cause the boat to be inclined, the boat may be parked on an incline, or a trailer on which the boat rests may have its front end raised. In other embodiments, the expandable and contractible pans ECPa, ECPb may be installed so as to form an angle relative to the bow to stern axis, to promote drainage. In an embodiment, the deflector 1000 may have an overall width DW between 2" and 6" and an overall height between 2" and 6". In an embodiment, the deflector 1000 has a width DW of 4" and a height DH of 4".

In accordance with another embodiment in which a single expandable and contractible pan is affixed between two hulls of a boat having only two hulls, such as a sailing catamaran, for example, a single deflector may be attached to one of the two hulls of the boat, extending across an area in front of a space between both hulls.

Figures 33A, 33B:
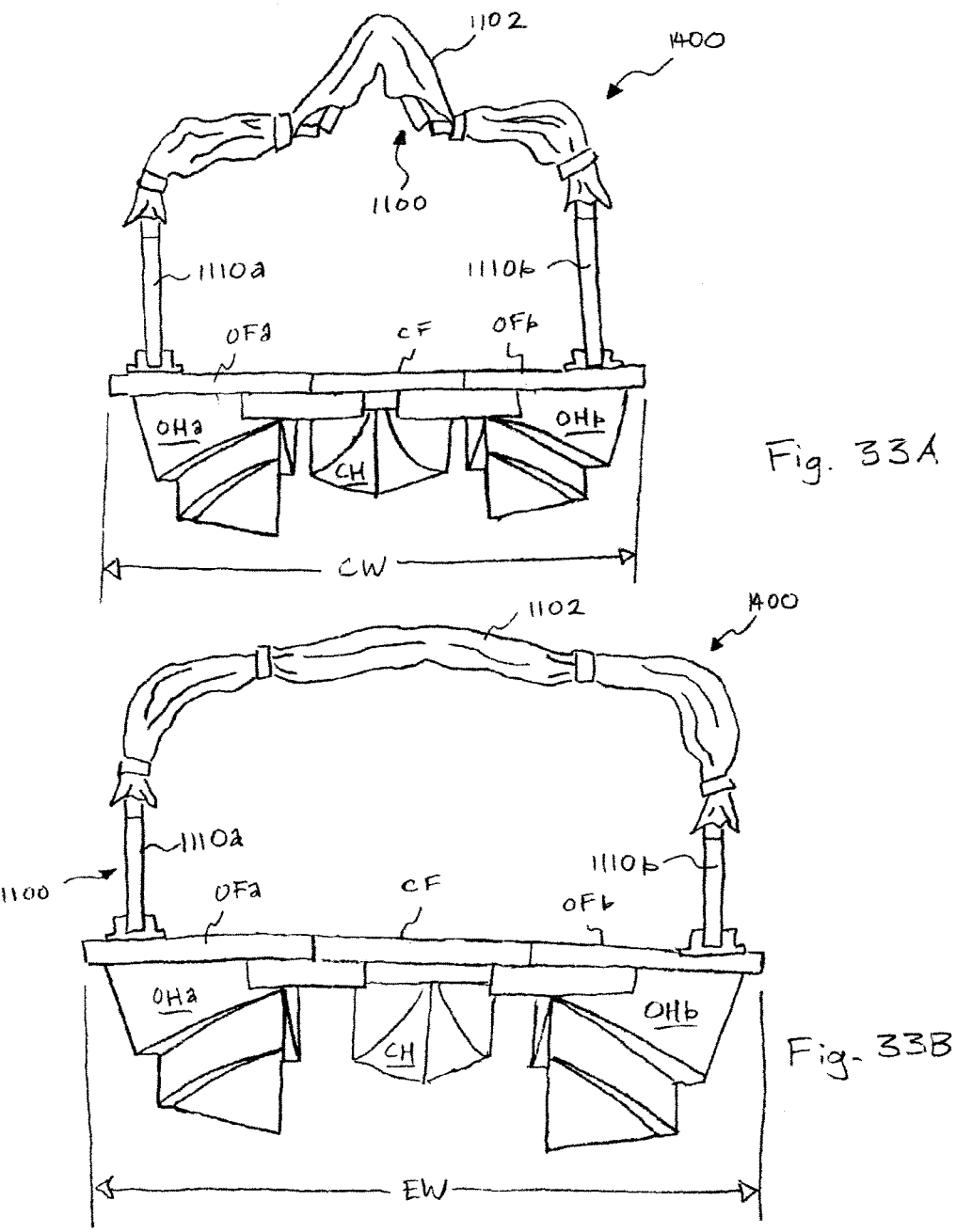

Referring now to FIGS. 33A-D, in an embodiment, an expanding and contracting sun shade 1100, for example of the type known as a Bimini top, is mountable to the floor of a boat and expands and contracts in a lateral direction with the floor between an expanded position (FIG. 33B) and a contracted position (FIG. 33A). Advantageously, in a storage configuration of the expanding and contracting sun shade 1100, the expanding and contracting sun shade 1100 may remain connected to the floor of the boat. Further, the expanding and contracting sun shade 1100 may be tiltable where it connects to the floor so that the expanding and contracting sun shade 1100 has a reduced height.

Figure 33C:
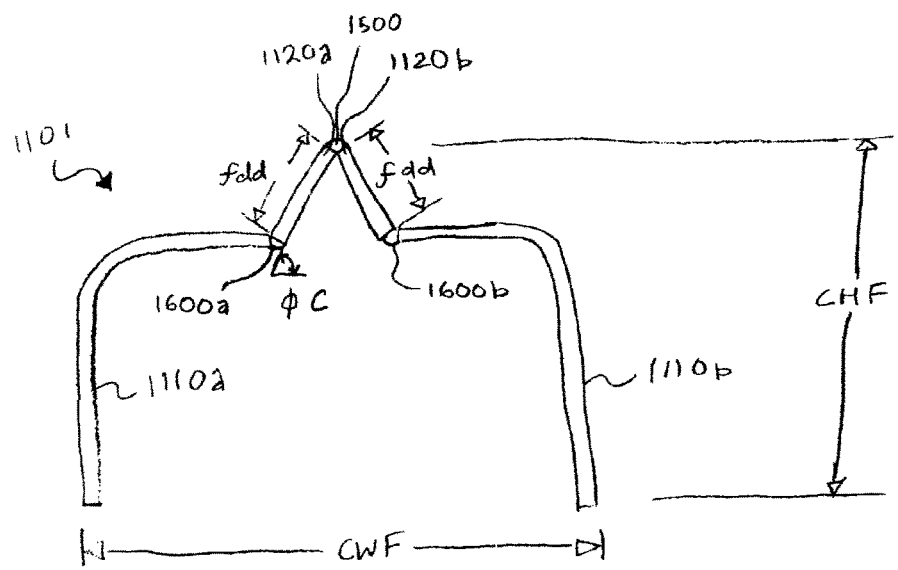
Figure 33D:
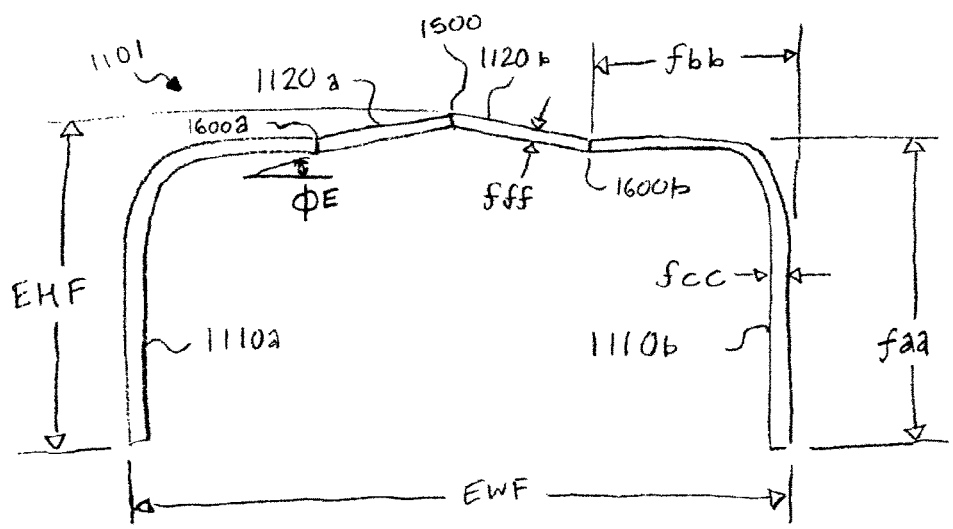

Referring to FIG. 33C, an expandable and contractible support frame 1101 according to an embodiment is shown in a contracted position. Referring to FIG. 33D, the expandable and contractible support frame 1101 is shown in an expanded position. The expandable and contractible support frame 1101 includes main extensions 1110*a*, 1110*b* and folding elements 1120*a*, 1120*b*. The main extension 1110*a* is pivotally attached to the folding element 1120*a*. Likewise, the main extension 1110*b* is pivotally attached to the folding element 1120*b*. The folding element 1120*a* is pivotally attached to the folding element 1120*b*, forming an a-frame shape.

In accordance with an embodiment, when the expandable and contractible support frame 1101 is in the contracted position, as shown in FIG. 33C, the folding elements 1120*a*, 1120*b* are folded upward, and the expandable and contractible support frame 1101 has a height CHF and a width CWF. In accordance with an embodiment, when the expandable and contractible support frame 1101 is in the expanded position, as shown in FIG. 33D, the folding elements 1120*a*, 1120*b* are folded upward, and the expandable and contractible support frame 1101 has a height EHF and a width EWF. In other embodiments, the folding elements 1120*a*, 1120*b* may fold downward, or may fold in a horizontal plane such that the height of the support frame does not vary between the expanded and contracted positions.

In an embodiment, as shown in FIGS. 33C-D, each of the main extensions 1110*a*, 1110*b* is formed as a curved "L" shaped beam with a height faa, width fbb, and thickness fcc. In other embodiments, the main extensions may have other shapes. In an embodiment, as shown in FIGS. 33C-D, each of the folding elements is formed as a straight beam with a length fdd and a thickness fff. In some embodiments, the thickness fcc is equal to the thickness fff. In other embodiments, the folding elements 1120*a*, 1120*b* may have other shapes, for example, being curved.

In the contracted position, as shown in the embodiment of FIG. 33C, the folding element 1120*a* forms an angle ΦC relative to the horizontal. In the expanded position, as shown in the embodiment of FIG. 33D, the folding element 1120*a* forms an angle ΦE relative to the horizontal. In an embodiment, the angle ΦE is a positive angle, such that when the support frame 1101 moves from the expanded position to the contracted position, the folding elements 1120*a*, 1120*b* fold easily due to the contracting motion of the support frame 1101.

In various embodiments, CHF is between 5' and 8', CWF is between 5' and 8', EHF is between 6' and 10', EWF is between 6' and 10', faa is between 4' and 7', fbb is between 2' and 4', fcc is between 0.5" and 2", fdd is between 10" and 24", fff is between 0.5" and 2", ΦC is between 45 degrees and 90 degrees, and ΦE is between 0 degrees and 45 degrees. In an embodiment, CHF is 9' and EHF is 7.5'. In an embodiment, CWF is 6' and EWF is 9'. In an embodiment, faa is 6' and fbb is 3', and fcc is 1". In an embodiment, fdd is 18" and fff is 1". In an embodiment, ΦC is 80 degrees and ΦE is 10 degrees.

Advantageously, in some embodiments the expandable and contractible support frame 1101 is combined with one or more additional expandable and contractible support frames to form a support framework 1400 that provides distributed support for the canopy 1102 across a large surface area while also being expandable and contractible. An embodiment shown in FIGS. 33E-F includes three expandable and contractible support frames 1101, 1201, and 1301. In an embodiment, the expandable and contractible support frames 1201, 1301 are attached to the expandable and contractible support frame 1101.

In an embodiment, the expandable and contractible support frame 1201 includes extensions 1210*a*, 1210*b*, and folding elements 1220*a*, 1220*b*, pivotally attached as in the expandable and contractible support frame 1101. In an embodiment, the expandable and contractible support frame 1301 includes extensions 1310*a*, 1310*b*, and folding elements 1320*a*, 1320*b*, pivotally attached as in the expandable and contractible support frame 1101.

As shown by the double-arrows in FIGS. 33E and 33F, in an embodiment, each of the expandable and contractible support frames 1201, 1301 of the support framework 1400 fans-out from the expandable and contractible support frame 1101 between a closed position and an open position. In an embodiment, the support frame 1201 fans-out about an axis between pivot points 1203*a*, 1203*b*. In like manner, in an embodiment, the support frame 1301 fans-out about an axis between pivot points 1303*a*, 1303*b*. In the open position, the support framework 1400 provides a large area of support for the canopy 1102. In the closed position, the support framework 1400 has a reduced profile, and the canopy 1102 can be stowed compactly around the framework 1400, as shown in FIGS. 33A-B. Notably, in an embodiment, the support framework 1400 is expandable and contractible both when the support framework 1400 is in the closed position, with the canopy 1102 stowed around the support framework 1400 (FIGS. 33A-B), and when the support framework 1400 is in the open position (FIGS. 33E-F). In some embodiments, the folding elements 1120*a*, 1120*b*, 1220*a*, 1220*b*, 1320*a*, and 1320*b* fold and unfold along different planes from one another, for instance, when the support framework 1400 is in the open position.

In an embodiment, auxiliary support members 1150 are attached to the support framework 1400. In some embodiments, the auxiliary support members 1150 may be tension members, such as nylon webbing, or steel cable, for example. In other embodiments, the auxiliary support members 1150 may provide support through tension and compression, as in an aluminum tube, for example.

In various embodiments, the expandable and contractible support frames 1101, 1201, and 1301 may be made of a strong and stiff material or combination of materials such as aluminum, stainless steel, fiberglass, plastic, or fiber-reinforced plastic. In some embodiments, the expandable and contractible support frames 1101, 1201, and 1301 are made of 1"×1" square tubular metal of thickness between 0.03125" and 0.125". In some embodiments, the expandable and contractible support frames 1101, 1201, and 1301 are made of 1"×1" square tubular aluminum of 0.0625" thickness.

In various embodiments, a canopy 1102 of the expanding and contracting shade may be made of a thin, flexible, durable material, for instance a textile such as canvas, or a laminated membrane.

In some embodiments, the expanding and contracting sun shade 1100 covers a portion of a floor of a boat, thereby providing protection from the sun's rays. In other embodiments, the expanding and contracting sun shade 1100 provides protection from wind, precipitation, splashing and the like. Accordingly, embodiments of the expanding and contracting sun shade 1100 shade include panels not only oriented horizontally, but also oriented vertically, or having orientations combining horizontal and vertical aspects, the canopy 1102 forming a dodger, for example, rather than a Bimini top.

Referring now to FIGS. 34A-B, in an embodiment, an inboard hinge 1500 for a support frame 1101 includes an inboard clevis 1510 and an inboard pad eye 1560, rotatably connected by a bolt 1550. Referring now to FIGS. 35A-D, in an embodiment, an outboard hinge 1600 for a support frame 1101 includes an outboard clevis 1610 and an outboard pad eye 1660, rotatably connected by a bolt 1650.

Referring again to FIGS. 33C-D, in an embodiment, the inboard hinge 1500 pivotally attaches the folding element 1120*a* to the folding element 1120*b*, a first outboard hinge 1600*a* pivotally attaches the main extension 1110*a* to the folding element 1120*a*, and a second outboard hinge 1600*b* pivotally attaches the main extension 1110*b* to the folding element 1120*b*. Thus, in an embodiment, the support frame 1101 includes the inboard hinge 1500 and two of the outboard hinge 1600. FIGS. 34A, 35A, and 35B show the hinges 1500, 1600 pivoted in a manner corresponding to a contracted position of the support frame 1101. FIGS. 34B, 35C, and 35D show the hinges 1500, 1600 pivoted in a manner corresponding to an extended position of the support frame 1101.

Figure 36A:
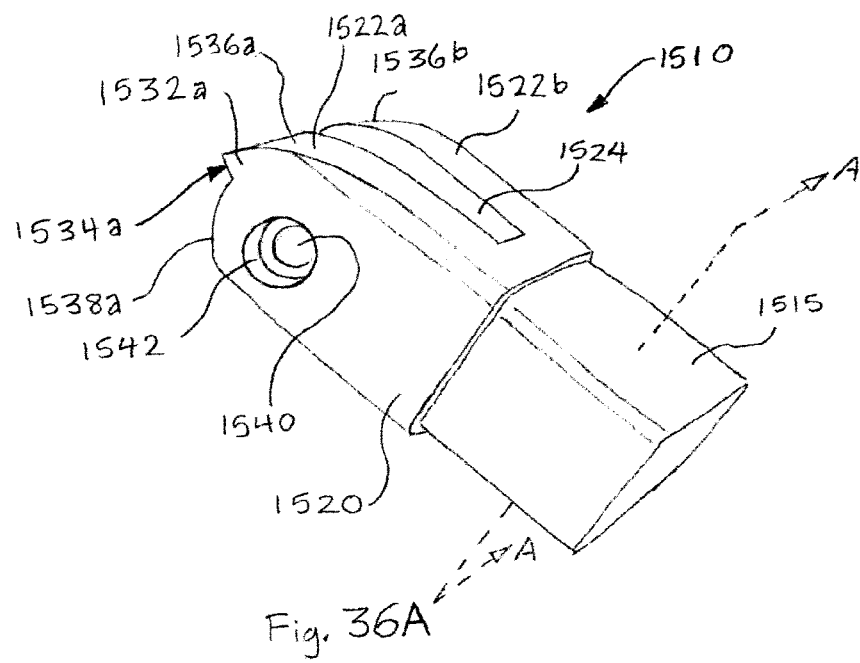
FIGS. 36A-D depict a perspective view and schematic views of an inboard hinge clevis in accordance with an exemplary embodiment.
Figure 36B:
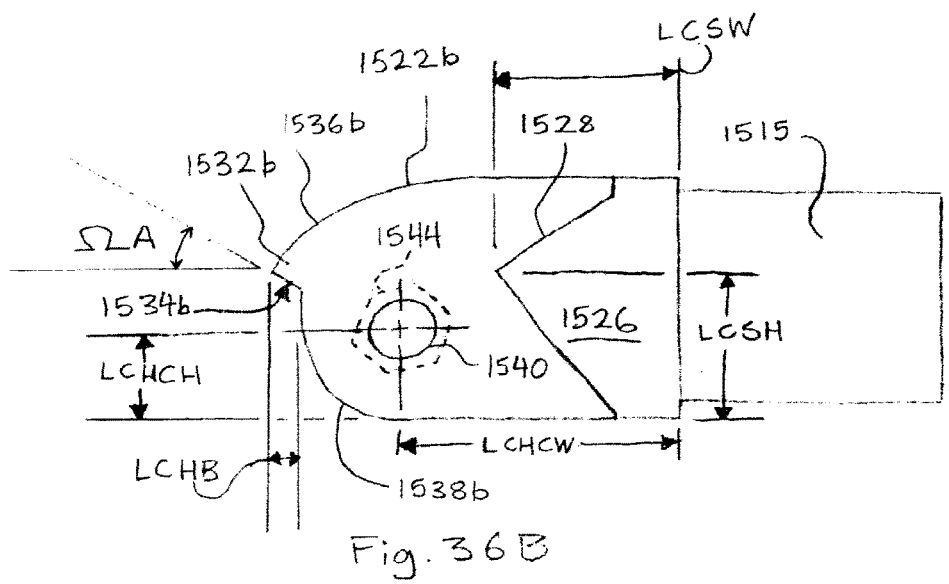

Referring now to FIGS. 36A-D, in an embodiment, the inboard clevis 1510 includes a tail stock 1515 fixed to a head 1520. FIG. 36B is a section view of the inboard clevis 1510 taken in the direction of the section line A-A in FIG. 36A. The tail stock 1515 has a generally square cross section, enabling the tail stock 1515 to be fitted onto an end of one of the folding elements 1120a, 1120b in various embodiments. In an embodiment, the edges of the tail stock 1515 are rounded. In various embodiments, the tail stock 1515 may be secured on the end of one of the folding elements 1120a, 1120b by crimping, press-fitting, pinning, adhering with an adhesive, or the like. In an embodiment, the tail stock 1515 has a cross-sectional width LCTSW smaller than a width LCCHW of the head 1520 and a cross-sectional height LCTSH smaller than a height LCCHH of the head 1520. In an embodiment, LCTSW is between 0.8125" and 0.9375", LCTSH is between 0.8125" and 0.9375", LCCHH is between 0.9375" and 1.0625", and LCCHW is between 0.9375" and 1.0625". In an embodiment, LCTSW is 0.875", LCTSH is 0.875", LCCHH is 1", and LCCHW is 1".

Still referring to FIGS. 36A-D, in an embodiment, the head 1520 includes a first tine 1522a, a second tine 1522b, a slot 1524 between the first tine 1522a and the second tine 1522b, and a support part 1526 in the slot 1524 between the first tine 1522a and the second tine 1522b.

Figure 36C:
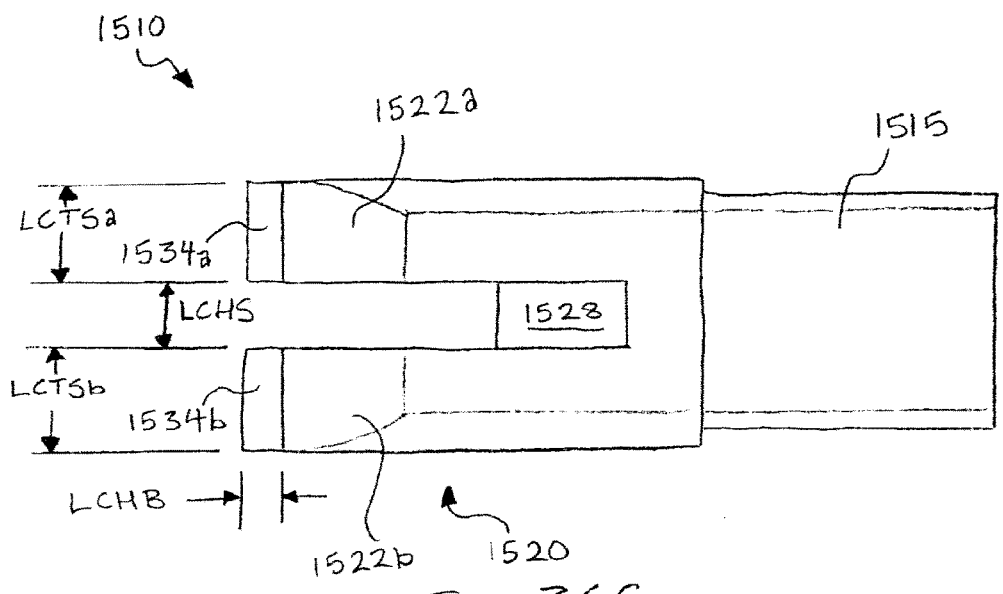
Figure 36D:
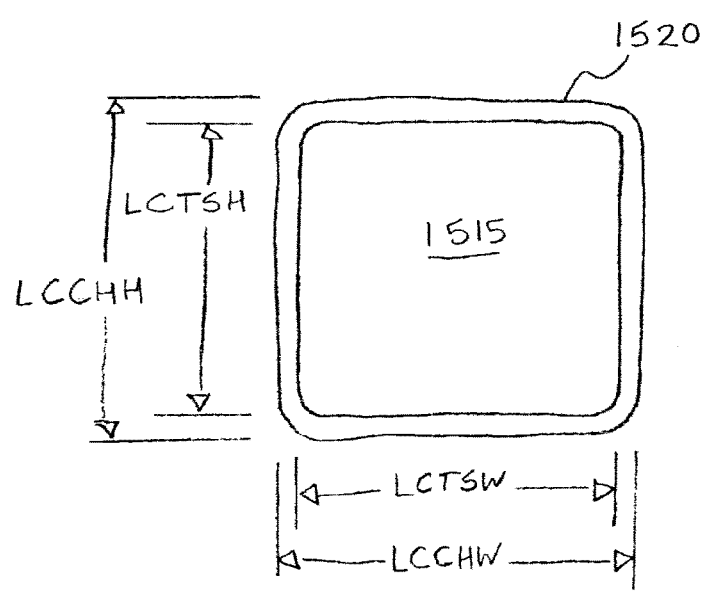

Referring to FIGS. 36A-C, the first tine 1522a includes a rotation limit part 1532a, a top radius 1536a, and a bottom radius 1538a. Advantageously, the top radius 1536 may provide a smooth surface across which the canopy 1102 can fold and slide without snagging or tearing.

In an embodiment, the slot 1524 is dimensioned to receive a tine 1572 of the inboard pad eye 1560, shown in FIGS. 37A-D. In an embodiment, the first tine 1522a has a width LCTSa, the second tine 1522b has a width LCTSb, and the groove 1526 has a width LCHS. In an embodiment, LCTSa is between 0.3125" and 0.4375", LCTSb is between 0.3125" and 0.4375", and LCHS is between 0.1875" and 0.3125". In an embodiment, LCTSa is 0.375", LCTSb is 0.375", and LCHS is 0.25".

In an embodiment, the support part 1526 extends a distance LCSW from the intersection of the tail stock 1515 and the head 1520 in the axial direction and a distance LCSH from the bottom radii 1538a, 1538b perpendicular to the axial direction, and the support part 1526 includes a support surface 1528. In an embodiment, LCSW is between 0.625" and 0.75" and LCSH is between 0.5625" and 0.6875". In an embodiment, LCSW is 0.6875" and LCSH is 0.875"

Still referring to FIGS. 36A-C, the rotation limit part 1532a includes a limit surface 1534a and the rotation limit part 1532b includes a limit surface 1534b. In an embodiment, the rotation limit parts 1532a, 1532b each have the shape of a beak. In an embodiment, the support surfaces 1534a, 1532b form an angle ΩA with the longitudinal axis of the inboard clevis 1510. In an embodiment, the rotation limit parts 1532a, 1538b extend a distance LCHB in the axial direction from the bottom radii 1538a, 1538b. In an embodiment, ΩA is between 15 degrees and 35 degrees and LCHB is between 0.0625" and 0.25". In an embodiment ΩA is 26.6 degrees and LCHB is 0.125".

Referring to FIGS. 36A-B, in an embodiment, a through-hole 1540 pierces the tines 1522a, 1522b and is centered in the axial direction a distance LCHCW from the intersection of the tail stock 1515 and the head 1520, and a distance LCHCH from the bottom radii 1538a, 1538b. In an embodiment, the through-hole 1540 includes a recess 1542 dimensioned to receive a head of the bolt 1550 on the first tine 1532a and a nut-shaped recess 1544 dimensioned to receive a nut on the second tine 1532b into which nut the bolt 1550 is threaded. In an embodiment, LCHCW is between 1" and 1.125" and LCHCH is between 0.3125" and 0.4375". In an embodiment, LCHCW is 1.0625" and LCHCH is 0.375".

Referring now to FIGS. 37A-D, in an embodiment, the inboard pad eye 1560 includes a tail stock 1565 fixed to a head 1570. The tail stock 1565 has a generally square cross section, enabling the tail stock 1565 to be fitted onto an end of one of the folding elements 1120a, 1120b in various embodiments. In an embodiment, the edges of the tail stock 1565 are rounded. In various embodiments, the tail stock 1565 may be secured on the end of one of the folding elements 1120a, 1120b by crimping, press-fitting, pinning, adhering with an adhesive, or the like. In an embodiment, the tail stock 1565 has a cross-sectional width LPTSW smaller than a width LPCHW of the head 1570 and a cross-sectional height LPTSH smaller than a height LPCHH of the head 1570. In an embodiment, LPTSW is between 0.8125" and 0.9375", LPTSH is between 0.8125" and 0.9375", LPCHH is between 0.9375" and 1.0625", and LPCHW is between 0.9375" and 1.0625". In an embodiment, LPTSW is 0.875", LPTSH is 0.875", LPCHH is 1", and LPCHW is 1".

Still referring to FIGS. 37A-D, in an embodiment, the head 1570 includes the tine 1572, a first support part 1576a on one side of the tine 1572 and a second support part 1572b on the other side of the tine 1572.

Figure 37A:
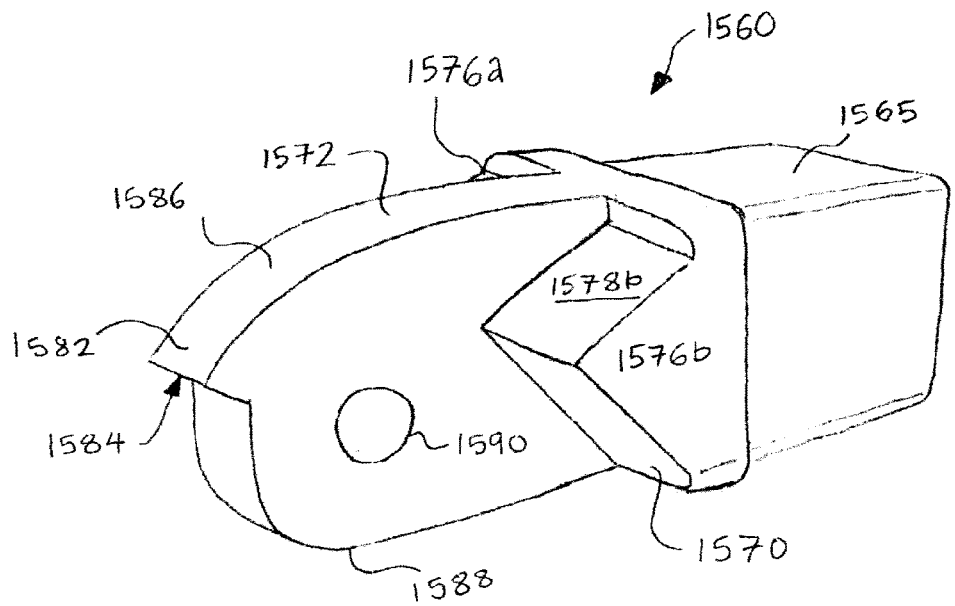
FIGS. 37A-D depict a perspective view and schematic views of an inboard hinge pad eye in accordance with an exemplary embodiment.
Figure 37D:
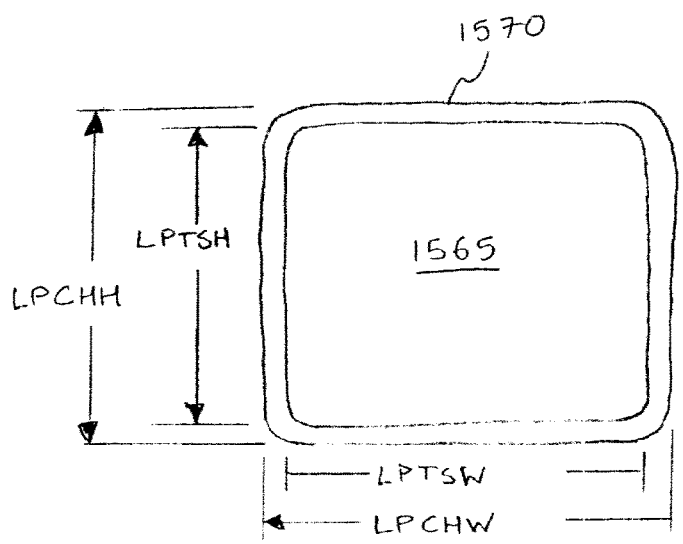
Figure 37C:
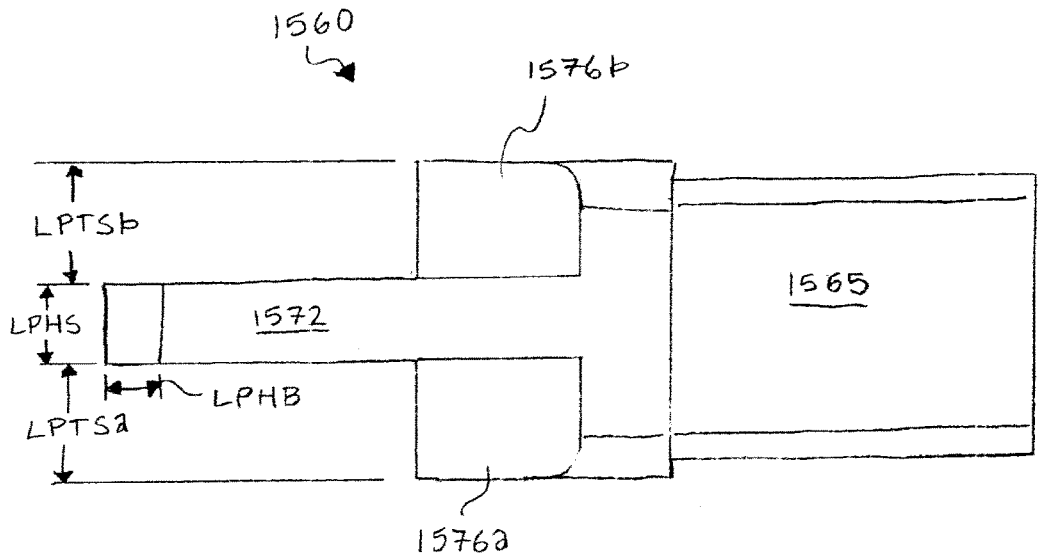
Figure 37B:
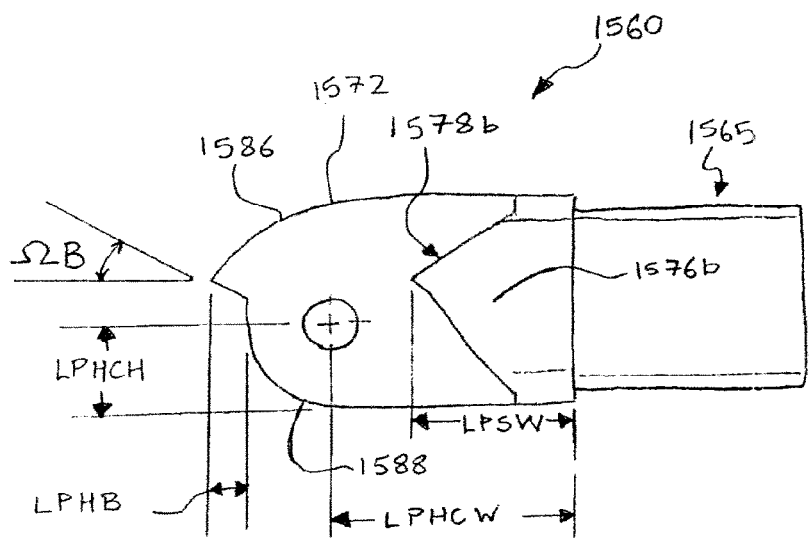
Figure 38D:
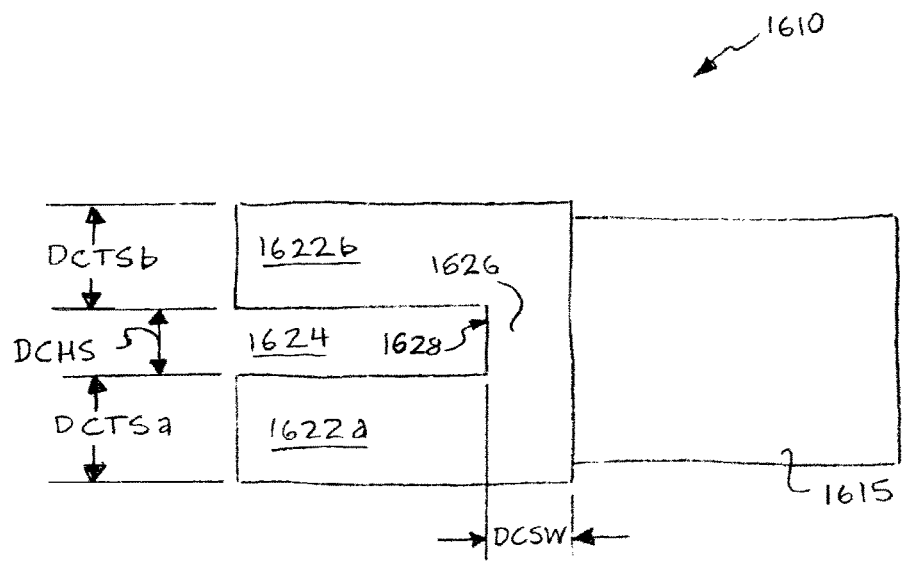
Figure 38C:
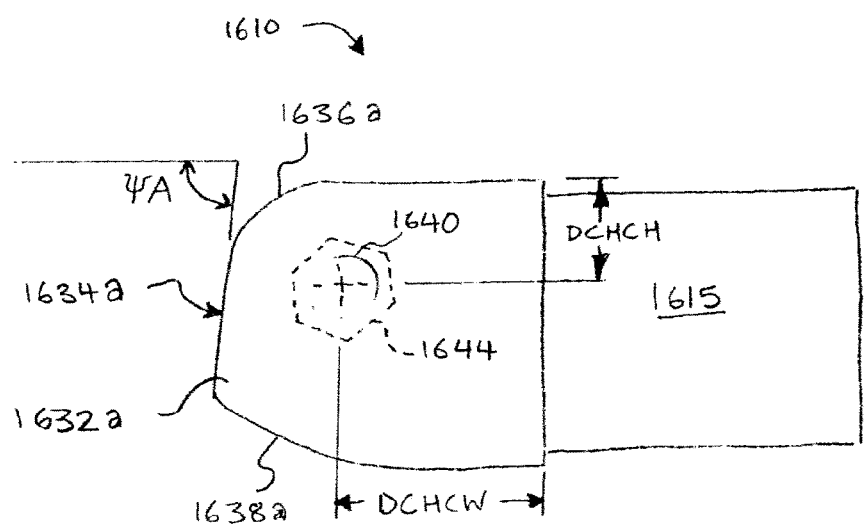

Referring to FIGS. 37A-C, the tine 1572 includes a rotation limit part 1582, a top radius 1586, and a bottom radius 1588. Advantageously, the top radius 1586 may provide a smooth surface across which the canopy 1102 can fold and slide without snagging or tearing.

In an embodiment, the tine 1572 is dimensioned to fit into the slot 1524 of the inboard clevis 1510, shown in FIGS. 36A-D. In an embodiment, the tine 1572 has a width LPTS, the first support part 1576a has a width LPHSa, and the second support part 1576b has a width LPHSb. In an embodiment, LPTS is between 0.1875" and 0.3125", LPHSa is between 0.3125" and 0.4375", and LPHSb is between 0.3125" and 0.4375". In an embodiment, LPTS is 0.25", LPHSa is 0.375", and LPHSb is 0.375".

In an embodiment, the support parts 1576a, 1576b extend a distance LPSW in the axial direction and a distance LPSH from the bottom radius 1588 perpendicular to the axial direction. In an embodiment, the support part 1576a includes a support surface 1578a and the support part 1576b includes a support surface 1578b. In an embodiment, LPSW is between 0.625" and 0.75" and LPSH is between 0.5625" and 0.6875". In an embodiment, LPSW is 0.6875" and LPSH is 0.875".

Still referring to FIGS. 37A-C, the rotation limit part 1582 includes a limit surface 1584. In an embodiment, the rotation limit part 1582 has the shape of a beak. In an embodiment, the support surface 1584 forms an angle ΩB with the longitudinal axis of the inboard pad eye 1560. In an embodiment, the rotation limit part 1582 extends a distance LPHB in the axial direction from the bottom radius 1588. In an embodiment, ΩB is between 15 degrees and 35 degrees and LPHB is between 0.0625" and 0.25". In an embodiment ΩB is 26.6 degrees and LPHB is 0.125".

Referring to FIGS. 37A-B, in an embodiment, a through-hole 1590 pierces the tine 1572 and is centered in the axial direction a distance LPHCW from the intersection of the tail stock 1565 and the head 1570, and a distance LPHCH from the bottom radius 1588. In an embodiment, LPHCW is between 1" and 1.125" and LPHCH is between 0.3125" and 0.4375". In an embodiment, LPHCW is 1.0625" and LCHCH is 0.375".

Referring again to FIGS. 34A-B, when the inboard clevis 1510 is rotatably connected with the inboard pad eye 1560, in the expanded position (FIG. 34B) the limit surfaces 1534a, 1534b of the rotation limit parts 1532a, 1532b contact the support surfaces 1578a, 1578b of the inboard pad eye 1560 and the limit surface 1584 of the inboard pad eye contacts the support surface 1528 of the inboard clevis 1510, thereby limiting the rotation of the inboard hinge to a predetermined angle related to the angle ΦE (FIG. 33D).

Referring now to FIGS. 38A-E, in an embodiment, the outboard clevis 1610 includes a tail stock 1615 fixed to a head 1620. The tail stock 1615 has a generally square cross section, enabling the tail stock 1615 to be fitted onto an end of one of the main extensions 1110a, 1110b in various embodiments. In an embodiment, the edges of the tail stock 1615 are rounded. In various embodiments, the tail stock 1615 may be secured on the end of one of the main extensions 1110a, 1110b by crimping, press-fitting, pinning, adhering with an adhesive, or the like. In an embodiment, the tail stock 1615 has a cross-sectional width DCTSW smaller than a width DCCHW of the head 1620 and a cross-sectional height DCTSH smaller than a height DCCHH of the head 1620. In an embodiment, DCTSW is between 0.8125" and 0.9375", DCTSH is between 0.8125" and 0.9375", DCCHH is between 0.9375" and 1.0625", and DCCHS is between 0.9275" and 1.0625". In an embodiment, DCTSW is 0.875", DCTSH is 0.875", DCCHH is 1", and DCCHW is 1".

Still referring to FIGS. 38A-E, in an embodiment the head 1620 includes a first tine 1622a, a second tine 1622b, a slot 1624 between the first tine 1622a and the second tine 1622b, and a support part 1626 in the slot 1624 between the first tine 1622a and the second tine 1622b.

Referring to FIGS. 38A-D, the first tine 1622a includes a rotation limit part 1632a, a top radius 1636a, and a bottom radius 1638a. In an embodiment, the slot 1624 is dimensioned to receive a tine 1672 of the outboard pad eye 1660, as shown in FIGS. 39A-D. In an embodiment, the first tine 1622a has a width DCTSa, the second tine 1622b has a width DCTSb, and the groove 1626 has a width DCHS. In an embodiment, DCTSa is between 0.312" and 0.4375", DCTSb between 0.3125" and 0.4375", and DCHS is between 0.1875" and 0.3125". In an embodiment, DCTSa is 0.375", DCTSb is 0.375", and LCHS is 0.25".

In an embodiment, the support part 1626 includes a support surface 1628 located a distance DCSW from the intersection of the tail stock 1615 and the head 1620 in the axial direction. In an embodiment, DCSW is between 0.1875" and 0.3125". In an embodiment, DCSW is 0.25".

Still referring to FIGS. 38A-D, the rotation limit part 1632 includes a limit surface 1634a and the rotation limit part 1632b includes a limit surface 1634b. In an embodiment, the rotation limit parts 1632a, 1632b each have a "D" shaped profile. In an embodiment, the support surface 1634a, 1634b each form an angle ΨPA with the longitudinal axis of the outboard clevis 1610. In an embodiment, ΨPA is between 75 degrees and 90 degrees. In an embodiment, ΨPA is 85 degrees.

Referring to FIGS. 38A-B, in an embodiment, a through-hole 1640 pierces the tines 1622a, 1622b and is centered in the axial direction a distance DCHCW from the intersection of the tail stock 1615 and the head 1620, and a distance DCHCH from the top radii 1636a, 1636b. In an embodiment, as shown in FIG. 38A, the through-hole 1640 includes a recess 1642 dimensioned to receive a head of the bolt 1650 on the first tine 1622a and a nut-shaped recess 1644 dimensioned to receive a nut on the second tine 1622b into which the bolt 1650 is threaded. In an embodiment, DCHCW is between 0.5625" and 0.6875" and DCHCH is between 0.3125" and 0.4375". In an embodiment, DCHCW is 0.625" and DCHCH is 0.375".

Referring now to FIGS. 39A-D, in an embodiment, the outboard pad eye 1660 includes a tail stock 1665 fixed to a head 1670. The tail stock 1665 has a generally square cross section, enabling the tail stock 1665 to be fitted onto an end of one of the main extensions 1110a, 1110b in various embodiments. In an embodiment, the edges of the tail stock 1665 are rounded. In various embodiments, the tail stock 1665 may be secured on the end of one of the main extensions 1110a, 1110b by crimping, press-fitting, pinning, adhering with an adhesive, or the like. In an embodiment, the tail stock 1665 has a cross-sectional width DPTSW smaller than a width DPCHW of the head 1670 and a cross-sectional height DPTSH smaller than a height DPCHH of the head 1670. In an embodiment, DPTSW is between 0.8125" and 0.9375", DPTSH is between 0.8125" and 0.9275", DPCHH is between 0.9275" and 1.0625", and DPCHW is between 0.9375" and 1.0625". In an embodiment, DPTSW is 0.875", DPTSH is 0.875", DPCHH is 1", and DPCHW is 1".

Still referring to FIGS. 39A-D, in an embodiment, the head 1670 includes the tine 1672, a first support part 1676a on one side of the tine 1672 and a second support part 1672b on the other side of the tine 1672.

Figure 39A:
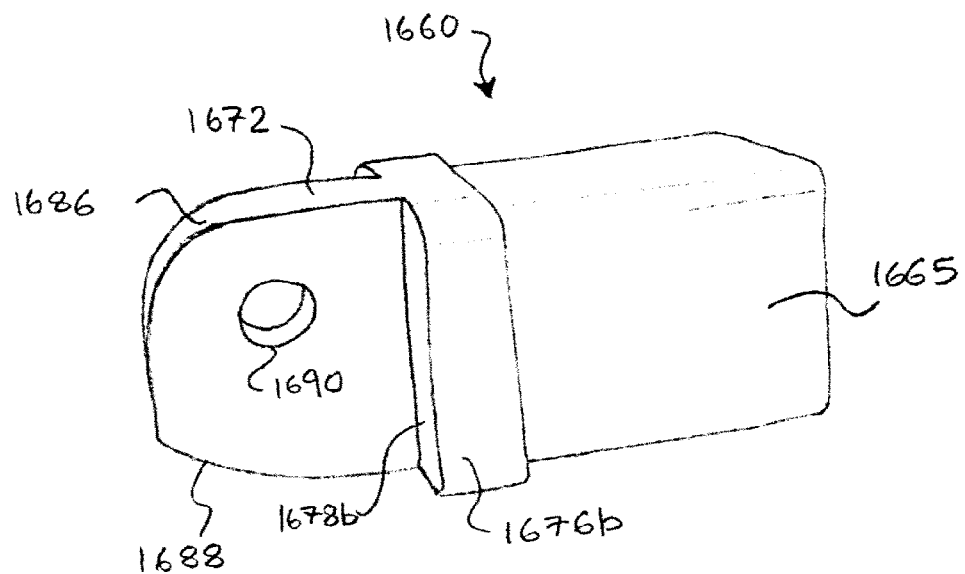
FIGS. 39A-D depict a perspective view and schematic views of an outboard hinge pad eye in accordance with an exemplary embodiment.
Figure 39D:
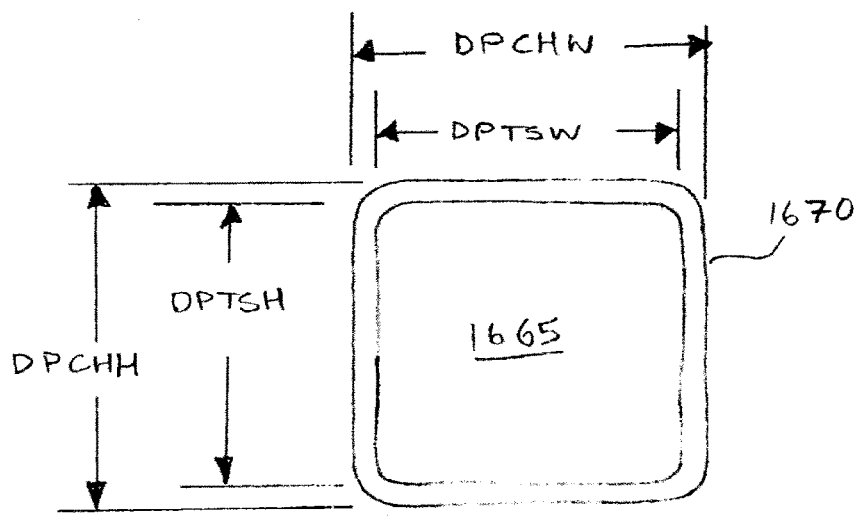
Figure 39C:
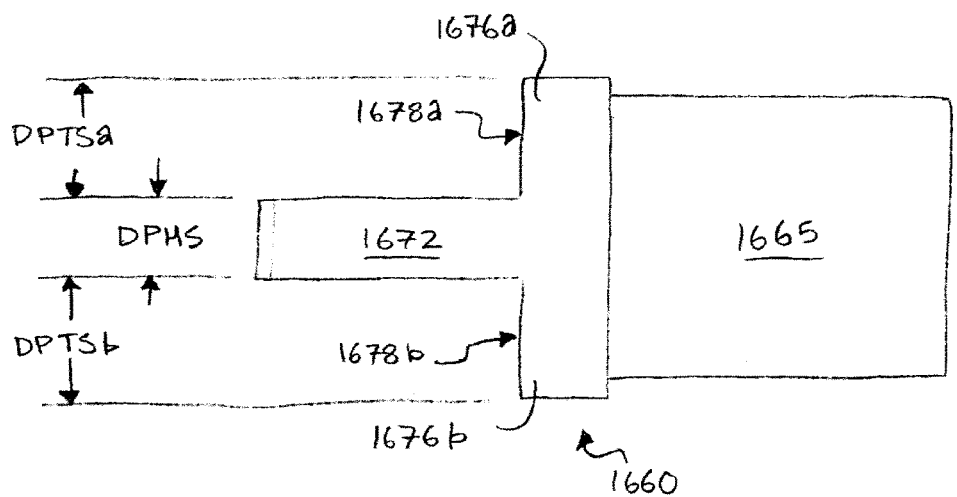
Figure 39B:
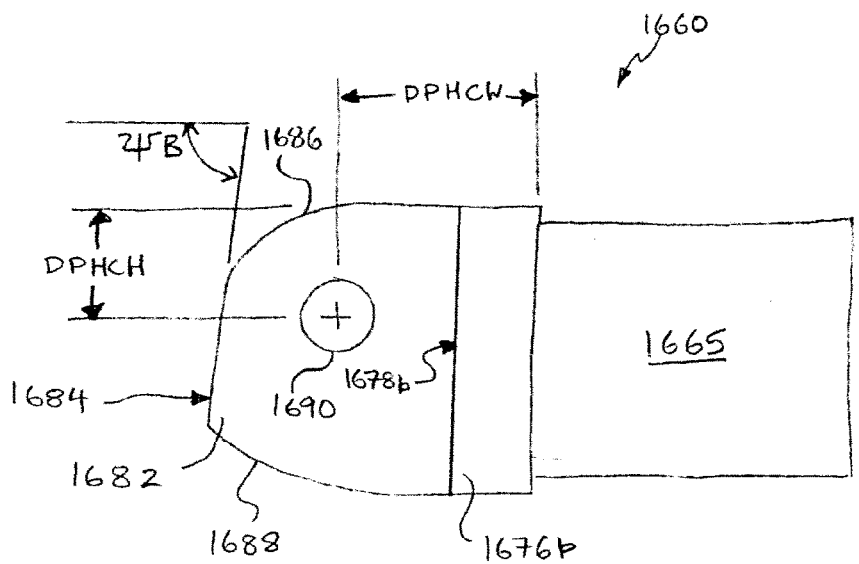

Referring to FIGS. 39A-C, the tine includes a rotation limit part 1682, a top radius 1686, and a bottom radius 1688. In an embodiment, the tine 1672 is dimensioned to fit into the slot 1624 of the outboard clevis 1610, shown in FIGS. 38A-D. In an embodiment, the tine 1672 has a width DPTS, the first support part 1676a has a width DPHSa, and the second support part 1676b has a width DPHSb. In an embodiment, DPTS is between 0.1875" and 0.3125", DPHSa is between 0.3125" and 0.4375", and DPHSb is between 0.3125" and 0.4375". In an embodiment, DPTS is 0.25", DPHSa is 0.375", and DPHSb is 0.375".

In an embodiment, the first support part 1676a includes a support surface 1678a and the second support part 1676b includes a support surface 1678b. In an embodiment, the support surfaces 1678a, 1678b are planar surfaces located a distance DPSW from the intersection of the tail stock 1665 and the head 1670 in the axial direction. In an embodiment, DPSW is between 0.1875" and 0.3125". In an embodiment, DPSW is 0.25".

Still referring to FIGS. 39A-C, the rotation limit part 1682 includes a limit surface 1684. In an embodiment, the rotation limit part 1682 has a "D" shape. In an embodiment, the support surface 1684 forms and angle TB with the longitudinal axis of the outboard pad eye 1660. In an embodiment, TB is between 75 degrees and 90 degrees. In an embodiment, ΨPB is 85 degrees.

Referring to FIGS. 39A-B, in an embodiment, a through-hole 1690 pierces the tine 1672 and is centered in the axial direction a distance DPHCH from the intersection of the tail stock 1665 and the head 1670, and a distance DPHCH from the top radius 1686. In an embodiment, DPHCW is between 0.5625 and 0.6875 and DPHCH is between 0.3125" and 0.4375". In an embodiment, DPHCW is 0.625" and DPHCH is 0.375".

Referring again to FIGS. 35A-B, when the outboard clevis 1610 is rotatably connected with the outboard pad eye 1660, in the expanded position, the limit surfaces 1634a, 1634b of the rotation limit parts 1632a, 1632b contact the support surfaces 1678a, 1678b of the outboard pad eye 1660 and the limit surface 1684 of the outboard pad eye contacts the support surface 1628 of the outboard clevis 1610, thereby limiting the rotation of the inboard hinge to a predetermined angle related to the angle ΦE (FIG. 33D).

Figure 40A:
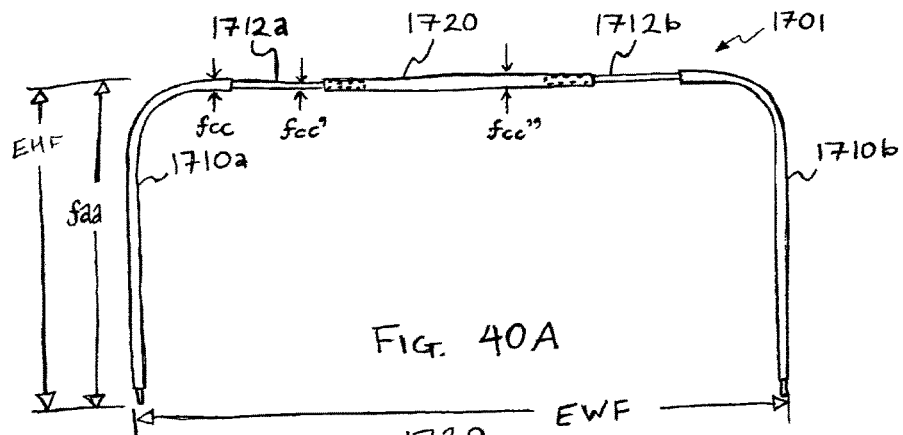
FIGS. 40A-C depict front views and a partial perspective view of an expandable and contractible support frame in accordance with an exemplary embodiment.
Figure 40B:
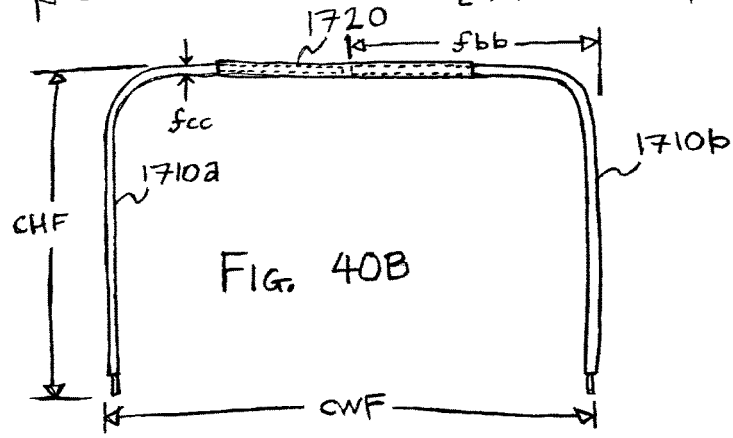

Referring now to FIGS. 40A-C and 41A-C other embodiments of the expanding and contracting sun shade 1100 include an expandable and contractible support frame 1701. Referring to FIG. 40A the expandable and contractible support frame 1701 is shown in an expanded position. Referring to FIG. 40B the expandable and contractible support frame 1701 is shown in a contracted position. The expandable and contractible support frame 1701 according to an embodiment includes main extensions 1710a and 1710b and a sliding element 1720.

Referring to FIG. 40A, the main extensions 1710a and 1710b include a sliding portion 1712a and a sliding portion 1712b respectively. The sliding portion 1712a of the main extension 1710a and the sliding portion 1712b of the main extension 1710b may overlap with the sliding member 1720 so that the sliding portions 1712a, 1712b translate with respect to the sliding member 1720 as the expandable and contractible support frame 1701 moves between an expanded position and a contracted position. According to various embodiments, the sliding portions 1712a, 1712b may have an outer cross-sectional shape corresponding to an inner cross-sectional shape of the sliding member 1720.

In some embodiments, each of the main extensions 1710a, 1710b may be formed as a curved "L" shaped beam with a height faa, width fbb, a major thickness fcc, and a minor thickness fcc' on the sliding portions 1712a, 1712b. The minor thickness fcc' may be smaller than the major thickness fcc. For example, in an embodiment where fcc is 2", fcc' may be 1.75". The sliding member 1720 may have a thickness fcc" equal to the major thickness fcc of the main extensions 1710a, 1710b, or different from the thickness fcc.

Figure 40C:
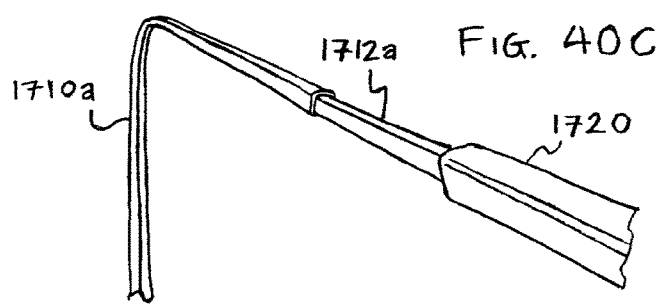

In other embodiments, the main extensions 1710a, 1710b may have another shape, such as a curved shape. Referring to FIGS. 40A-C, the sliding element 1720 may be separate from the main extensions 1710a, 1710b. In other embodiments, the sliding element 1720 may be fixed to or integral with the main extension 1710a and the sliding portion of the main extension 1710b may be able to slide relative to the sliding member 1720 on only one side. In still other embodiments, the sliding member 1720 may be comprised of a member having a smaller thickness compared to one or both of the main extensions 1710a, 1710b, with one or both of the sliding elements 1712a, 1712b forming a cross-section that slides on an outside of the sliding member 1720. In some embodiments, the expandable and contractible support frame 1701 includes one or more lubricants such as grease, or a low-friction coating such as PTFE, and/or bushings or bearings, for example ball bearings, roller bearings, needle bearings, or the like, to reduce friction and to ensure the sliding portions 1712a, 1712b are able to slide smoothly relative to the sliding member 1720.

Referring to FIG. 40B, when the expandable and contractible support frame 1701 is in a contracted position, the sliding portions 1712a, 1712b may be entirely concealed within the sliding member 1720. In other embodiments, gaps of various sizes may remain along the sliding direction in between the sliding portions 1712a, 1712b and the sliding member 1720.

In some embodiments, the expandable and contractible support frame 1701 may undergo a transition from the contracted position to the expanded position, or from the expanded position to the contracted position, due to a movement of an expandable and contractible floor to which the expandable and contractible support frame 1701 is attached. For example, when each of the main extensions 1710a, 1710b is rigidly fixed, directly or indirectly, to a structural portion of an expandable and contractible boat, a stiffness of each of the main extensions 1710a, 1710b may be sufficient to transfer the expansion or contraction motion of the boat through the main extensions 1710a, 1710b, resulting in relative motion between the main extensions 1710a, 1710b and the sliding member 1720. Thus, in some embodiments, it is not necessary to supply any additional force in order to open or close an expanding and contracting sun shade 1100 that includes the expandable and contractible support frame 1701, apart from the force imparted on the expandable and contractible floor of the boat.

In other embodiments, the expandable and contractible support frame 1701 may undergo a transition from the contracted position to the expanded position, or vice versa, under the influence of a biasing device, such as a spring, a pneumatic piston, a motor drive, a rack and pinion mechanism, a pulley and cable, or the like. In still other embodiments, the expandable and contractible support frame 1701 may undergo a transition from the contracted position to the expanded position, or vice versa, when manually pulled or pushed by a user, and/or by way of a combination of a movement of an expandable and contractible floor and/or a biasing device.

According to various embodiments, the height EHF of the expandable and contractible support frame 1701 in the expanded position may be equal to the height CHF of the expandable and contractible support frame 1701 in the contracted position. According to various embodiments, the width EWF of the expandable and contractible support frame 1701 in the expanded position is between 100" and 144" and the width CWF of the expandable and contractible support frame 1701 in the contracted position is between 60" and 120". In an embodiment, the width EWF is 120" and the width CWF of the expandable and contractible support frame 1701 is 90".

In various embodiments, the expandable and contractible support frame 1701, including the main extensions 1710a, 1710b and the sliding member 1720 may be made of a strong and stiff material or combination of materials such as aluminum, stainless steel, fiberglass, plastic, or fiber-reinforced plastic. In some embodiments, the expandable and contractible support frame 1701 is made of 1"×1" square tubular metal of wall thickness between 0.03125" and 0.125". In some embodiments, the expandable and contractible support frames 1101, 1201, and 1301 are made of 1"×1" square tubular aluminum of 0.0625" wall thickness.

Figure 41A:
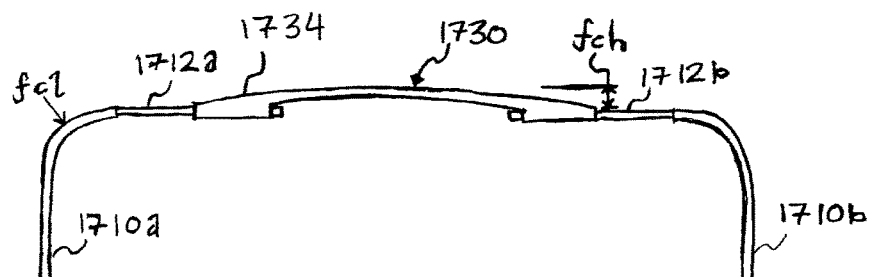
FIGS. 41A-C depict front views and a partial perspective view of an expandable and contractible support frame in accordance with an exemplary embodiment.
Figure 41B:
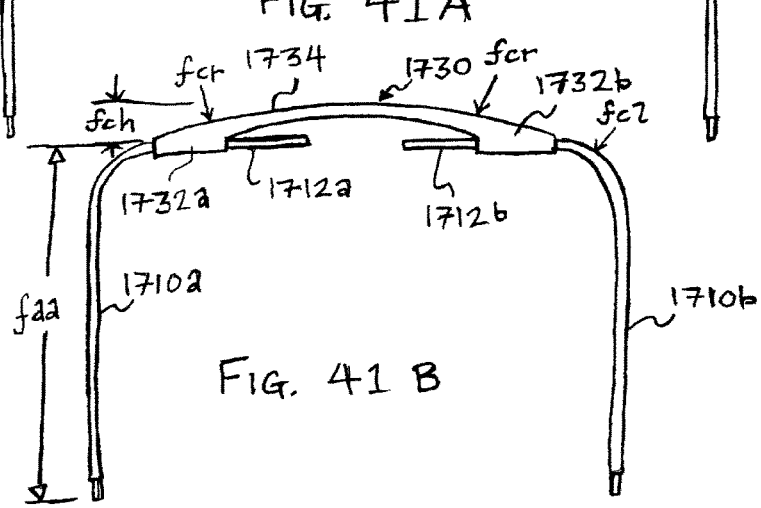
Figure 41C:
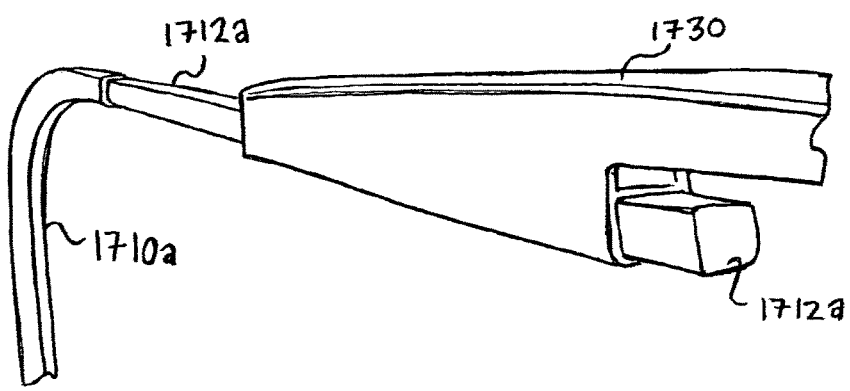

Referring now to FIGS. 41A-41C, in other embodiments of the expandable and contractible support frame 1701, the sliding member 1720 may be replaced with an extended sliding member 1730. The extended sliding member 1730 may function in like manner as the sliding member 1720, overlapping with the sliding portions 1712a, 1712b, while additionally providing a vertical extension fch above the height faa of the main extensions 1710a, 1710b. According to an embodiment, the vertical extension fch may be provided in an arcuate shape, or in another shape. Advantageously, the extended sliding member 1730 may provide increased headroom to passengers when installed onboard a boat. Additionally, the extended sliding member 1730 may provide added stiffness to the expandable and contractible support frame 1701.

In an embodiment, the extended sliding member 1730 may include a first sliding receiver portion 1732a through which the first sliding portion 1712a translates and a second sliding receiver portion 1732b through which the second sliding portion 1712b translates. In an embodiment, a bow portion 1734 connects the sliding portions 1712a, 1712b entirely above an axis along which the sliding portions 1712a, 1712b translate through the sliding receiver portions 1732a, 1732b. In some embodiments, the bow portion 1734 is peaked, so that rain tends to roll off the sides when the canopy 1102 is supported by the bow portion 1734.

In an embodiment, a curvature fcr of the bow portion 1734 may match a curvature fcl of the main extensions 1710a, 1710b. In some embodiments, the curvature fcr is tangent to the curvature fcl. In some embodiments, the curvature fcr has the same radius as the curvature fcl. In exemplary embodiments where the curvatures fcr, fcl match, stress risers and/or points for snagging are reduced, such that wear and tear on the canopy 1102 installed onto the expandable and contractible support frame 1701 is reduced.

In some embodiments, fch is between 4" and 24", fcr is a radius between 6" and 36", and fcl is a radius between 6" and 36". In an embodiment, fch is 12", fcr is 18", and fcl is 18".

Referring now to FIGS. 42-45, various embodiments include an expandable and contractible safety barrier 1800. Embodiments of the expandable and contractible safety barrier 1800 may be able to move between an expanded position and a contracted position, while providing or enhancing safety at a given boundary. For instance, referring to FIG. 42, when installed on a deck of a boat in accordance with various embodiments discussed above, the expandable and contractible safety barrier 1800 may protect passengers from falling overboard, provide a support such as a hand rail, or provide protection, for instance from wind or waves. In various embodiments, the expandable and contractible safety barrier 1800 may form a fence, a railing, a guard, or a gate, for example. In an embodiment, the expandable and contractible safety barrier 1800 may shield an inside portion of a boat from a hazardous area, such as an outboard motor, a propeller, or the like.

Advantageously, in an embodiment wherein side floor panels OFa, OFb are movable to expand and contract, it is not necessary to detach the expandable and contractible safety barrier 1800 from either of the side floor panels OFa, OFb in order to move the boat floor between the expanded and contracted positions. Advantageously, this may provide peace of mind to boat operators, for example, where a boat is operated singlehanded, such that the expandable and contractible safety barrier 1800 is essentially self-tending, not requiring any particular attention from the boat operator during an expansion or contraction operation of the boat.

Figure 42:
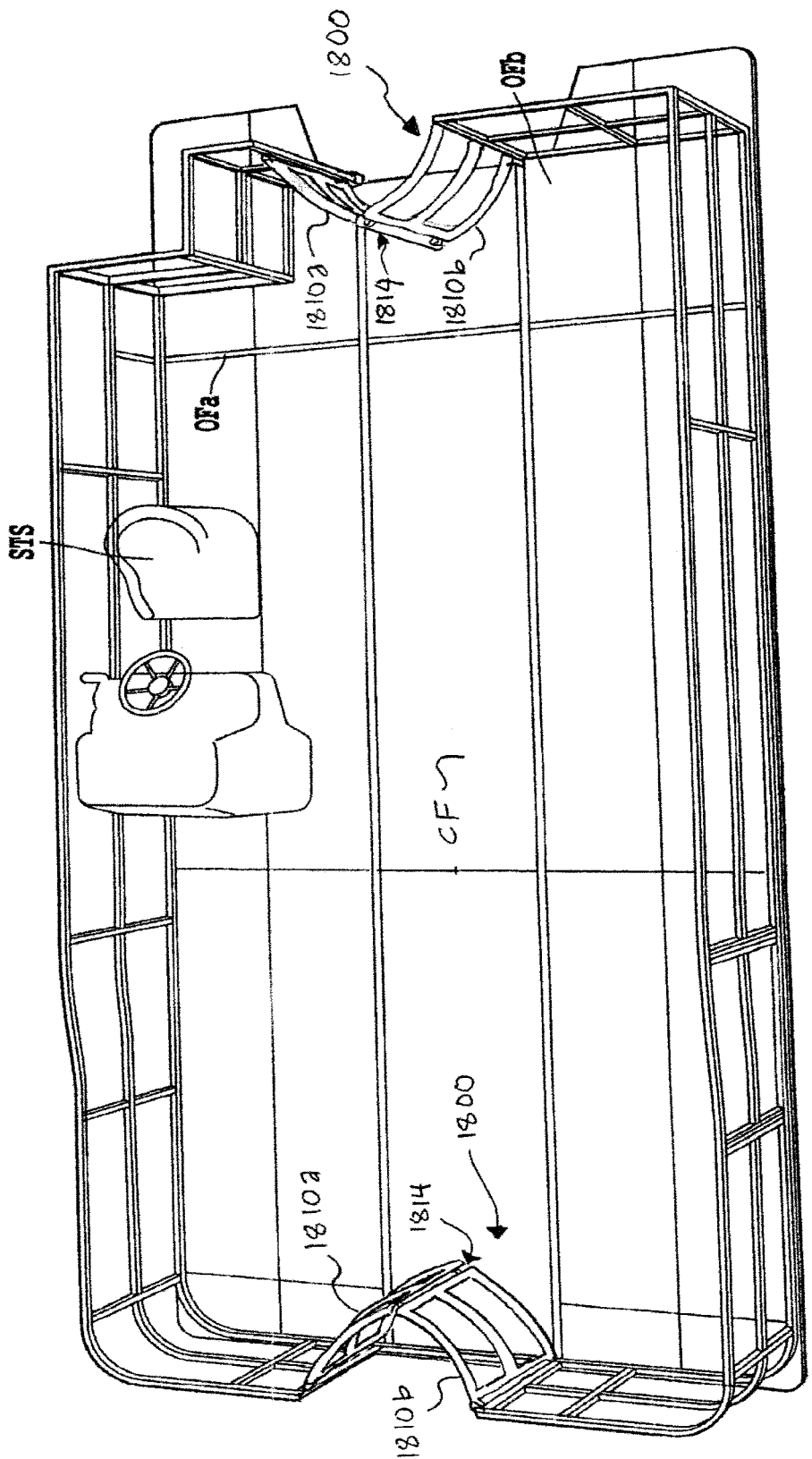
FIG. 42 depicts a perspective view of an expandable and contractible boat including an expandable and contractible barrier in accordance with an exemplary embodiment.

Referring to FIG. 42, in an embodiment, the expandable and contractible safety barrier 1800 may be hinged to fold inward toward the inside of a boat when the side floor panels OFa, OFb of the boat move between the expanded and contracted positions. In another embodiment, the expandable and contractible safety barrier 1800 may be hinged to fold outward from the boat. One or more expandable and contractible safety barriers 1800 may be used on a single boat. Referring to FIG. 42, a first expandable and contractible safety barrier 1800 may be disposed toward a bow portion of the boat and a second expandable and contractible safety barrier 1800 may be disposed toward a stern portion of the boat.

Figure 43A:
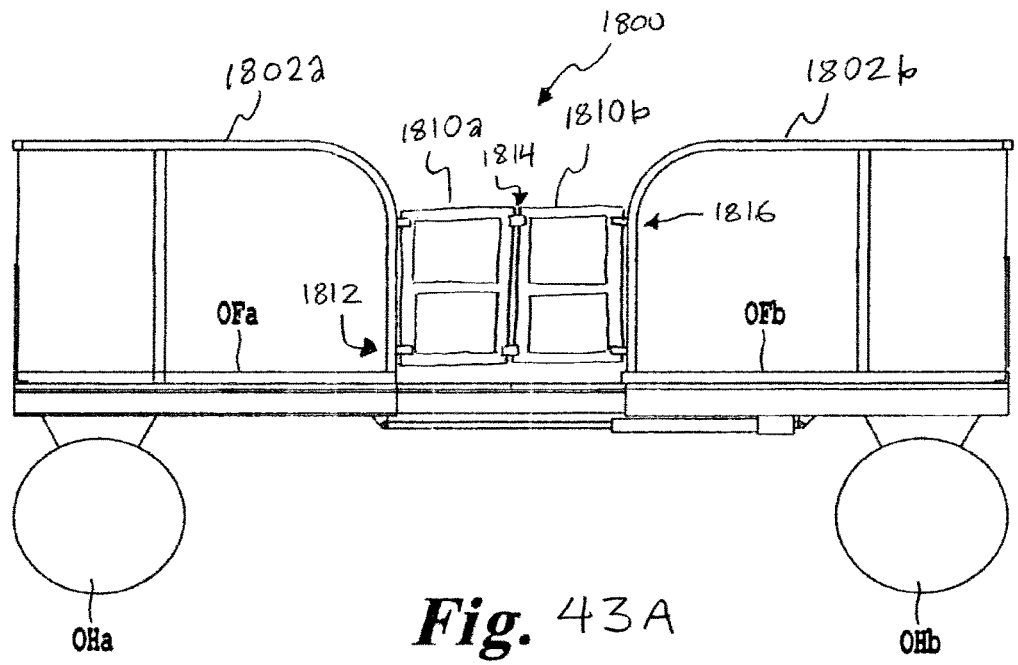
FIGS. 43A-B depict front views of an expandable and contractible boat including an expandable and contractible barrier in accordance with an exemplary embodiment.
Figure 43B:
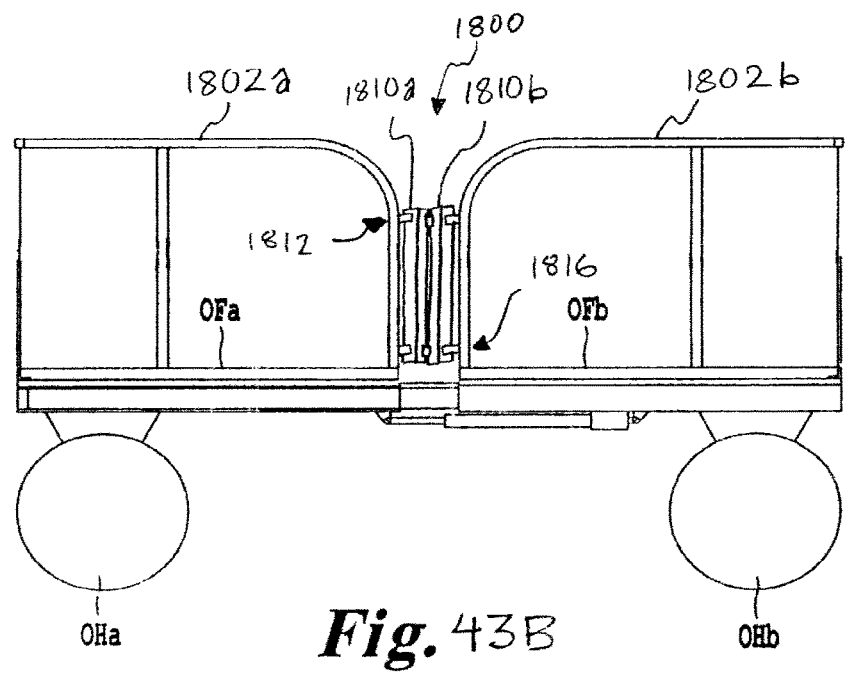

Referring to FIGS. 43A and 43B, the expandable and contractible safety barrier 1800 may fill a transverse space between a first fixed barrier 1802a, such as a stanchion, fixed to the first side floor panel OFa and a second fixed barrier 1802b fixed to the second side floor panel OFb. Referring to FIG. 43B, in the contracted position, the expandable and contractible safety barrier 1800 may occupy a small space in the transverse direction compared to that in the expanded position. Advantageously, the expandable and contractible safety barrier 1800 may be mounted such that a vertical clearance space is provided between the expandable and contractible safety barrier 1800 and the floor of the boat.

In various embodiments, the expandable and contractible safety barrier 1800 includes a first barrier portion 1810a connected to a second barrier portion 1810b by a middle hinge 1814. In some embodiments, the first barrier portion 1810a pivotally attaches to the first fixed barrier 1802a by a first outside hinge 1812. The first barrier portion 1810a includes a first outside hinge portion 1812a that forms all or part of the first outside hinge 1812. In some embodiments, the second barrier portion 1810b may pivotally attach to the second fixed barrier 1802b by a second outside hinge 1816. The second barrier portion 1810b includes a second outside hinge portion 1816b that forms all or part of the second outside hinge 1816. In various embodiments, the hinges 1812, 1814, and 1816 include one or more of a barrel hinge, a knee joint, a compliant hinge, or another pivoting device enabling rotation of the first and second barrier portions 1810a, 1810b. According to various embodiments, the hinge portions 1812a and 1816b include one or more of a pad eye, a clevis, an upper knuckle, a lower knuckle, a pin, an elastic member, a bearing, or the like.

Referring to FIGS. 44A-B and 45A-B, the first outside hinge portion 1812a may have an axis Z12, the middle hinge 1814 may have an axis Z14, and the second outside hinge portion 1816b may have an axis Z16. In an embodiment, the axes Z12 and Z16 may be coplanar in a first plane YZ18. Referring to FIG. 44B, as the axes Z12 and Z16 move towards one another along the Y18 direction in the first plane YZ18, the axis Z14 moves away from the first plane YZ18 in the X18 direction. On the other hand, referring again to FIG. 44A, as the axes Z12 and Z16 move apart along the Y18 direction in the first plane YZ18, the axis Z14 is brought towards the first plane YZ18 in the X18 direction.

Referring to FIG. 45A, according to an embodiment, the expandable and contractible safety barrier 1800 may have a shape, such as an arcuate shape, such that in a fully expanded position, the axes Z12 and Z16 are spaced apart a predetermined distance BWE and the axis Z14 is spaced apart from the first plane YZ18 a predetermined distance BHE. In a contracted position, the axes Z12 and Z16 may be spaced apart a predetermined distance BWC less than the predetermined distance BWE and the axis Z14 may be spaced apart from the first plane YZ18 a predetermined distance BHC greater than the predetermined distance BHE. In some embodiments, the axes Z12, Z14, and Z16 are substantially parallel, such that the motion of the expandable and contractible safety barrier 1800 occurs in a plane defined by the X18 and Y18 directions. In other embodiments, the axes Z12, Z14, and Z16 are not substantially parallel, such that the motion of the expandable and contractible safety barrier 1800 substantially occurs in a plane that forms an oblique angle with the X18 and Y18 directions. In some embodiments, BWE is between 20" and 60", BHE is between 1" and 10", BWC is between 4" and 20", and BHC is between 8" and 30". In an embodiment, BWE is 41" and BWC is 11".

In an exemplary embodiment, the predetermined distance BHE is greater than zero, such that a compressive force applied in the Y18 direction to the first outside hinge portion 1812a and the second outside hinge portion 1816b will have a positive resultant force component along the X18 direction, such that the middle hinge 1814 will consistently translate away from a single side of the first plane YZ18 whenever the expandable and contractible safety barrier 1800 is moved from the expanded position to the contracted position. In this manner, the operation of the expandable and contractible safety barrier 1800 may be predictable and damage or injury may be avoided.

Referring now to FIG. 46, some embodiments of the expandable and contractible safety barrier 1800 may further include a latching device 1820, such that the expandable and contractible safety barrier 1800 forms an expandable and contractible gate 1801. In some embodiments, the latching device 1820 includes one or more portions of a hinge, such as the first outside hinge 1812. In other embodiments, the latching device 1820 may be separate from a hinge.

In some embodiments, the second outside hinge 1816 may be comprised of a second outside hinge portion 1816a of the second fixed barrier 1802b, the second outside hinge portion 1816b of the second barrier portion 1810b, and one or more hinge pins 1816c. In other embodiments, the second outside hinge 1816 may take a different form. The second hinge may enable the second barrier portion 1810b to rotate with respect to the second fixed barrier 1802b.

Still referring to FIG. 46, in an embodiment, the latching device 1820 includes a pin 1822 movable in the Z18 direction by a handle 1824. A biasing member 1826, such as a spring, may be provided to return the pin 1822 to a predetermined position in relation to a knuckle portion 1828 of the latching device 1820. In an embodiment, the knuckle portion 1828 and the pin 1822 may function as the first outside hinge portion 1812a of the first barrier portion 1810. The pin 1822 may be insertable in and removable from a corresponding aperture 1804 of a boss 1806. The boss 1806 with the aperture 1804 may function as a first outside hinge portion 1812b of the first fixed barrier 1802a. The first outside hinge 1812 may be comprised of the first outside hinge portion 1812a of the first barrier portion 1810a and the first outside hinge portion 1812b of the first fixed barrier 1802a. In other embodiments, other latching devices may be used in place of the latching device 1820. For example, in another embodiment, the pin 1822 and the knuckle 1828 may be fixedly attached to the first fixed barrier 1802a with the boss 1806 being fixedly attached to the first barrier portion 1810a.

Advantageously, when the latching device 1820 is latched, it may act as the first outside hinge 1812, on which the first barrier portion 1810a may rotate. On the other hand, when the latching device 1820 is unlatched, passage through the expandable and contractible safety barrier 1800 may be provided. Thus, in an embodiment of a boat, passengers may easily embark or disembark. Advantageously, even in a boat that does not expand and contract, the expandable and contractible gate 1801 may occupy less space than a conventional gate. Additionally, embodiments of the expandable and contractible gate 1801 may provide a rigid support. Moreover, in a boat that expands and contracts, the expandable and contractible gate 1801 may improve accessibility and increase safety, while conveniently adapting to changes in the width of the boat.

In various embodiments, the expandable and contractible safety barrier 1800 may be made of a strong and stiff material or combination of materials such as aluminum, stainless steel, fiberglass, plastic, or fiber-reinforced plastic. In various embodiments, each of the first and second barrier portions 1810a, 1810b may take the form of a rod, a bar, a panel, a frame, a railing, a fence, a gate, or the like. In an embodiment, the first and second barrier portions 1810a, 1810b is made of welded tubular metal and the first, second, and middle hinge portions 1812a, 1814a, 1814b, and 1816b are welded to the respective barrier portions 1810a, 1810b. In various embodiments, the tubular metal has an outside diameter jjf between 0.75" and 3" with a wall thickness of 0.0625" to 0.25". In an embodiment, jjf is 1.5" and the wall thickness of the tubular metal is 0.125".

According to other embodiments, an expandable and contractible safety barrier may include a first barrier portion that translates relative to a second barrier portion. The expandable and contractible safety barrier in an embodiment may include a first barrier portion that slides in and out of a corresponding portion of a second barrier portion. In an embodiment, the first and second barrier portions may be formed as overlapping cylindrical members, forming a piston-cylinder mechanism. For example, the first barrier and the second barrier may be made of metal tubing having corresponding cross-sectional shapes. The cross-sectional shapes need not be circular, but may in square, rectangular, elliptical, or any other appropriate shape.

In another embodiment, the expandable and contractible safety barrier may include a first barrier portion that slides into a second barrier portion that has a pocket shape to partially or entirely cover a corresponding extent of the first barrier portion in the sliding direction. In various embodiments, the first and second barrier portions may form a pocket door. In an embodiment, the second barrier portion may be integral to a fixed portion of a boat, for instance, a seat back, an instrument console, a storage cabinet, or the like. Advantageously, the expandable and contractible safety barrier may include a latching device to lock the safety barrier in a closed position or in an open position. According to various embodiments, when the expandable and contractible safety barrier is in a latched position, it may slide back and forth between expanded and contracted positions with the movement of the boat between an expanded position and a retracted position.

Obviously, numerous modifications and variations of the present invention are possible in light of the above teachings. It is therefore to be understood that within the scope of the appended claims, the invention may be practiced otherwise than as specifically described herein. The above-noted teachings and features are not restricted to the combinations specifically illustrated or discussed, but rather, may be combined in any of various combinations.

What is claimed is:

1. A boat comprising:
a first outer hull and a second outer hull symmetrically shaped and arranged with respect to one another and being movable relative to one another, each of the first and second outer hulls including:
an outboard side portion;
an inboard side portion;
a bottom portion between the outboard side portion and the inboard side portion; and
a concave chine portion connecting the outboard side portion and the bottom portion,
wherein a cross-section of each of the first and second outer hulls is recessed at the concave chine portion,
wherein the concave chine portion includes an upper chine panel and a lower chine panel,
wherein the upper chine panel is oriented in a substantially horizontal direction and the lower chine panel is oriented in a substantially vertical direction, and
wherein an angle formed by the upper chine panel and the lower chine panel ranges from 85 to 95°.

2. The boat of claim 1, wherein the bottom portion includes a bottom panel that is sloped to decline toward the inboard side portion.

3. An assembly comprising a boat and a trailer, the boat comprising:
- a first outer hull and a second outer hull symmetrically shaped and arranged with respect to one another and being movable relative to one another, each of the first and second outer hulls including:
  - an outboard side portion;
  - an inboard side portion;
  - a bottom portion between the outboard side portion and the inboard side portion; and
  - a concave chine portion connecting the outboard side portion and the bottom portion, and
- the trailer comprising:
  - a structural member;
  - at least a pair of wheels rotatably attached to the structural member by a respective axle portion; and
  - a plurality of bunks provided on the structural member to contact the bottom portion of the first and second outer hulls and to support the boat in a supported position,
- wherein, in the supported position, the first and second outer hulls are inserted between the wheels and are lowered so that the bottom portion of the first and second outer hulls is below a top edge of the wheels, and
- wherein a vertical wheel clearance between the top edge of each of the wheels and each of the first outer hull and the second outer hull is a predetermined value.

4. The assembly of claim 3, wherein the concave chine portion includes an upper chine panel and a lower chine panel, and the vertical wheel clearance is measured between the top edge of each of the wheels and the upper chine panel of the outer hulls.

5. The assembly of claim 4, wherein the upper chine panel is oriented in a substantially horizontal direction and the lower chine panel is oriented in a substantially vertical direction.

6. The assembly of claim 5, wherein an angle formed by the upper chine panel and the lower chine panel ranges from 85° to 95°.

7. The assembly of claim 3, wherein a height of the assembly is a sum of a height of the outboard side portion, the vertical clearance and a wheel height.

8. An assembly comprising a boat and a trailer, the boat comprising:
- a first outer hull and a second outer hull symmetrically shaped and arranged with respect to one another and being movable relative to one another, each of the first and second outer hulls including:
  - an outboard side portion;
  - an inboard side portion;
  - a bottom portion between the outboard side portion and the inboard side portion; and
  - a concave chine portion connecting the outboard side portion and the bottom portion, and
- the trailer comprising:
  - a structural member;
  - at least a pair of wheels rotatably attached to the structural member by a respective axle portion; and
  - a plurality of bunks provided on the structural member to contact the bottom portion of the first and second outer hulls and to support the boat in a supported position,
- wherein, in the supported position, the first and second outer hulls are inserted between the wheels and are lowered so that the bottom portion of the first and second outer hulls is below a top edge of the wheels, and
- wherein a chine-to-chine width is less than a width between an inner edge of the wheels.

9. The assembly of claim 3, wherein a cross-section of each of the first and second outer hulls is recessed at the concave chine portion, and the trailer includes fenders that partially enclose the wheels, each of the fenders abutting the concave chine portion.

10. The assembly of claim 3, wherein the bottom portion includes a bottom panel that is sloped to decline toward the inboard side portion.

11. The assembly of claim 10, wherein the structural member includes a central portion and symmetrical lateral portions that slope to decline toward the central portion.

12. The assembly of claim 11, wherein the bunks are formed on the lateral portions and are sloped to accommodate the sloped bottom panel.

13. The boat of claim 1 wherein the outboard side portion is sloped to decline toward the inboard side portion.

* * * * *